US010941763B2

(12) United States Patent
Khaire et al.

(10) Patent No.: US 10,941,763 B2
(45) Date of Patent: Mar. 9, 2021

(54) RECIPROCATING GAS COMPRESSOR VALVE

(71) Applicant: Delaware Capital Formation, Inc., Wilmington, DE (US)

(72) Inventors: Swapnil S. Khaire, Knoxville, TN (US); Stephen A. Mish, Wellington, FL (US); Fred Matthew Schweinberg, Knoxville, TN (US); Vasudev M. Balamohan, Bangalore (IN); Sujith N. Rasquinha, Bangalore (IN)

(73) Assignee: Delaware Capital Formation, Inc., Wilmington, DE (US)

( * ) Notice: Subject to any disclaimer, the term of this patent is extended or adjusted under 35 U.S.C. 154(b) by 128 days.

(21) Appl. No.: 15/770,715

(22) PCT Filed: Oct. 25, 2016

(86) PCT No.: PCT/US2016/058668
§ 371 (c)(1),
(2) Date: Apr. 24, 2018

(87) PCT Pub. No.: WO2017/074940
PCT Pub. Date: May 4, 2017

(65) Prior Publication Data
US 2019/0301446 A1   Oct. 3, 2019

Related U.S. Application Data

(60) Provisional application No. 62/246,383, filed on Oct. 26, 2015.

(51) Int. Cl.
*F16K 15/02*   (2006.01)
*F04B 53/10*   (2006.01)
(Continued)

(52) U.S. Cl.
CPC ...... *F04B 53/1032* (2013.01); *F04B 39/1013* (2013.01); *F04B 39/1053* (2013.01);
(Continued)

(58) Field of Classification Search
CPC .... F16K 15/026; F16K 15/08; F16K 17/0426; F04B 53/1032; F04B 39/1013; F04B 39/1053; F04B 53/1087
(Continued)

(56) References Cited

U.S. PATENT DOCUMENTS 1,717,856 A   6/1929   Smith
2,624,587 A   1/1953   Watson et al.
(Continued)

FOREIGN PATENT DOCUMENTS

RU    117554 U1    6/2012
SU    1564385 A1   5/1990
WO    WO 2004/065790 A1   8/2004

OTHER PUBLICATIONS

International Search Report and Written Opinion of the International Searching Authority, dated Jan. 10, 2017, 5 pages.
(Continued)

*Primary Examiner* — P. Macade Nichols
(74) *Attorney, Agent, or Firm* — Fish & Richardson P.C.

(57) ABSTRACT

A reciprocating gas compressor valve having a plurality of clusters of kidney shaped holes positioned along a common circular or annular locus in the main body and a sealing element with a top portion, a bottom portion and a tubular section. The tubular section is integrally connected to the top portion and bottom portion. In an open position, a flow pathway is provided through the clusters of kidney shaped holes and the tubular section and the bottom profile abuts a stop surface of the valve. In a closed position, the top profile abuts the seat for sealing gas flow within the valve.

15 Claims, 65 Drawing Sheets

(51) Int. Cl.
  *F16K 17/04* (2006.01)
  *F04B 39/10* (2006.01)
  *F16K 15/08* (2006.01)

(52) U.S. Cl.
  CPC ........ *F04B 53/1087* (2013.01); *F16K 15/026* (2013.01); *F16K 15/08* (2013.01); *F16K 17/0426* (2013.01)

(58) Field of Classification Search
  USPC .................................. 137/54, 516.11, 516.21
  See application file for complete search history.

(56) References Cited

U.S. PATENT DOCUMENTS

| | | |
|---|---|---|
| 2,904,065 A | 9/1959 | Butlin |
| 3,148,697 A | 9/1964 | Carr |
| 3,244,195 A | 4/1966 | Wanner |
| 3,332,437 A | 7/1967 | Hallen |
| 3,536,094 A | 10/1970 | Manley, Jr. |
| 3,701,361 A | 10/1972 | Bunn et al. |
| 3,913,615 A | 10/1975 | Cooper |
| 4,130,131 A | 12/1978 | Kucenty |
| 4,483,363 A | 11/1984 | Madoche et al. |
| 4,819,689 A | 4/1989 | Owsley et al. |
| 4,872,481 A | 10/1989 | Shaw et al. |
| 5,511,583 A | 4/1996 | Bassett |
| 5,678,603 A | 10/1997 | Tschop |
| 6,234,194 B1 | 5/2001 | Jainek et al. |
| 6,581,632 B2 | 6/2003 | Walpole et al. |
| D745,637 S | 12/2015 | Penkkimaki |
| 9,309,878 B2 | 4/2016 | Columpsi |
| 9,309,978 B2 * | 4/2016 | Hatch ................. F04B 39/1013 |
| 2001/0029981 A1 | 10/2001 | Penza |
| 2002/0144733 A1 | 10/2002 | Artner |
| 2007/0065321 A1 * | 3/2007 | Durham .............. F04B 39/1013 417/559 |

OTHER PUBLICATIONS

Preliminary IPRP, dated May 1, 2018, 4 pages.
Emerson, Valve Sizing Calculations (Traditional Method) Emerson 626-639.
Lin, M.; et al., Study of the Effective Flow Area of Compressor Plate Valve; International Compressor Engineering Conference, 977 (1994).
Deschamps, C. J., et al., The Effective Flow and Force Areas in Compressor Valves International Compressor Engineering Conference, 608 (1988).
Schwerzler, D. D. et al., An Analytical Method for Determining Effective Flow and Force Areas for Refrigeration Compressor Valving Systems, International Compressor Engineering Conference, 5 (1972).
International Search Report, dated Jan. 19, 2017. 2 pages.
Written Opinion of the International Searching Authority, dated Jan. 19, 2017. 3 pages.

* cited by examiner

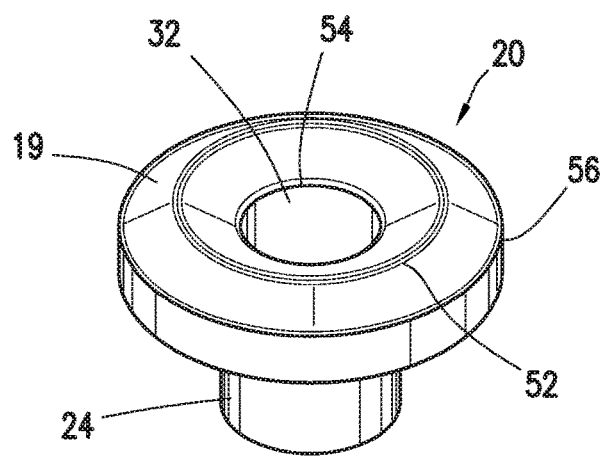
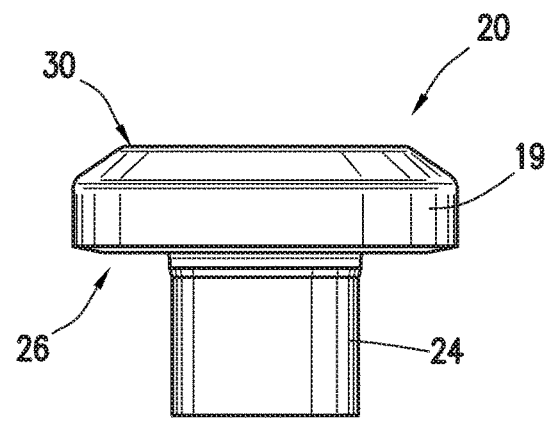
FIG. 13    FIG. 14
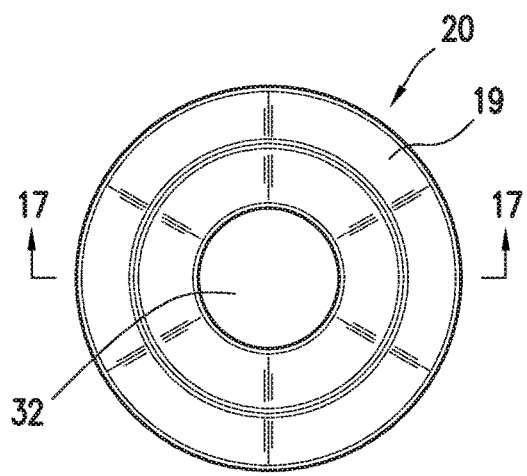
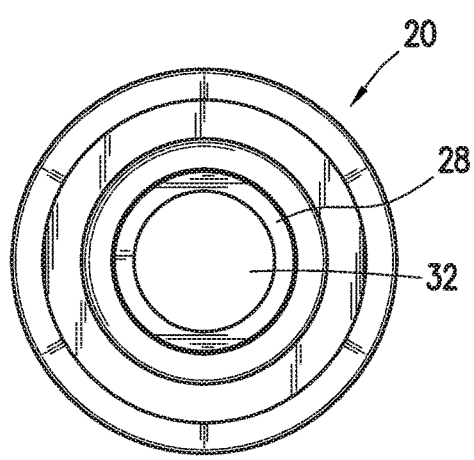
FIG. 15    FIG. 16
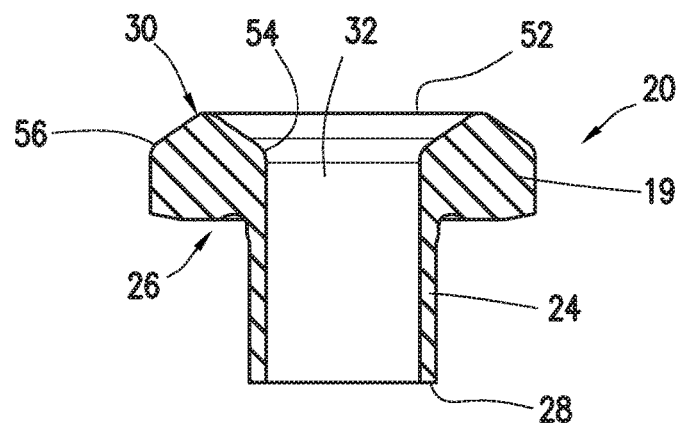
FIG. 17

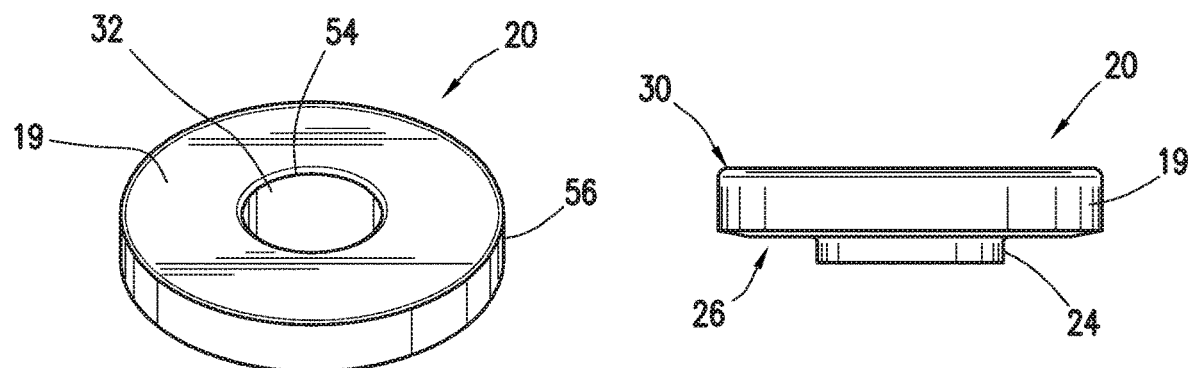
FIG. 122
FIG. 123
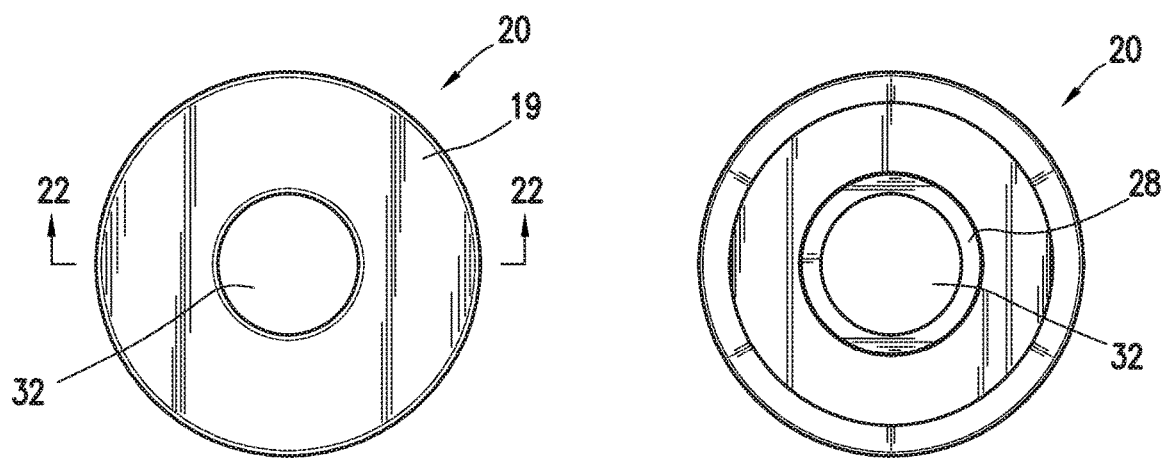
FIG. 124
FIG. 125
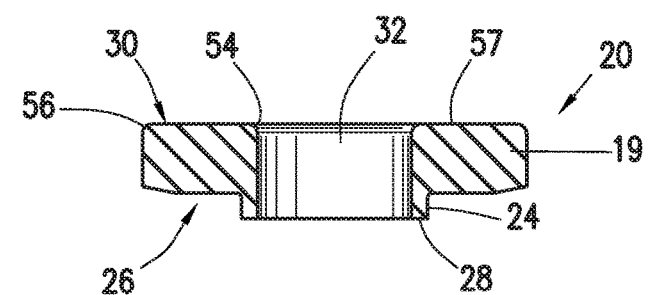
FIG. 126

RECIPROCATING GAS COMPRESSOR VALVE

CROSS REFERENCE TO RELATED APPLICATIONS

This application is the National Stage of International Application No. PCT/US2016/058668, filed Oct. 25, 2016, which claims the benefit of U.S. Provisional Application No. 62/246,383, filed Oct. 26, 2015. The foregoing applications are incorporated herein by reference.

BACKGROUND OF THE INVENTION

Reciprocating gas compressor valves require a significant amount of strength to withstand high differential pressures that occur at high speeds in reciprocating gas compressors. In the reciprocating gas compressor valve, the sealing element engages a valve seat in order to close gas flow passage ways. This type of valve is used in very demanding and often corrosive applications. Therefore, there is a high demand for a reciprocating gas compressor valve having a sealing element that will endure.

Existing sealing elements include a perforated plate, a ring or a poppet. The sealing element and a spring are contained in a valve assembly with the seat and a guard. The seat comprises a series of holes, generating an area for fluid flow. The sealing element moves freely in an axial direction. During operation, high pressure gas forces are placed on the sealing element, thus opening the valve. At the end of a cycle, the sealing element is pushed towards the seat often due to spring force, resulting in the seat surface being sealed and the valve in a closed position, and thereby obstructing the reverse flow and creating a one direction flow path. The sealing element then moves reciprocally between the seat and a stop surface to an open position where gas passes over the sealing element. The sealing element can move between suction and discharge events of the valve at a rate of 100 to 1200 times per minute.

Further, often a cartridge is used in the reciprocating gas compressor valve. The cartridge is press fitted into a hole and contains a sealing surface. Over time, the cartridge sealing surface deteriorates that causes leakage and inefficient operation. If left untreated, this can result in severe damage of the compressor and a costly overhaul of the whole compressor system.

In addition, a reciprocating gas compressor valve often requires large holes or slots in order to handle the proper amount of gas flow within the valve and as required by the compressor. The hole is drilled into the seat in order to accommodate cartridge which is then press-fitted into the hole. However, having a large area for the hole, the seat will lose structural integrity or seat strength, To compensate for this loss, the height of the seat must be increased to withstand the operating pressures. This increased height, in turn, increases the open space in the valve assembly resulting in increased clearance.

Further, it is beneficial to minimize pressure drop across the valve and increase its efficiency. However, increasing lift of the sealing element within the reciprocating gas compressor can require the overall area for lift and to accommodate an enlarged diameter for holes. However, large seat holes can cause extrusion of the sealing element at high differential pressures and result in valve failure.

Therefore, a need exists to have a valve assembly with enhanced efficiency in operation while retaining maximum flow area possible and without compromising reliability. In addition, it is desired to eliminate an increased height of the seat so as to eliminate gas becoming trapped in the clearance space.

SUMMARY OF THE INVENTION

A reciprocating gas compressor valve is provided having a seat with a main body and a plurality of clusters of holes positioned along a common circular or annular locus in the main body. Each cluster of holes has two kidney shaped holes. The reciprocating gas compressor valve further comprises a sealing element having a top portion, a bottom portion and a tubular section. The top portion has a top profile. The tubular section is integrally connected to the top portion and bottom portion. The bottom portion is raised and has a bottom profile. In an open position, a flow pathway is provided through the clusters of kidney shaped holes and the tubular section and the bottom profile abuts a stop surface of the valve. In a closed position, the top profile abuts the seat for sealing gas flow within the valve.

BRIEF DESCRIPTION OF THE DRAWINGS

FIG. 13 is a top perspective view of an embodiment e sealing element;

FIG. 14 is a side elevational view thereof;

FIG. 15 is a top view thereof;

FIG. 16 is a bottom view thereof;

FIG. 17 is a cross-sectional view thereof;

FIG. 115 is a bottom view of thereof;

FIG. 116 is an overall perspective view of the spacer ring of the reciprocating gas compressor valve of FIG. 104;

FIG. 117 is a top view and a bottom view thereof;

FIG. 118 is a side elevational view thereof;

FIG. 119 is a top view of the guard of the reciprocating gas compressor valve of FIG. 104;

FIG. 120 is a side view thereof; and

FIG. 121 is a bottom view thereof.

FIG. 122 is a top perspective view of an embodiment of the sealing element;

FIG. 123 is a side elevational view thereof;

FIG. 124 is a top view thereof;

FIG. 125 is a bottom view thereof;

FIG. 126 is a cross-sectional view thereof;

Figure 1:
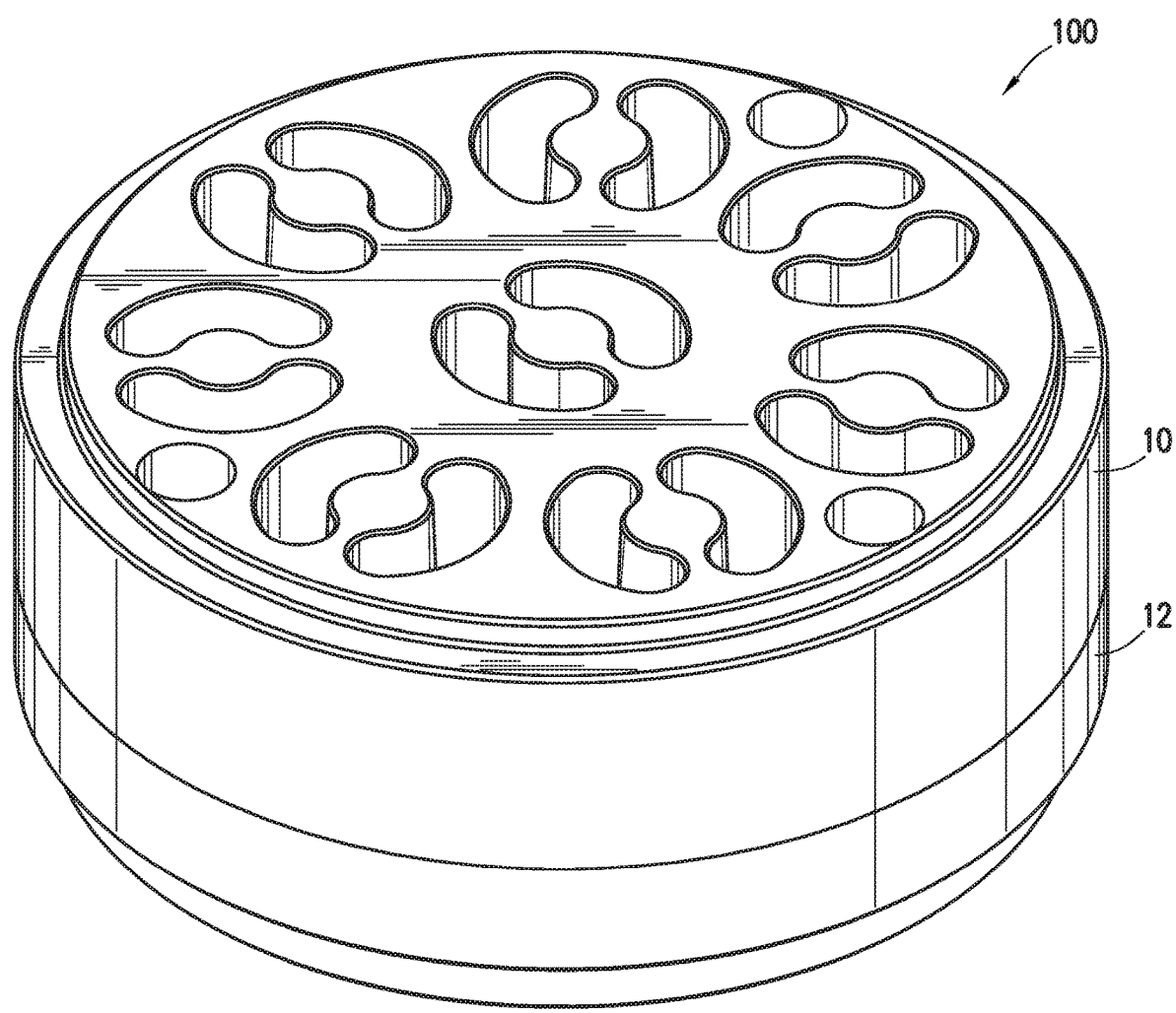
FIG. 1 is an overall perspective view of an embodiment of the reciprocating gas compressor valve.
Figure 127:
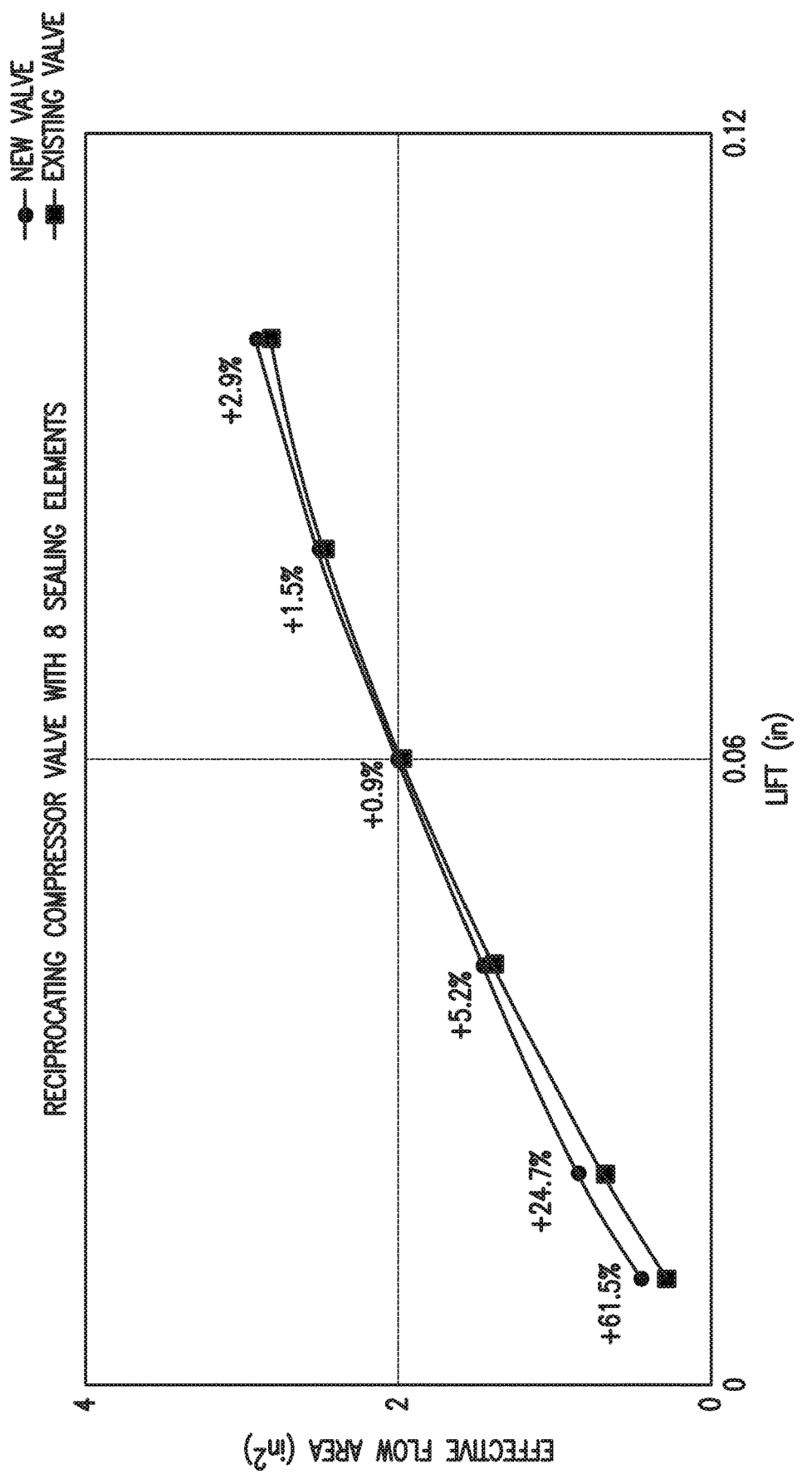
Figure 128:
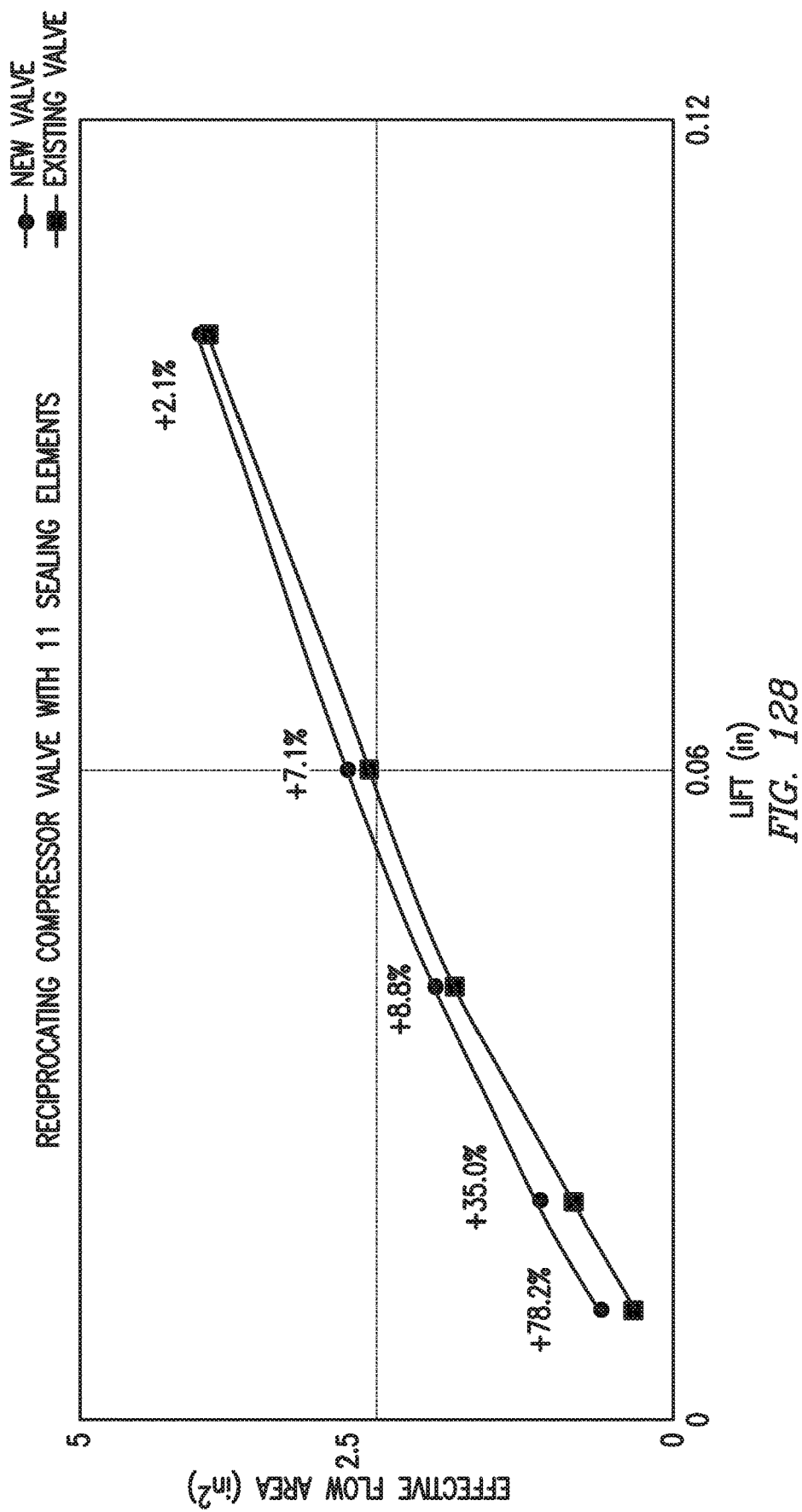

FIG. 127 shows data of effective flow area versus lift for a reciprocating compressor valve shown in FIG. 1 having eight (8) sealing elements shown in FIGS. 122 to 126; and FIG. 128 show data of effective flow area versus lift for a reciprocating compressor valve shown in FIG. 1 having eight (8) sealing elements shown in FIGS. 122 to 126.

DETAILED DESCRIPTION

As shown in the figures, reciprocating gas compressor valve 100 (sometimes referred to as the "gas compressor valve," "compressor valve" or "valve) comprises a seat 10 (also referred to as a seating plate), a guard 12 (also referred to as a guard plate), a sealing element 20 and a spring 22. The seat 10 comprises a main body 94 and a plurality of clusters of holes 16. The sealing element 20 comprises a tubular section 24 connected to the top portion 19. Together, the top portion 19 and the tubular section 24 of the sealing element 20 provide a flow pathway 32 for gas. Thus, in an open position, gas can flow through the plurality of clusters of holes 16 through the tubular section 24 of the sealing element 20.

Figure 2:
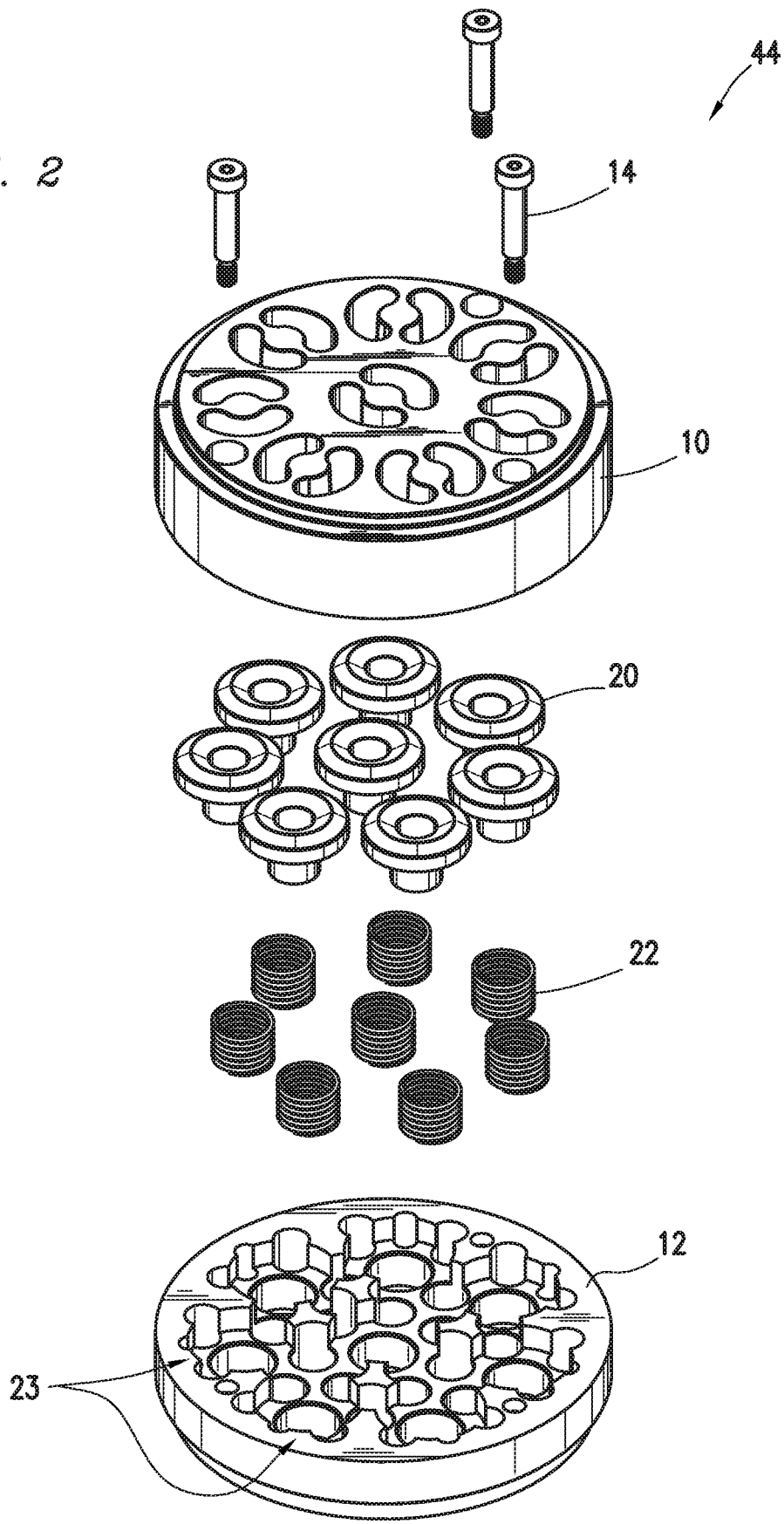
FIG. 2 is an overall exploded perspective view thereof.
Figure 3:
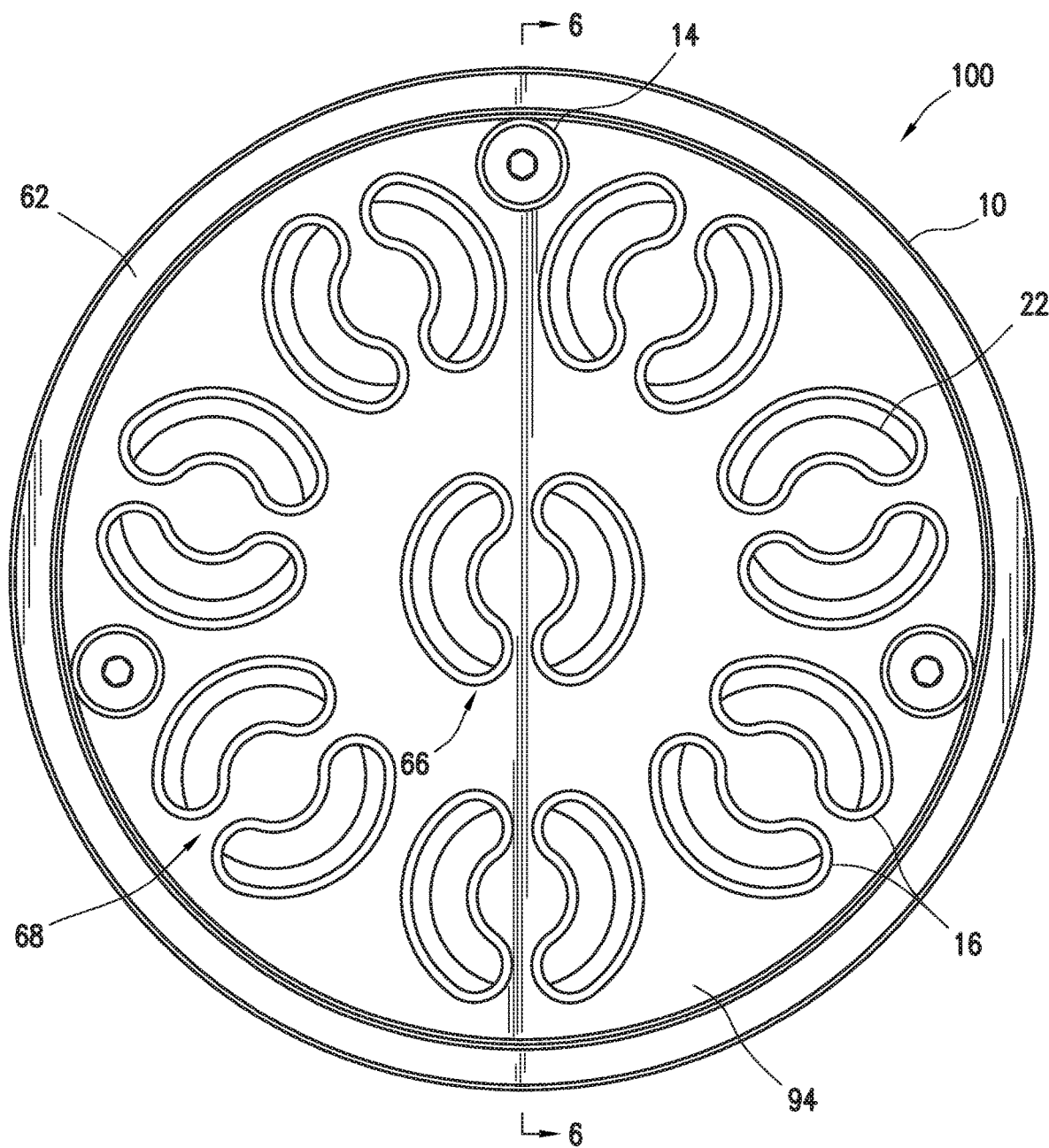
FIG. 3 is an overall top view thereof.
Figure 4:
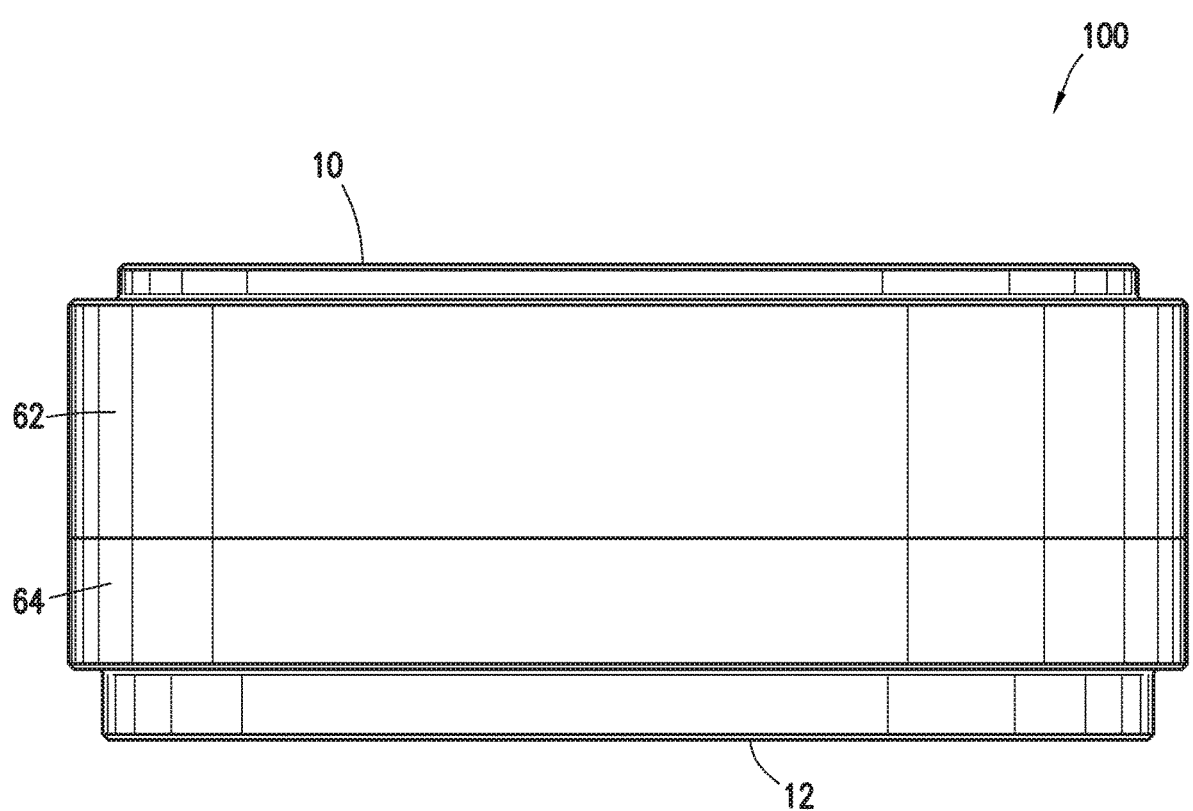
FIG. 4 is an overall side elevational view thereof.
Figure 10:
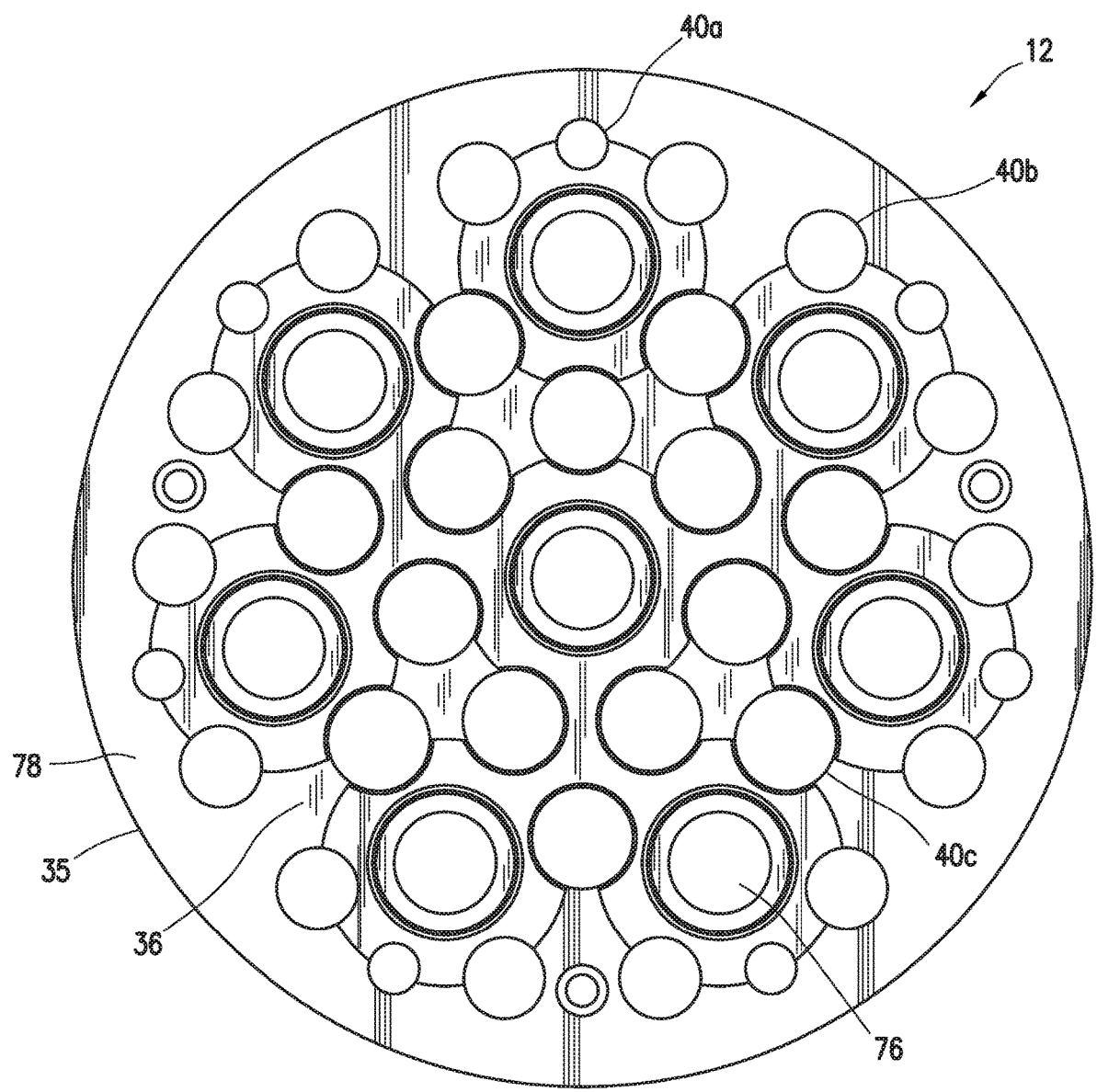
FIG. 10 is an overall top view of the guard of the reciprocating gas compressor valve of FIG. 1.
Figure 11:
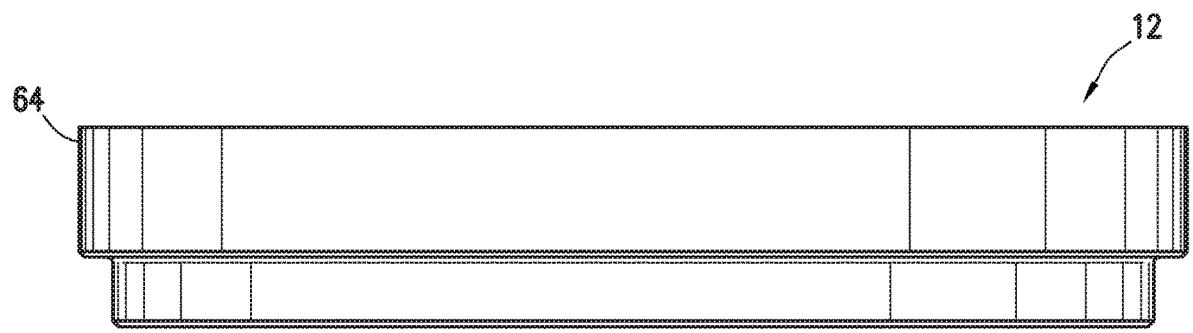
FIG. 11 is a side devotional view of the guard thereof.
Figure 12:
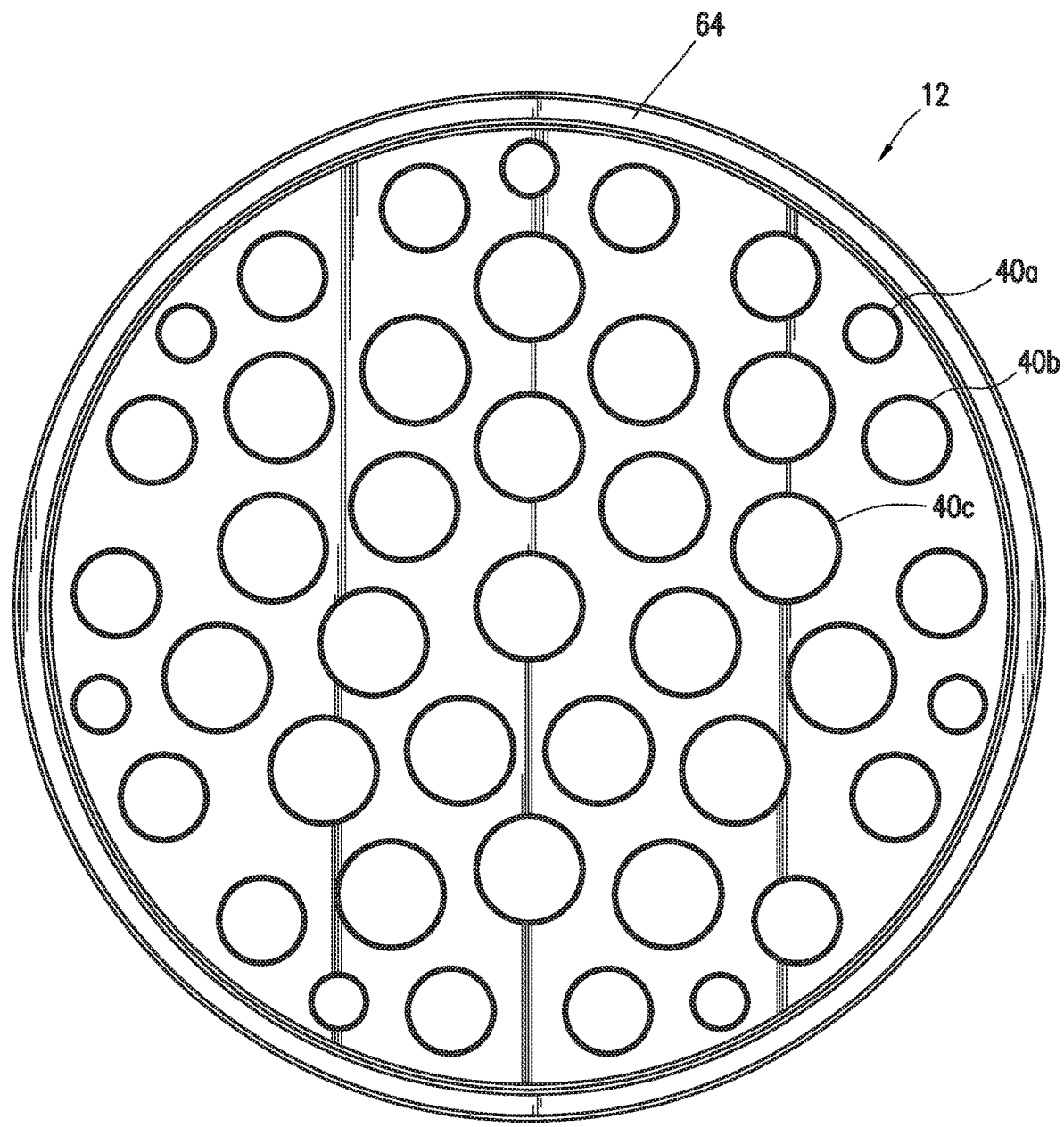
FIG. 12 is a bottom view of the guard thereof.
Figure 18:
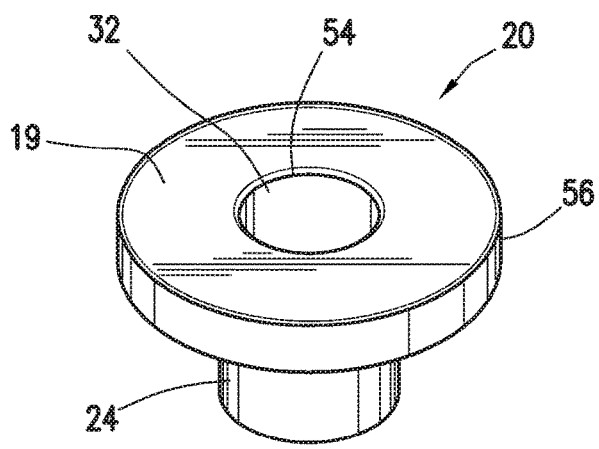
FIG. 18 is a top perspective view of an embodiment of the sealing e ent.
Figure 19:
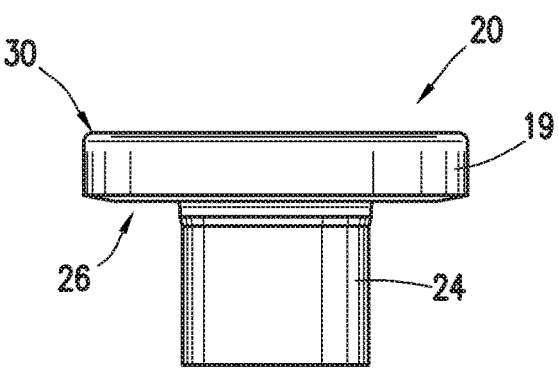
FIG. 19 is a side elevational view thereof.
Figure 20:
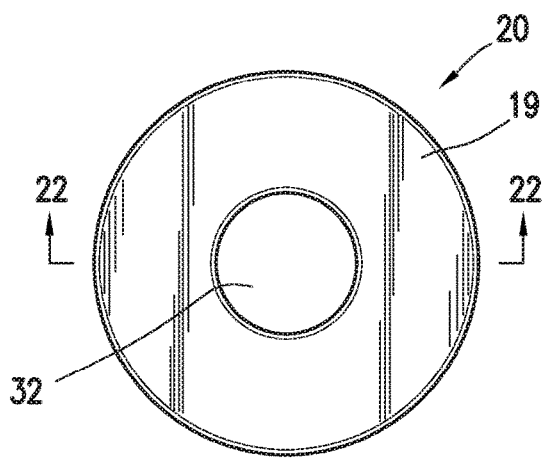
FIG. 20 is a top view thereof.
Figure 21:
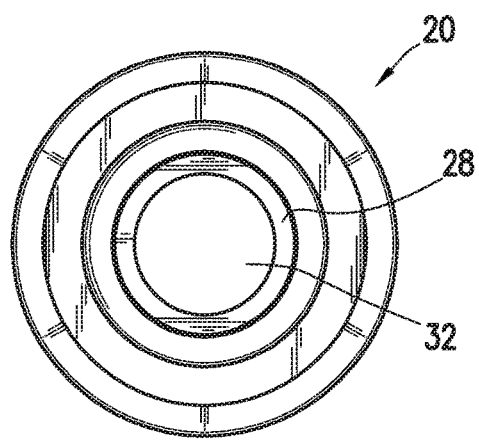
FIG. 21 is a bottom view thereof.
Figure 22:
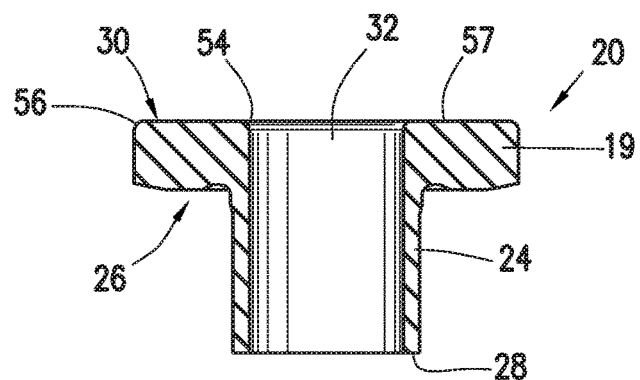
FIG. 22 is a cross-sectional view thereof.
Figure 23:
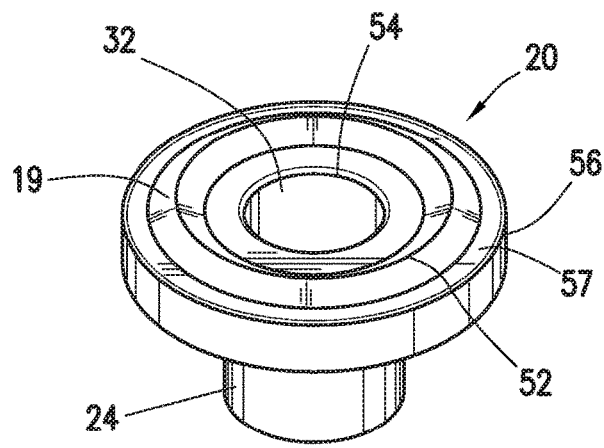
FIG. 23 is a top perspective view of an embodiment of the sealing element.
Figure 24:
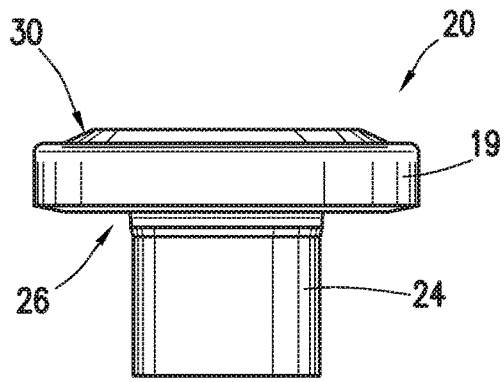
FIG. 24 is a side elevational view thereof.
Figure 25:
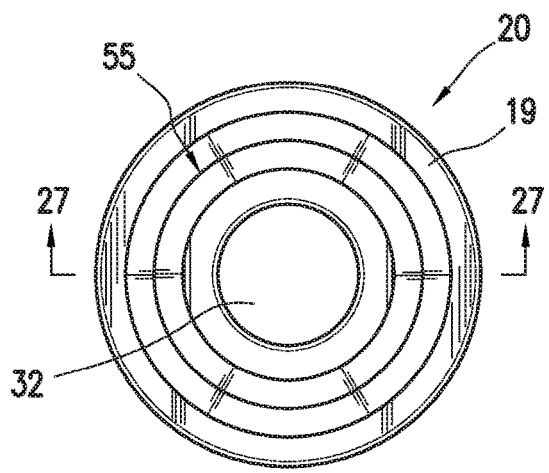
FIG. 25 is a top view thereof.
Figure 26:
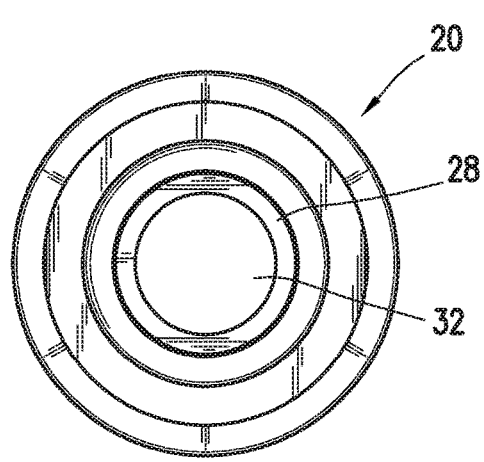
FIG. 26 is a bottom view thereof.
Figure 27:
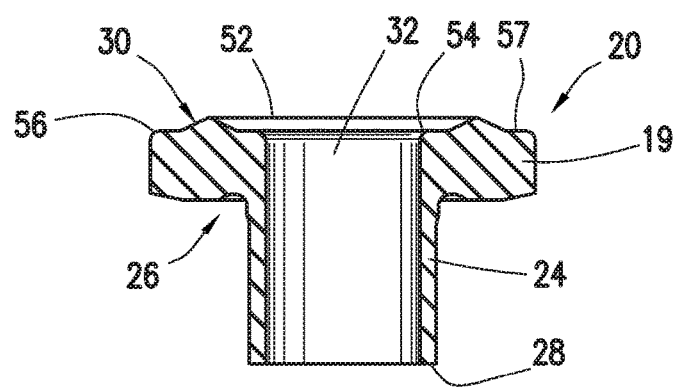
FIG. 27 is a cross-sectional view thereof.
Figure 28:
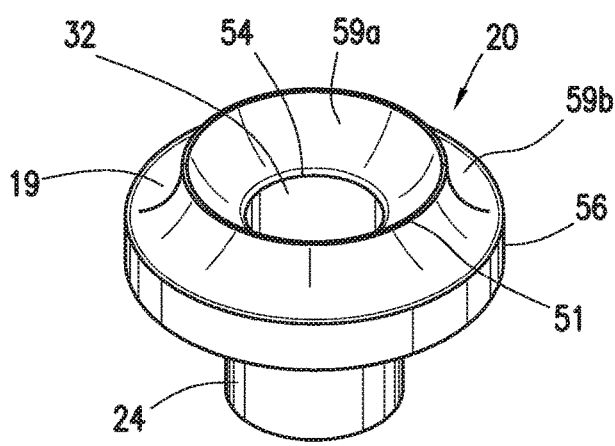
FIG. 28 is a top perspective view of an embodiment of the sealing element.
Figure 29:
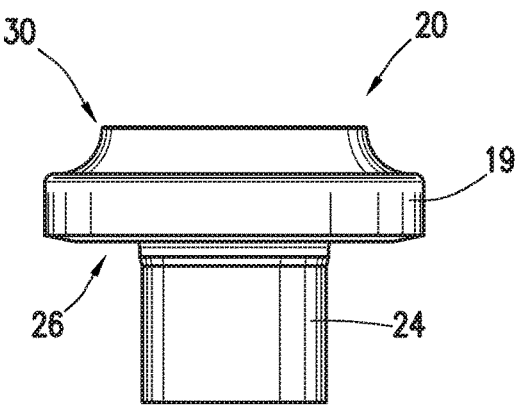
FIG. 29 is a side elevational view thereof.
Figure 30:
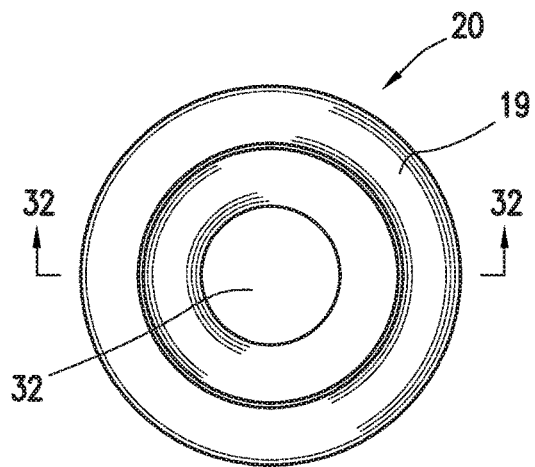
FIG. 30 is a top view thereof.
Figure 31:
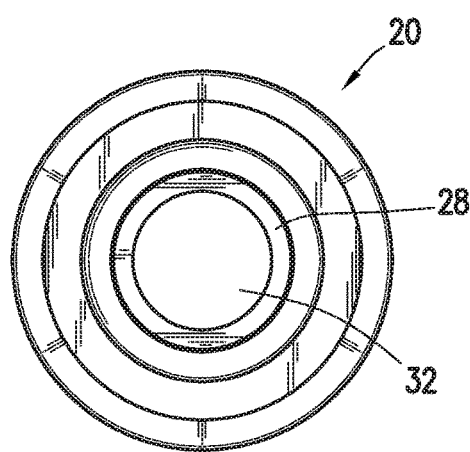
FIG. 31 is a bottom view thereof.
Figure 32:
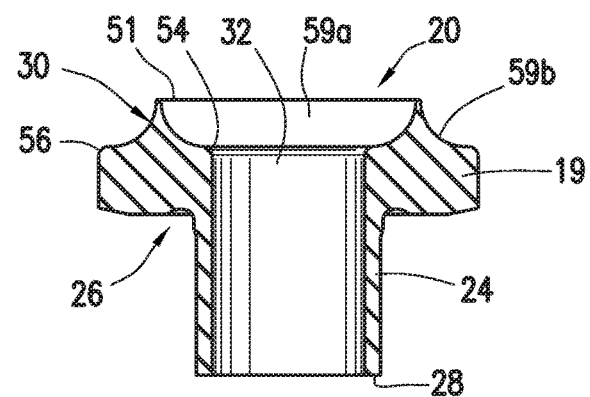
FIG. 32 is a cross-sectional view thereof.
Figure 33:
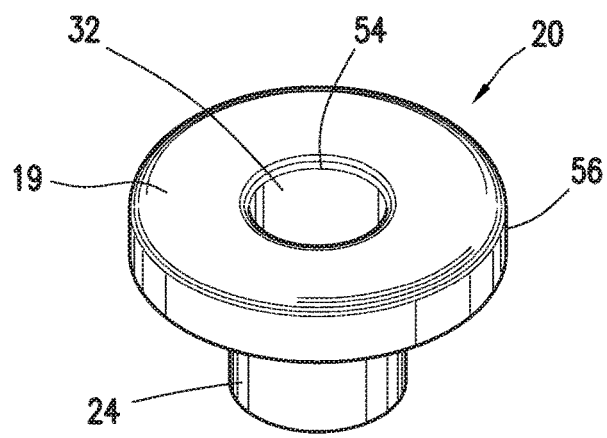
FIG. 33 is a top perspective view of an embodiment of the sealing element.
Figure 34:
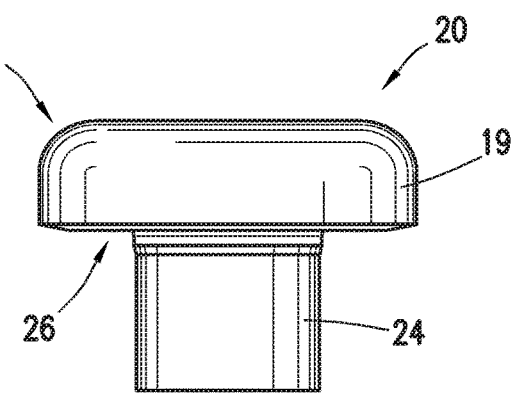
FIG. 34 is a side elevational view thereof.
Figure 35:
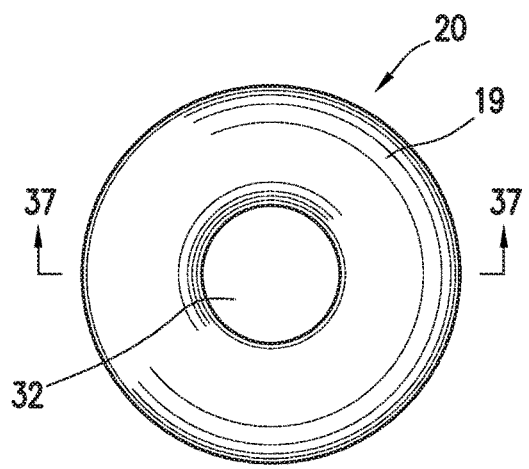
FIG. 35 is a top view thereof.
Figure 36:
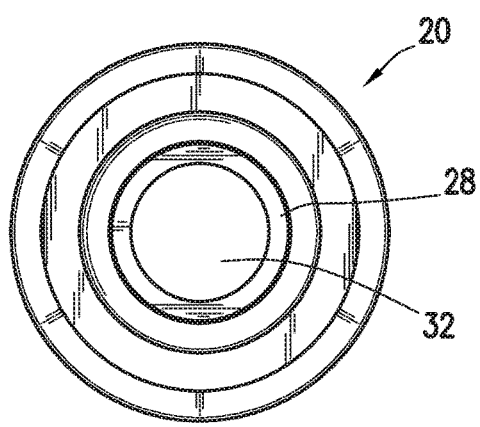
FIG. 36 is a bottom view thereof.
Figure 37:
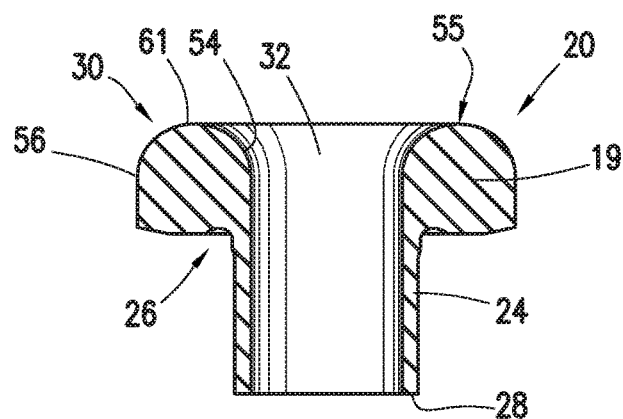
FIG. 37 is a cross-sectional view thereof.
Figure 38:
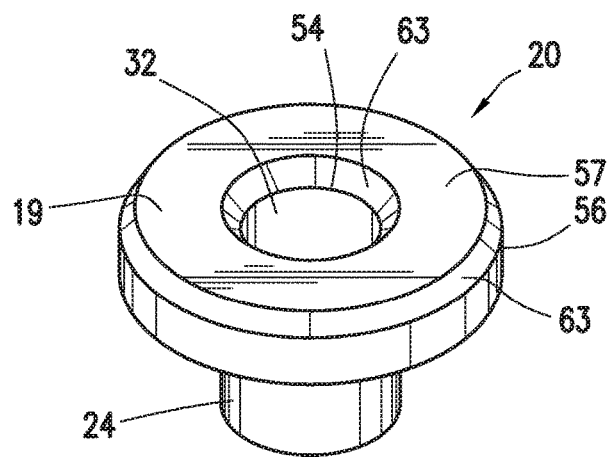
FIG. 38 is a top perspective view of an embodiment of the sealing element.
Figure 39:
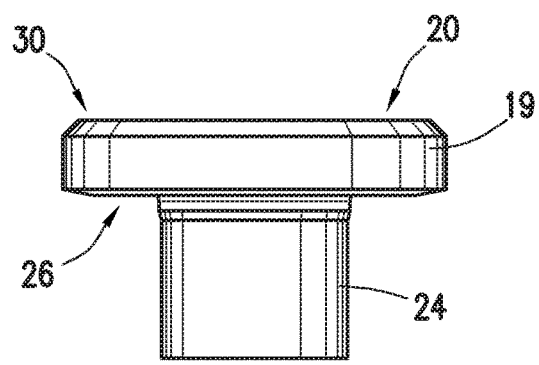
FIG. 39 is a side elevational view thereof.
Figure 40:
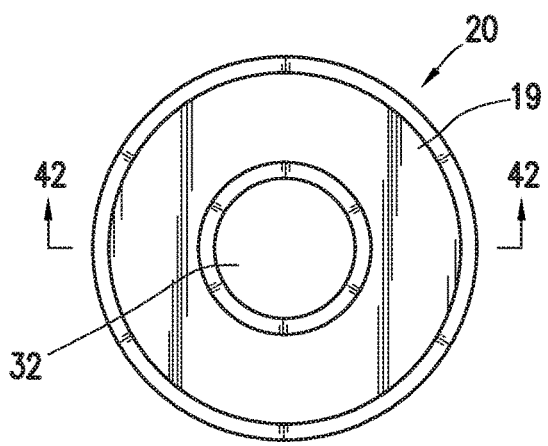
FIG. 40 is a top view thereof.
Figure 41:
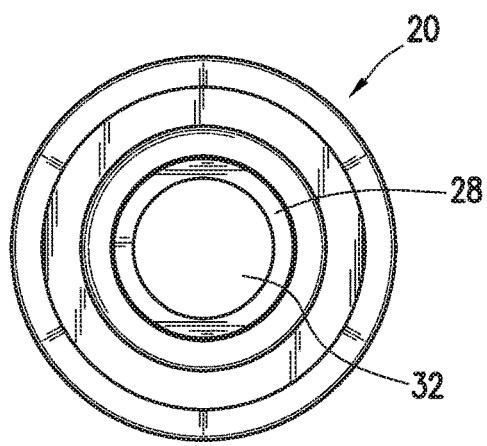
FIG. 41 is a bottom view thereof.
Figure 42:
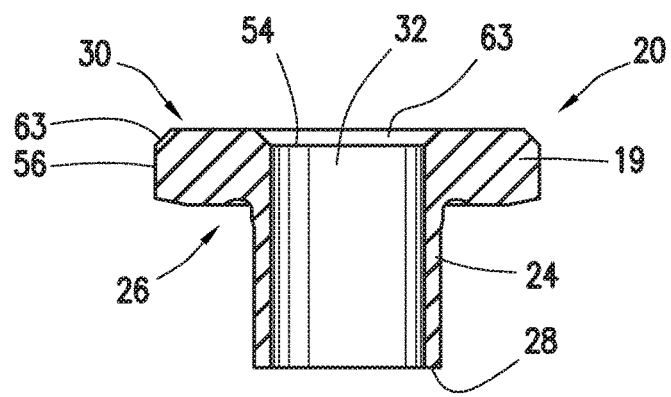
FIG. 42 is a cross-sectional view thereof.
Figure 43:
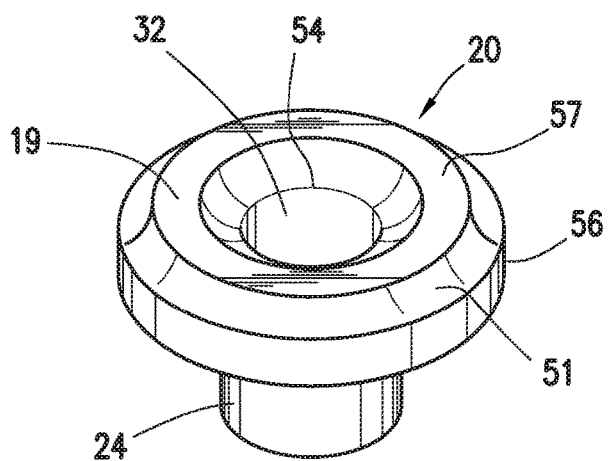
FIG. 43 is a top perspective view of an embodiment of the sealing element.
Figure 44:
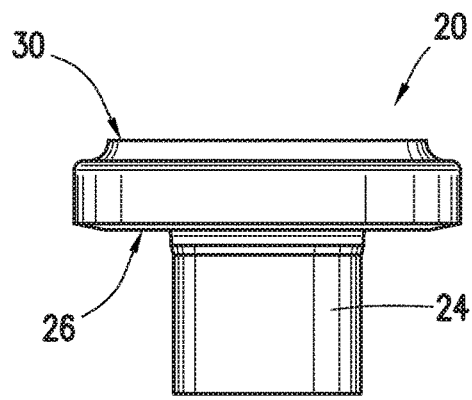
FIG. 44 is a side elevational view thereof.
Figure 45:
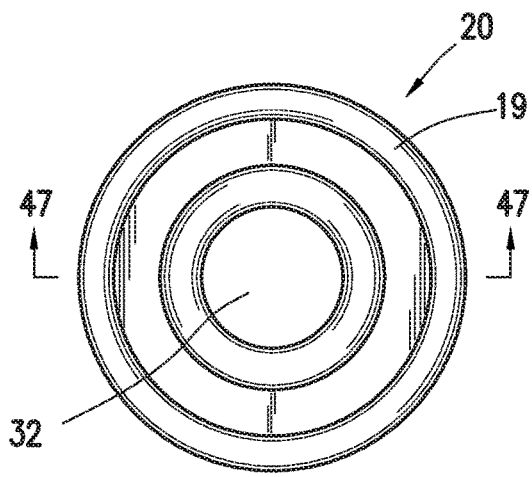
FIG. 45 is a top view thereof.
Figure 46:
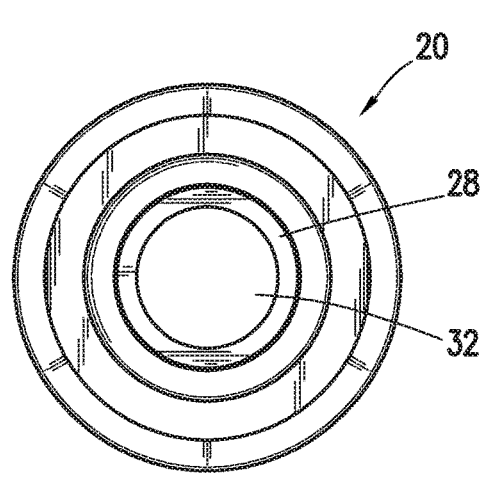
FIG. 46 is a bottom view thereof.
Figure 47:
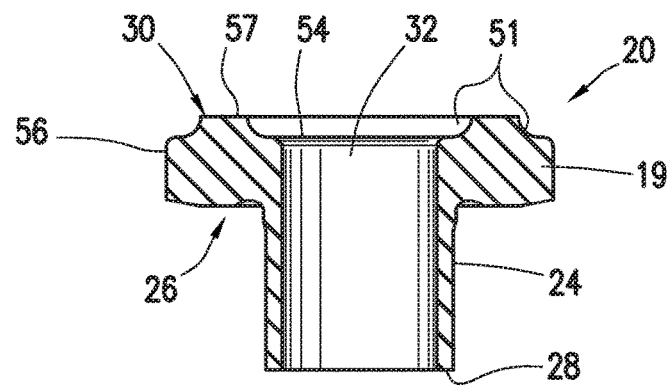
FIG. 47 is a cross-sectional view thereof.
Figure 48:
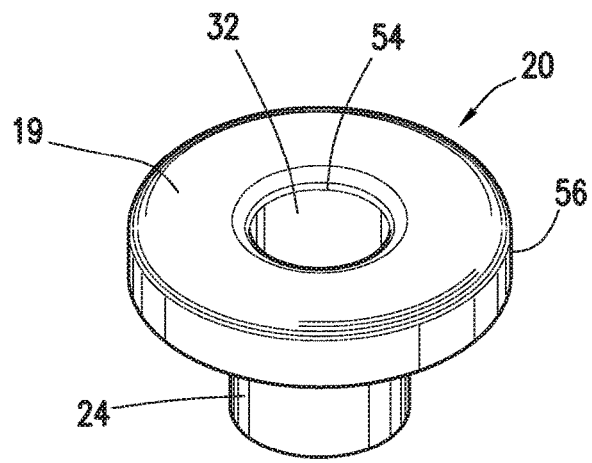
FIG. 48 is a top perspective view of an embodiment of the sealing element.
Figure 49:
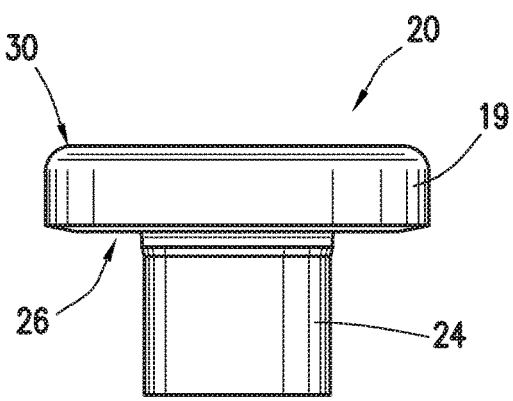
FIG. 49 is a side elevational view thereof.
Figure 50:
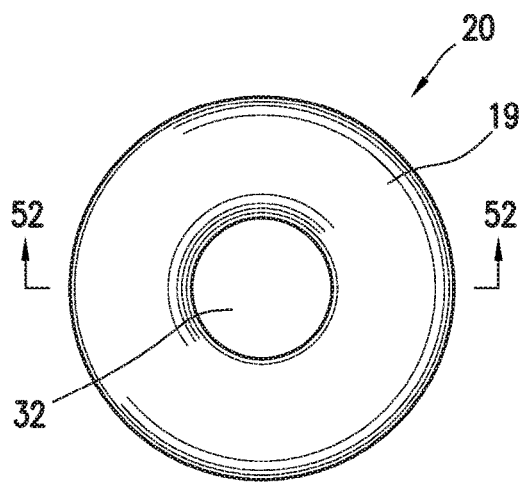
FIG. 50 is a top view thereof.
Figure 51:
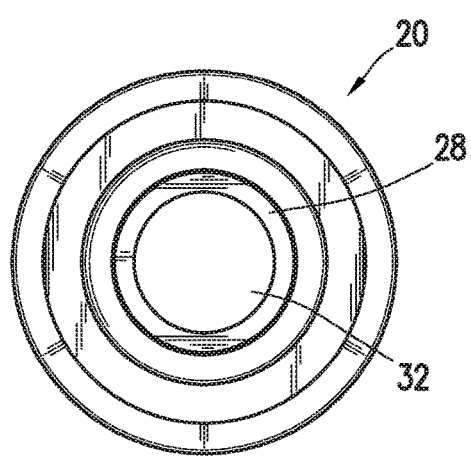
FIG. 51 is a bottom view thereof.
Figure 52:
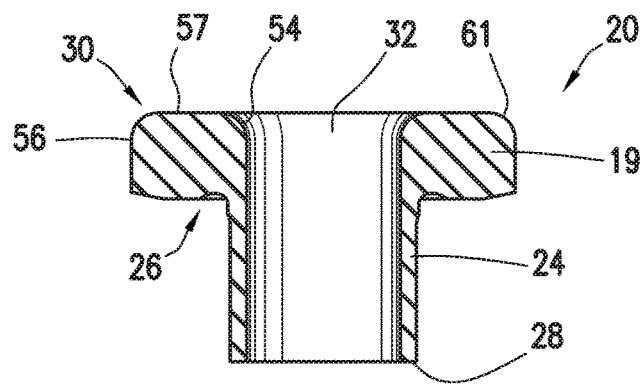
FIG. 52 is a cross-sectional view thereof.
Figure 53:
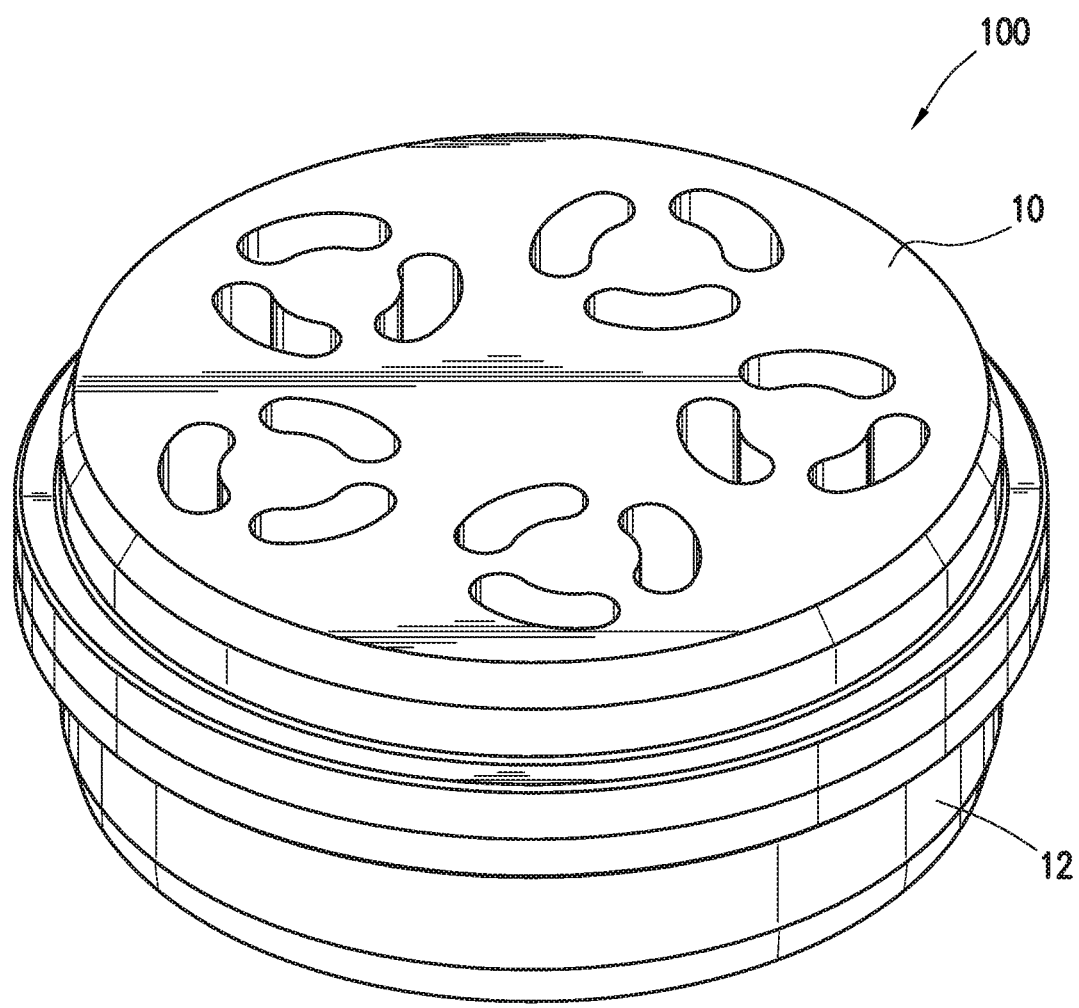
FIG. 53 is an overall perspective view of an embodiment of the reciprocating gas compressor valve.

The seat 10 comprises a main body 94 having the plurality of clusters of holes 16. Each of the clusters of holes 16 extend longitudinally from an outer side 60 of the seat 10. The reciprocating gas compressor valve 100 can optionally comprise a guard 12. The guard 12 has a plurality of openings 40a, 40b, 40c, and a port 76, each port corresponding with one of the cluster of holes 16 in the seat 10. In an embodiment, the seat 10 and the guard 12 can be assembled together as a valve assembly 44 (FIG. 2). Here, the sealing element 20 and the spring 22 are contained in the valve assembly 44. The guard 12 can have a stop surface 89 in a spaced relationship from seating surfaces 72 and 74 of the seat 10 and associated with each cluster of holes 16 and shown in FIG. 10 through FIG. 12. See also, U.S. Pat. No. 5,511,583, Col. 41. 22 through 29, incorporated herein by reference. The guard 12 has flow passages from an inner side thereof to an outer side which communicate with the space between the stop surface 89 and the seat 10.

The sealing element 20 has the tubular section 24 integrally connected to the top portion 19 of the sealing element 20 having an inner diameter 54 and an outer diameter 56. See e.g., FIGS. 13 through 52. The top portion 19 of the sealing element 20 has a top profile 30.

FIGS. 13 to 17 show an embodiment of the sealing element 20 with the top profile 30 having an angled V-shaped profile shape 52 having the inner diameter 54 and the outer diameter 56 rounded. With the angled V-shaped profile shape 52, gas flow is guided from the seat inlet holes 16 to guard outlet holes 40a, 40b, 40c and 76. The contour 53 of the seating surfaces 72 and 74 corresponds to the profile shape 52 ensuring that sufficient sealing is achieved in the closed position and when the top profile 30 is in contact with the seating surfaces 72 and 74.

FIGS. 18 to 22 show an embodiment of the sealing element 20 with the top profile 30 having a flat-shaped profile shape 57 and the inner and outer diameters 54, 56 being rounded. In this embodiment, the contour 53 (not shown) of the seating surfaces 72 and 74 corresponds to the flat-shaped profile shape 57 to ensure that sufficient sealing is achieved in the closed position and when the top profile 30 is in contact with the seating surfaces 72 and 74.

FIGS. 23 to 27 show an embodiment of the sealing element 20 with the top profile 30 having a combination of the angled V-shaped profile shape 52 and the flat-shaped profile shape 57 having the inner diameter 54 and outer diameter 56. The angled V-shaped profile shape 52 is approximately at a mid-point 55 between the inner diameter 54 and the outer diameter 56 and is designed to direct incoming gas flow from the holes 16 over the portion of the top profile having the flat-shaped profile shape 57 and to the guard outlet openings (40a, 40b and 40c). The portion of the top profile 30 having the flat-shaped profile shape 52 seals the valve when the top profile 30 is in contact with the seating surfaces 72 and 74.

FIGS. 28 to 32 show an embodiment of the sealing element 20 with the top profile 30 having a concave-shaped profile shape 51 with two concave shaped curves 59a, 59b which flatten at the inner diameter 54 and the outer diameter 56 of the sealing element 20. The concave shaped curves 59a, 59b are designed to direct incoming gas flow from the holes 16 to the guard outlet holes 40a, 40b, 40c. The line of contact between concave shaped curves 59a, 59b can be rounded as well as the inner diameter 54 and the outer diameter 56. The seating surfaces 72, 74 seal the valve 10 when the top profile 30 is in contact with seating surfaces 72, 74.

FIGS. 33 to 37 show an embodiment of the sealing element 20 with the top profile 30 having a U-shaped profile shape 61 sloping downward symmetrically from the mid-point 55 between the inner diameter 54 and the outer diameter 56 of the sealing element 20. FIGS. 38 to 42 show an embodiment of the sealing element 20 with the top profile 30 having the flat-shaped profile shape 57 with chamfers 63 at the inner diameter 54 and the outer diameter 56. The chamfers 63 serve several purposes including directing gas flow from holes 16 to the guard openings 40a, 40b, 40c when the valve is in an open position. FIGS. 43 to 47 show an embodiment of the sealing element 20 with the top profile 30 having a combination of the flat-shaped profile shape 57 and the concave-shaped profile shape 51. FIGS. 48 to 52 show an embodiment of the sealing element 20 with the top profile 30 having a combination of the flat-shaped profile shape 57 and U-shaped profile shape 61. The flat-shaped profile shaped 57 is at the mid-point 55 and the U-shaped profile shape 61 is positioned at the inner diameter 54 and the outer diameter 56.

A bottom profile 26 of the sealing element 20 abuts the stop surface 89 of the guard 12. Having a specially designed bottom profile 26 of the sealing element 20, static friction is reduced. Further, as shown in the figures, the bottom profile 26 of the sealing element 20 is raised to reduce the area in contact with a guard 12, producing less friction in high oil applications and increasing reliability of the valve in operation.

The sealing element 20 can be machined from off the shelf rings of hard plastic, and more specifically, of a polymeric material which is high impact resistant, as well as chemical and heat resistant, or molded to reduce manufacturing costs. Each sealing element 20 can be of large and small size variations as shown in the drawings and to simplify tooling and production. To accommodate a range of valve sizes, the number of clusters are increased or decreased in order to allow for different valve sizes. The number of clusters can vary according to the number of holes 16 and openings 40a, 40b, 40c and 40d. The smaller sized sealing element results in a higher number of clusters which in turn make efficient use of available smaller surface area. The size of the sealing element 20 can be standardized not only for a given valve, but over the various sizes of reciprocating gas compressor valves 100, as shown in Table 1.

TABLE I

Multiple Sealing Elements Used in Compressor Valve 100

| Sealing Element Size | Valve Size (in inches) |
|---|---|
| Small | <5 |
| Medium | between 4 and 14 |
| Large | >10 |

The tubular section 24 streamlines gas flow through center of the tubular section 24, The tubular section 24 directs gas flow in an outward direction through the port 76. A minimal amount of gas flow is in contact with the spring 22 because the spring is shielded to reduce turbulence in gas flow and the amount of pressure drop. Hence, gas flowing through the sealing element 20 experiences a lower pressure drop and has a higher flow rate as a result of the reduced turbulence in the gas. Hence, gas flowing through the sealing element 20 has a higher flow rate as a result of the reduced turbulence in the gas. The turbulence can be as much as 60 percent lower because of the elimination of gas contact with the spring 22 in the spring pocket region (not shown). The spring 22 is protected from debris because gas flow is directed outward through the tubular region. In the reciprocating gas compressor valve 100, each cluster 66 or 68 of holes 16 comprises two kidney shaped holes 16 that improve the structural integrity of the seat 10. Further, the gas compressor valve 100 can be made having a thinner seat 10 that also results in lower manufacturing costs and reduced clearance volume. Therefore, the seat 10 can be constructed for maximum possible flow intake without compromising the strength of the seat 10.

Figure 5:
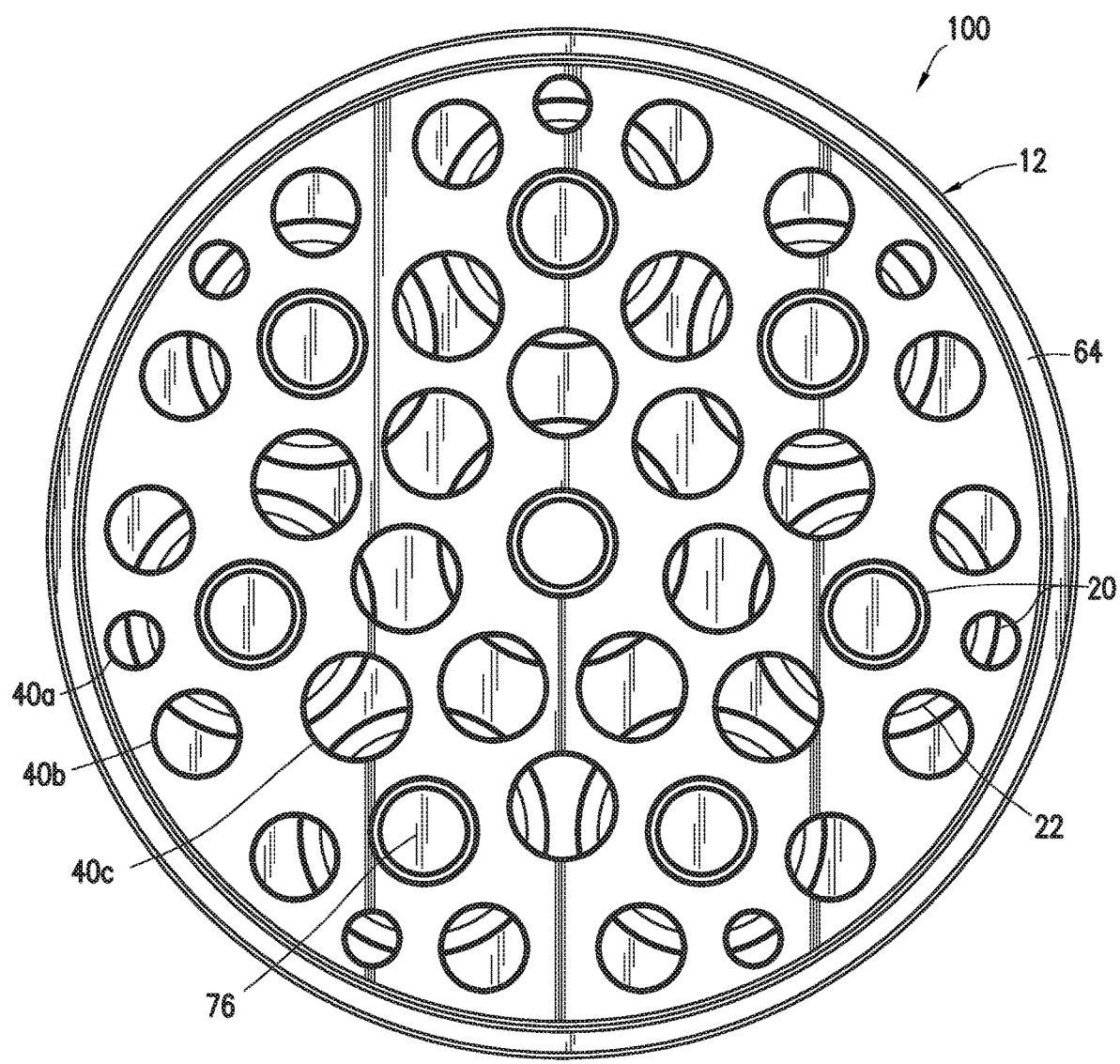
FIG. 5 is a bottom view thereof.
Figure 6:
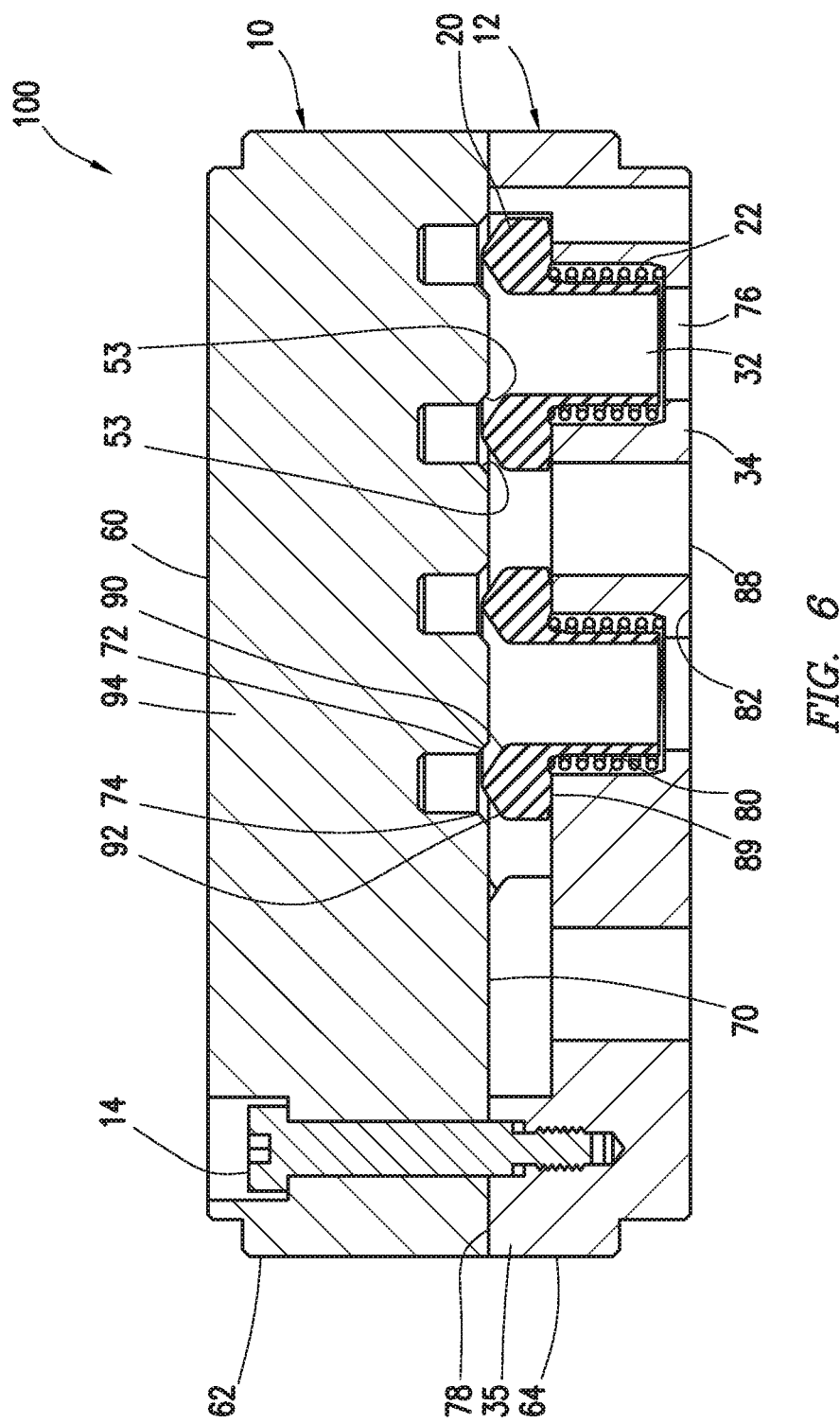
FIG. 6 is a cross-sectional view of the reciprocating gas compressor valve of FIG. 3.
Figure 7:
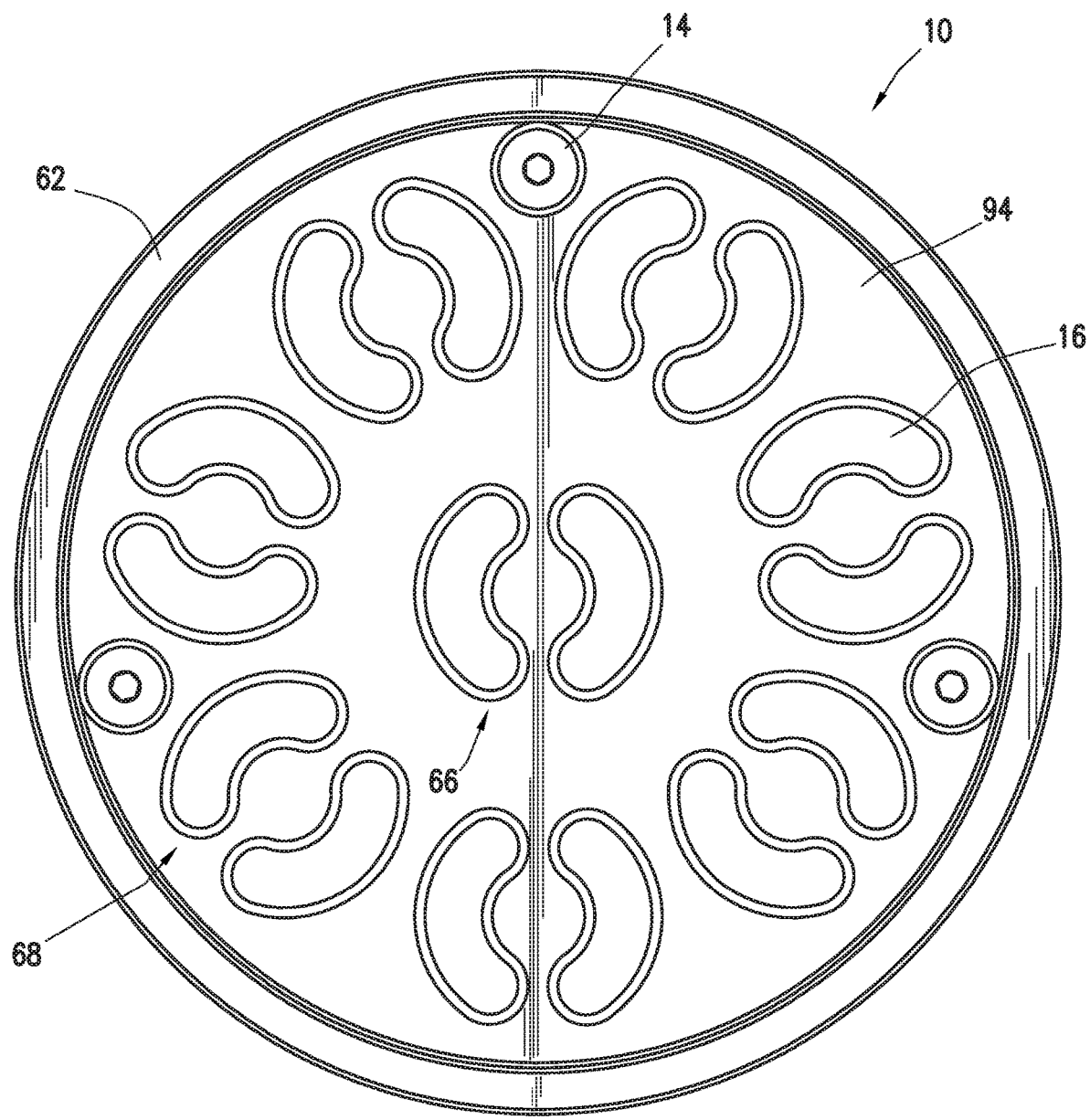
FIG. 7 is an overall top view of the seat of the reciprocating gas compressor valve of FIG. 1.
Figure 8:
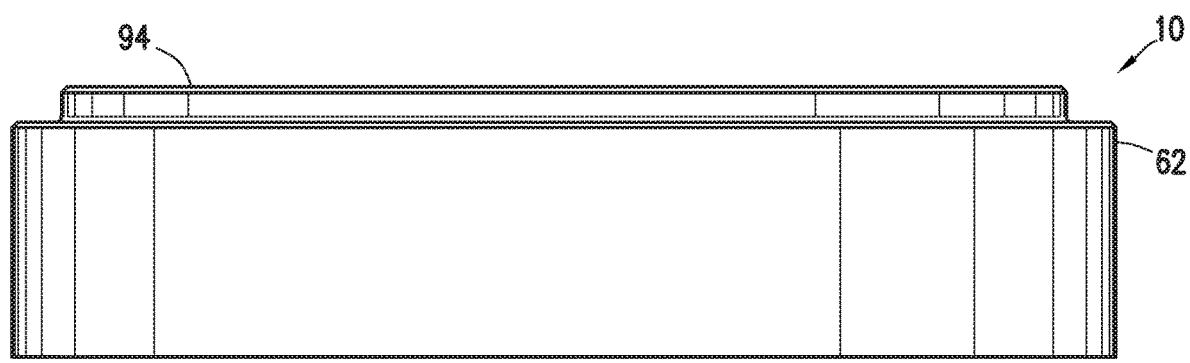
FIG. 8 is a side devotional view of the seat thereof.
Figure 9:
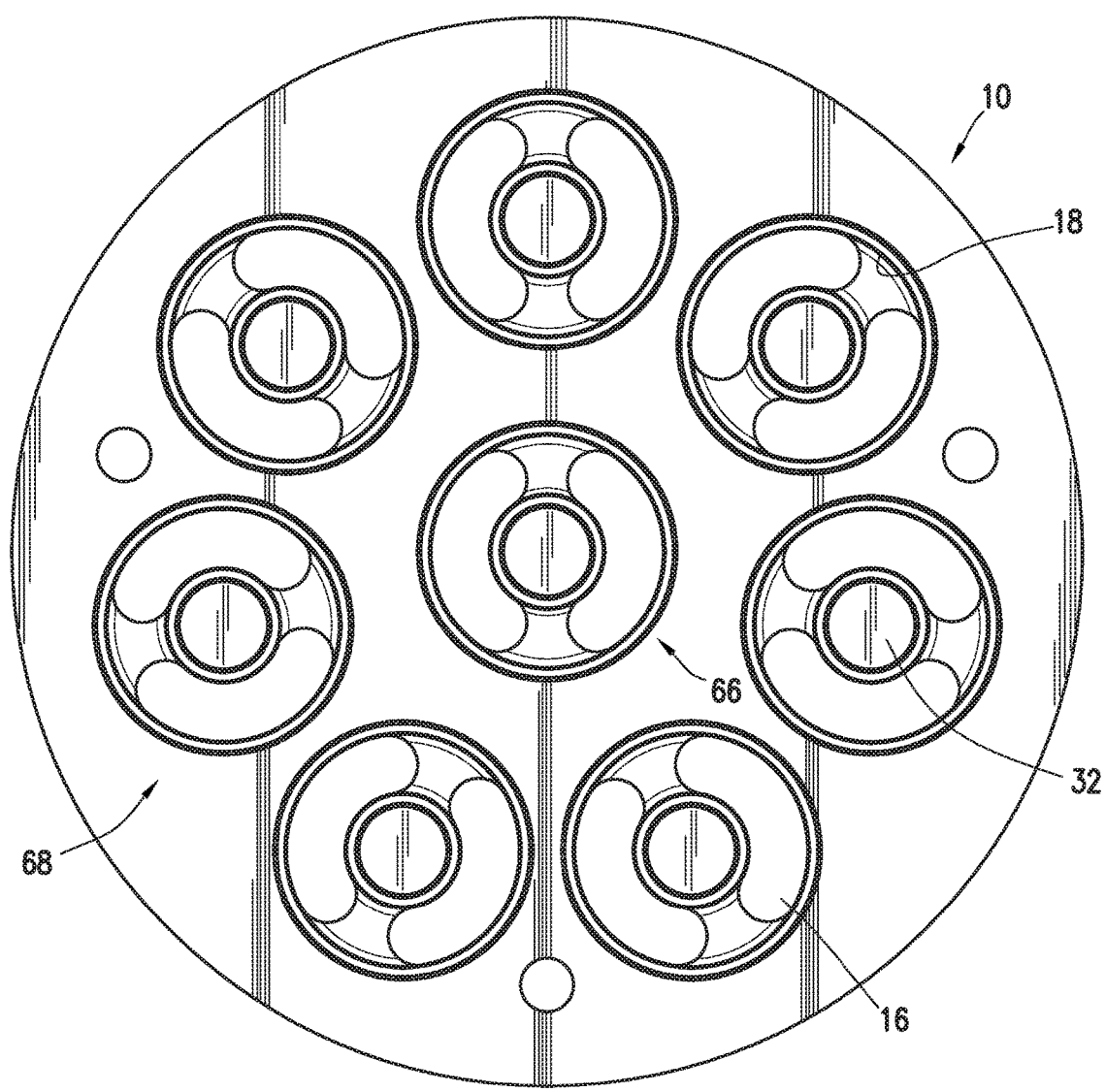
FIG. 9 is a bottom view of the seat thereof.

In an embodiment, the guard 12 can have a plurality of guides 34. See e.g., FIG. 10. The interior of each of the guides 34 provides a port 76 generally aligned with one of the clusters of holes 16 and an annular aperture 18 (FIG. 5). The inner side 78 of rim 35 of guard 12 abuts the inner side 70 of the seat 10, but the guides 34 do not (FIG. 6). Except for the guides 34 and sufficient interconnecting members 36 to connect cylinders 34 to the plate rim 35, guard 12 is completely open.

In an embodiment, each of the ports 76 has two sections or portions: a first portion 80 sized to slideably receive the spring 22, and a second portion 82 opening outwardly through the outer side 88 of guard 12. The top of guide 34 provides an annular stop surface 89 spaced from the inner side 70 of the seat 10. Each port 76 is sized to receive a spring 22 where the spring 22 rests upon a shoulder formed within the port 76. The sealing element 20 can move reciprocally in the axial direction between a stop surface 89 of the guard 12 and the opposed seating surfaces 72 and 74 of the seat 10. Valve lift can be controlled by increasing or decreasing the distance between the stop surface 89 and the seating surfaces 72, 74. One side of the sealing element 20 abuts seating surfaces 72 and 74 when the valve is in the closed position. Sealing surfaces 90 and 92 generally correspond to the seating surfaces 72 and 74. The seating surfaces 72 and 74 are sized and shaped to engage with the sealing element 20 and to create a seal between the sealing element 20 and seating surfaces 72 and 74. In an embodiment, the spring 22 can be supported by the guard 12 to engage the sealing element 20 and to bias the sealing element 20 toward the seating surfaces 72 and 74 of seat 10.

As shown in FIG. 2, in an embodiment, the seat 10 and the guard 12 can be secured together in opposing relation by a plurality of screws 14. Furthermore, as shown in this embodiment, and others described herein, the reciprocating gas compressor valve 100 is oriented for use as an intake valve. However, it would be possible to use precisely the same form of valve as an exhaust valve by simply reversing its orientation, vertically. The seat 10 can have a thickness reduced at the periphery of its outer side 60 to form an annular, radially projecting flange 62. Similarly, the guard 12 can have a thickness reduced adjacent to the periphery of its outer side to form an abutting radially projecting annular flange 64 of similar width as flange 62 and aligned therewith, See e.g., FIG. 6. Thus, the flanges 62 and 64, in the assembly, jointly, form a flange whereby the valve may be mounted between the cage (not shown) and the cylinder pocket (not shown) of a reciprocating gas compressor.

As described herein, and shown in FIGS. 1 to 12 and FIGS. 53 to 112 in the reciprocating gas compressor valve 100, the seat 10 has a plurality of clusters 68 of holes 16 extending longitudinally into the plate from its outer side 60. More specifically, in one embodiment of the valve, each of the clusters comprises two holes 16a and 16b in the shape of kidneys positioned along a common circular or annular locus. The holes can be circular in shape wherein each cluster 66, 68 will have more than two holes 16. Each hole 16 is not only arcuate, when viewed in plan, but, as viewed longitudinally in the figures, each hole has a width tapering inwardly from the outer side 60 of the seat 10 toward its inner side 70. The hole 16 terminates short of inner side of the seat 70. Each hole 16 of each cluster 68 intersect a common annular aperture 18 which opens through the inner side of the seat 10 to define a seating surface 90, more specifically, the seating surface 90 with an inner annular seating surface 72 and an outer annular seating surface 74, adjacent the inner and outer diameters, respectively, of annular aperture 18. The seating surface 90 is preferably tapered toward the inner side 70 of the seat 10 but the seating surface 90 does not have to be tapered and can be flat. They may, for example, define either spherical or conical loci. As shown in the figures, one of the plurality of clusters 66 of holes 16 is central having the holes 16b, 16c, 16d and 16e spaced radially outwardly and circumferentially from one another.

As shown in FIGS. 13 through 52, the sealing element 20 of the reciprocating gas compressor valve 100 provided herein is generally planar on one side and has the bottom profile 26 for abutment with a stop surface 89. However, approximately midway between its inner and outer diameters, that side of the sealing element 20 is provided with an annular recess which receives one end coil of the spring 22. The sealing element 20 can travel between the closed position engaging the seating surfaces 72 and 74, and an open position engaging stop surface 89. The spring 22 will noun ally urge the sealing element 20 into its closed position. Whenever the pressure in the adjacent end of the gas compressor cylinder and the ports 76 is lower than the pressure of the gas being taken in to such a degree so as to overcome the force of the springs 22, the valves will open. When these pressure conditions are reversed, the valves will again be closed by the force of the springs 22.

Figure 80:
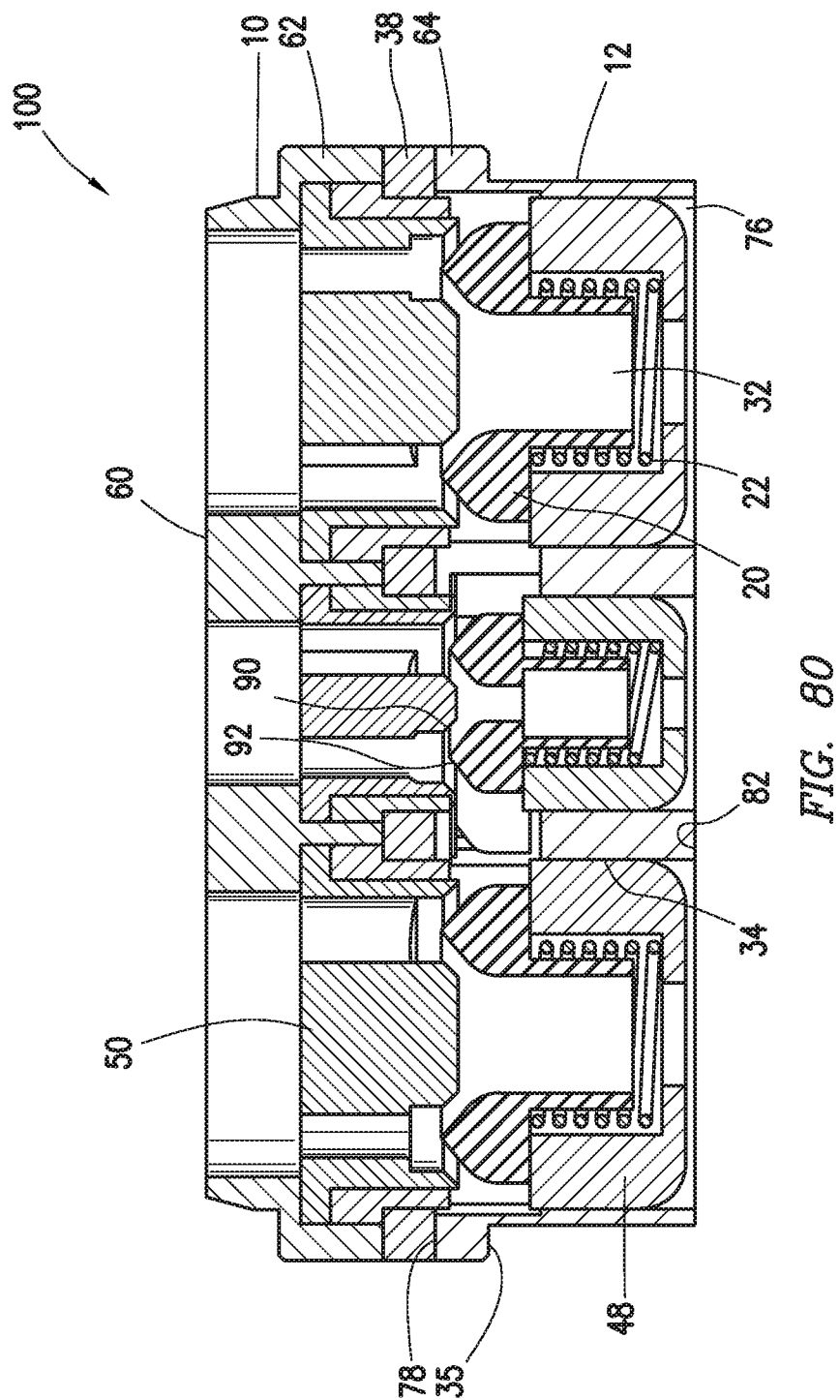
FIG. 80 is a cross-sectional view of the reciprocating gas compressor valve of FIGS. 3 and 75.
Figure 80A:
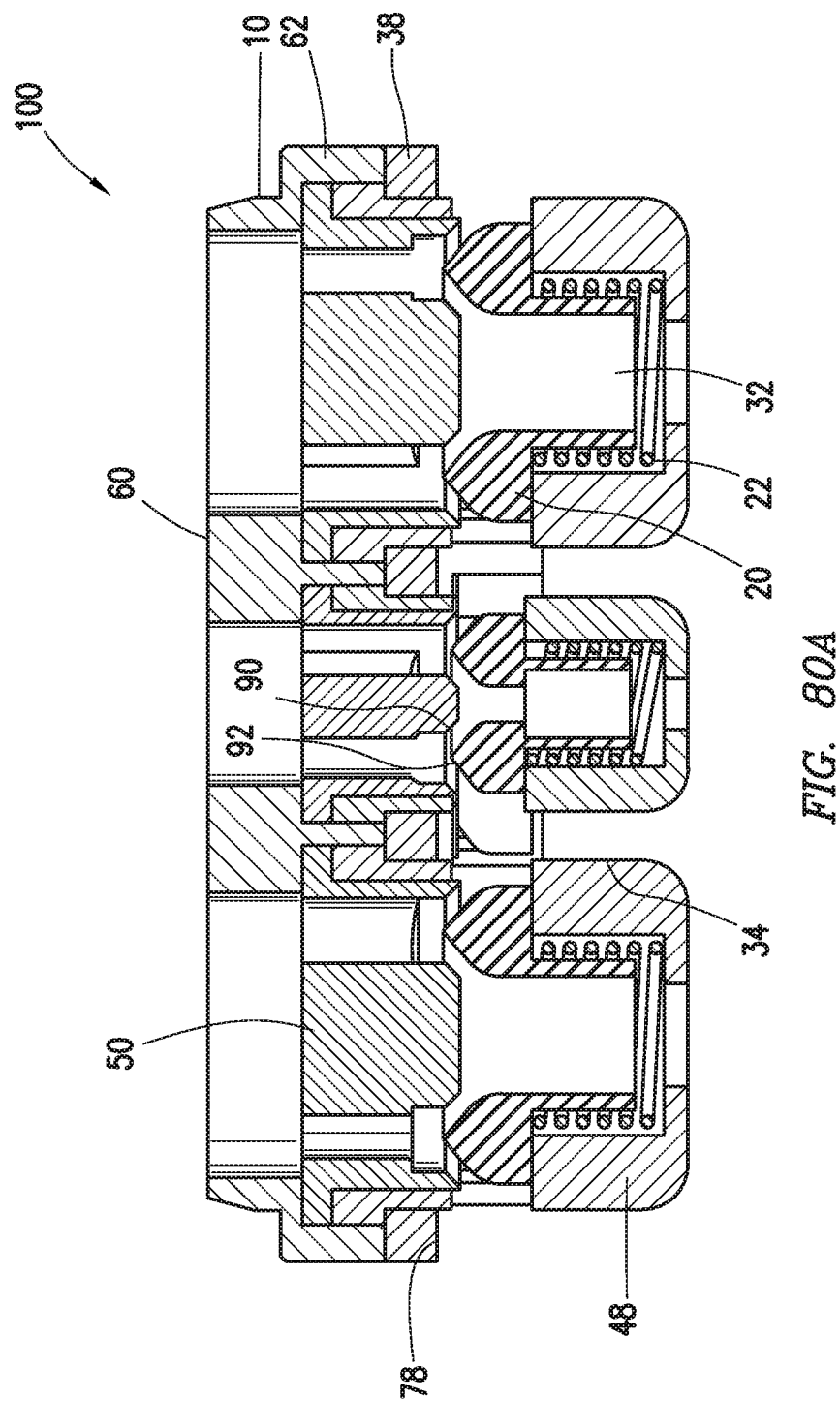
FIG. 80A is a cross-sectional view of the reciprocating gas compressor valve of FIG. 75A.
Figure 81:
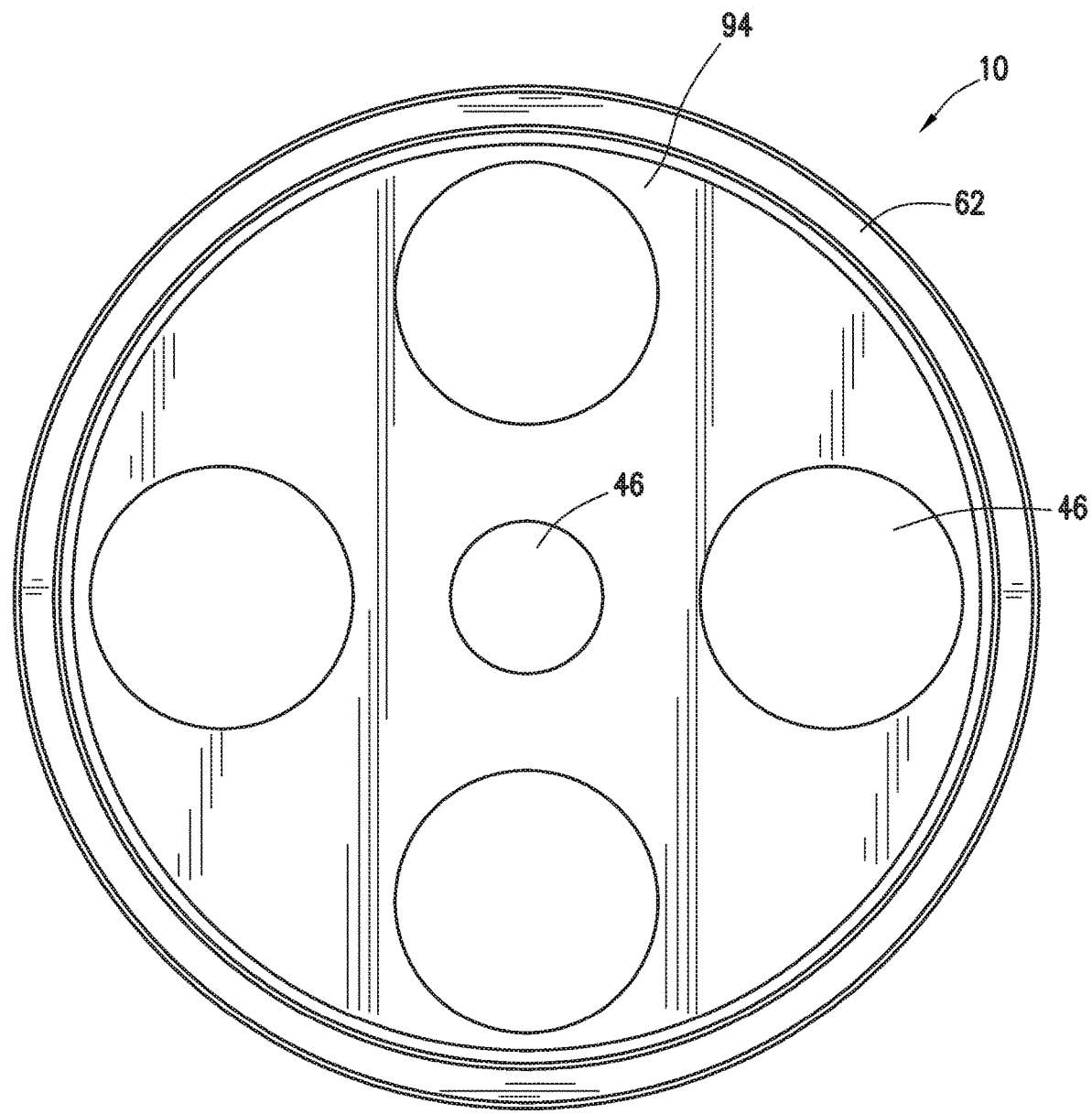
FIG. 81 is a top view of the seat of the reciprocating gas compressor valve of FIG. 1.
Figure 82:
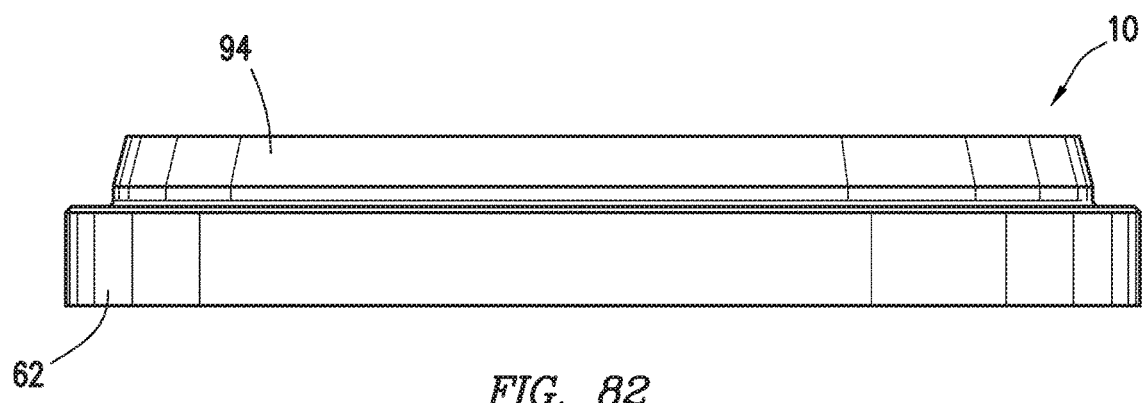
FIG. 82 is a side view thereof.
Figure 83:
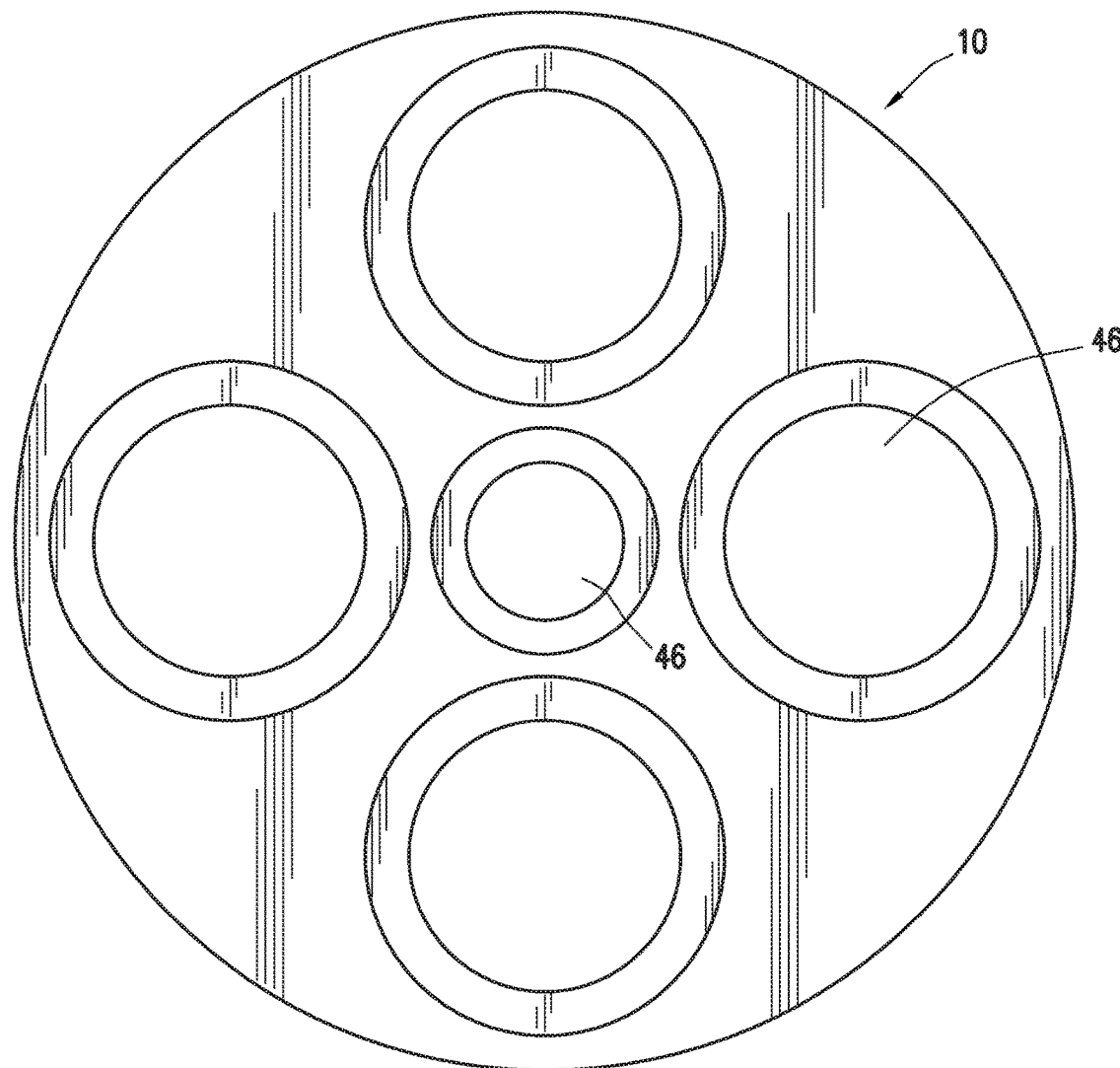
FIG. 83 is a bottom view of thereof.
Figure 84:
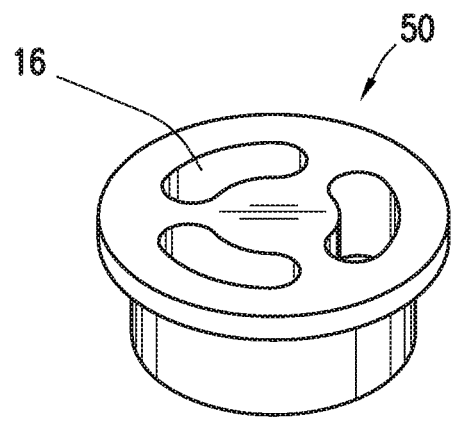
FIG. 84 is a top perspective view of a cartridge of the reciprocating gas compressor valve of FIG. 75.
Figure 85:
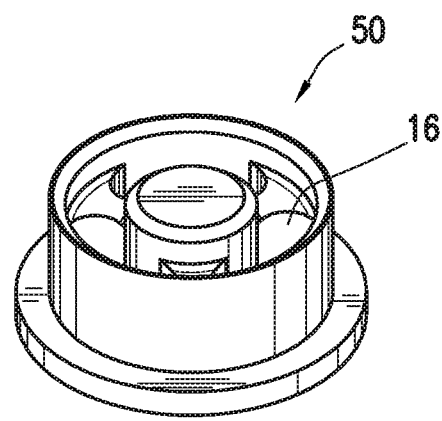
FIG. 85 is a bottom perspective view thereof.
Figure 86:
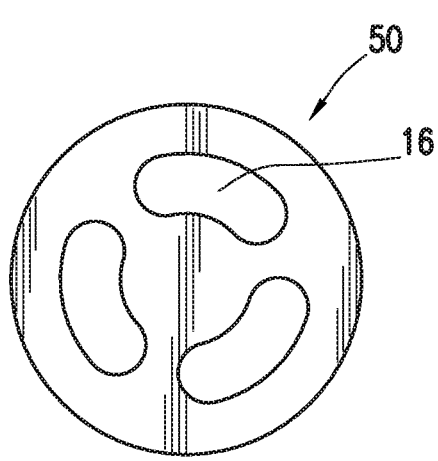
FIG. 86 is a top view thereof.
Figure 87:
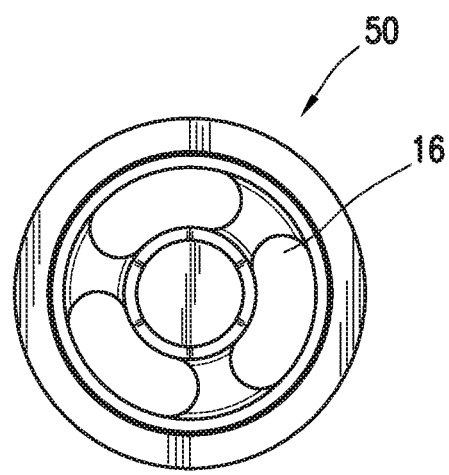
FIG. 87 is a bottom view thereof.
Figure 88:
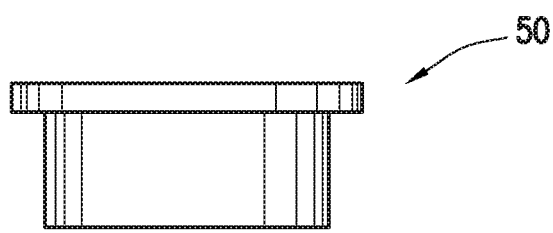
FIG. 88 is a side elevational view thereof.
Figure 89:
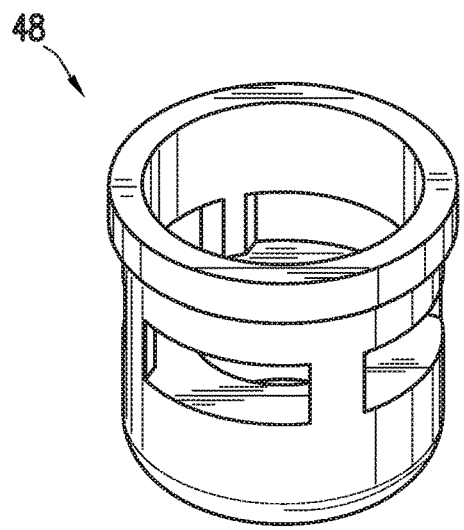
FIG. 89 is a top perspective view of the cup of the reciprocating gas compressor valve of FIG. 75.
Figure 90:
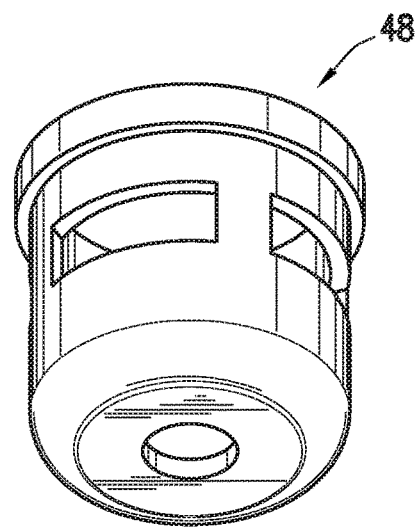
FIG. 90 is a bottom perspective view thereof.
Figure 91:
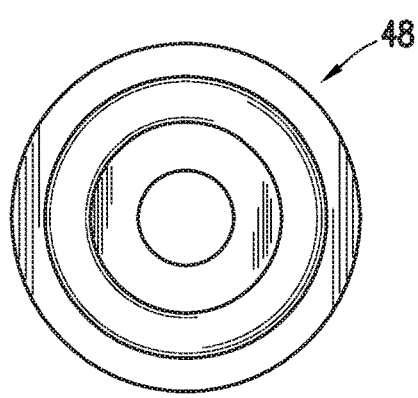
FIG. 91 is a top view thereof.
Figure 92:
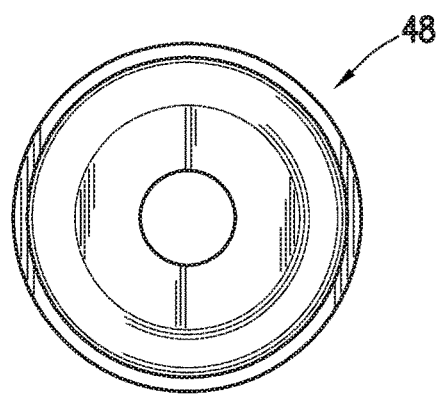
FIG. 92 is a bottom view thereof.
Figure 93:
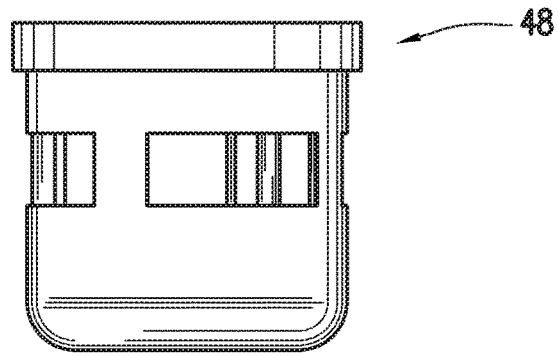
FIG. 93 is a side elevational view thereof.
Figure 94:
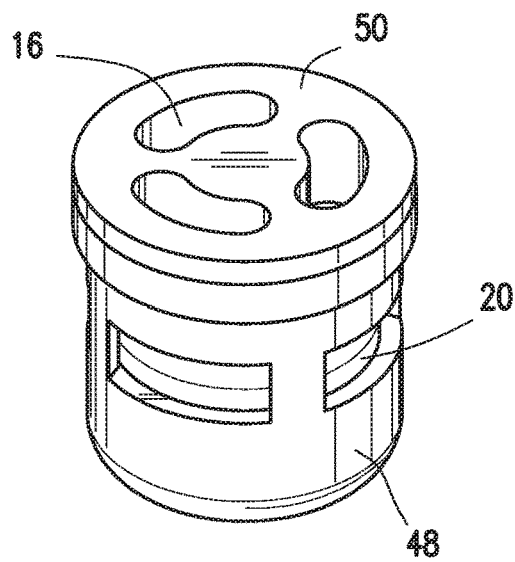
FIG. 94 is a top perspective view of the cup assembly of the reciprocating gas compressor valve of FIG. 75.
Figure 95:
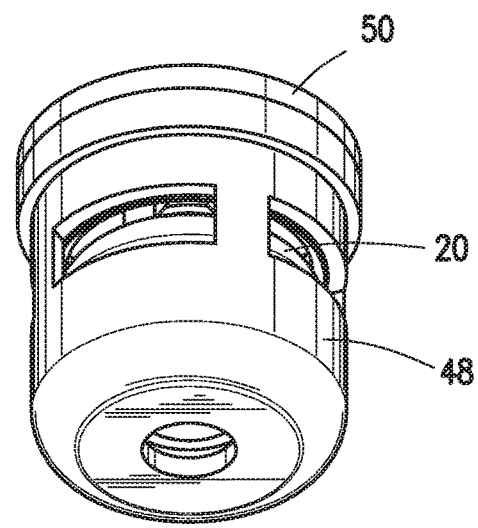
FIG. 95 is a bottom perspective view thereof.
Figure 96:
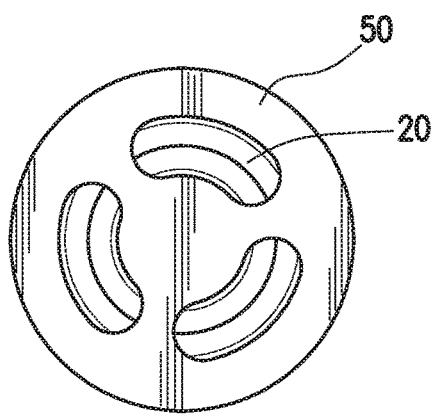
FIG. 96 is a top view thereof.
Figure 97:
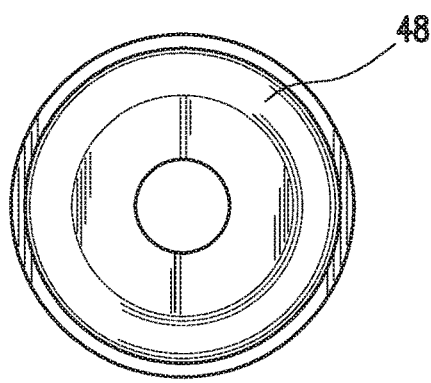
FIG. 97 is a bottom view thereof.
Figure 98:
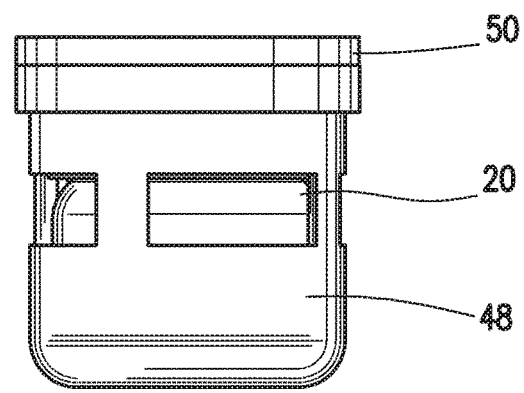
FIG. 98 is a side elevational view thereof.
Figure 99:
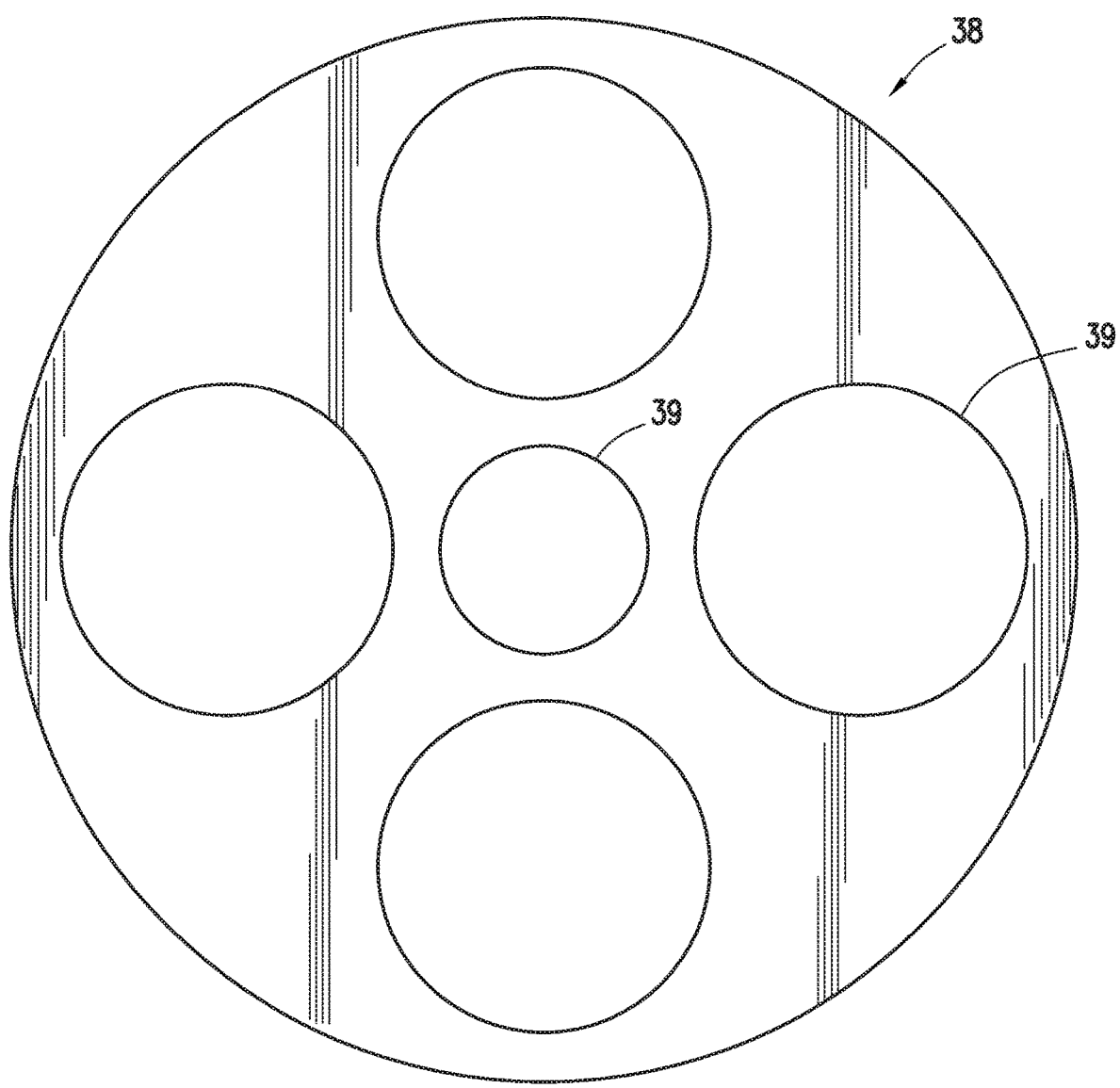
FIG. 99 is a top view and bottom view of the plate of the reciprocating gas compressor valve of FIG. 75.
Figure 100:
FIG. 100 is a side view thereof.
Figure 101:
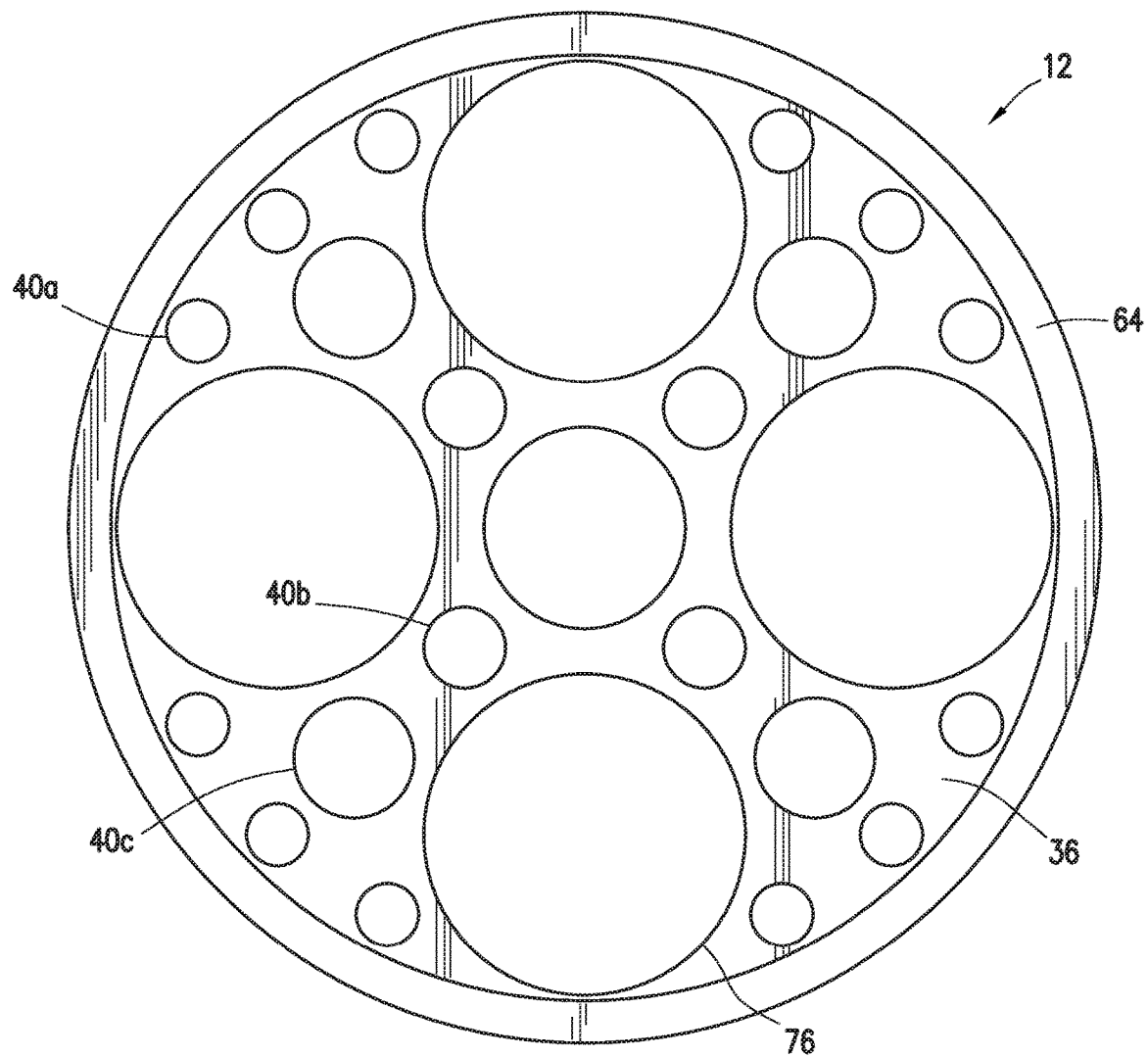
FIG. 101 is a top view of the guard of the reciprocating gas compressor valve of FIG. 1.
Figure 102:
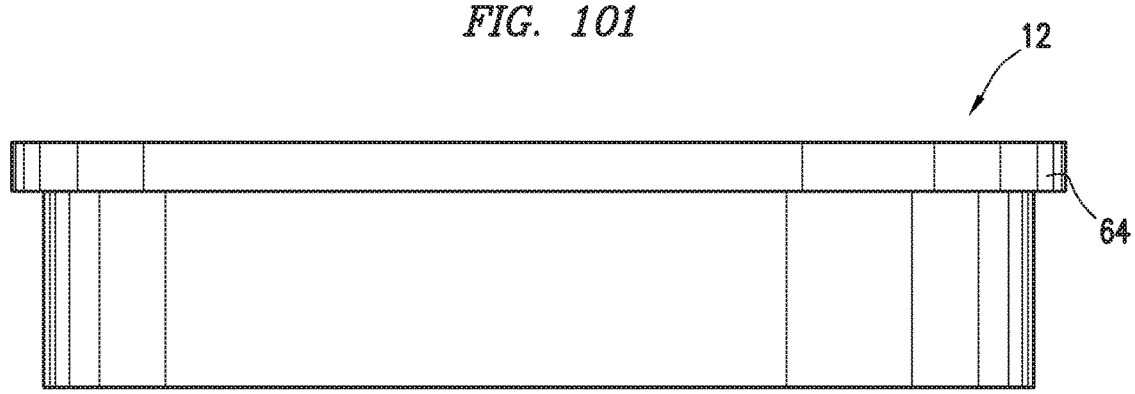
FIG. 102 is a side elevational view thereof.
Figure 103:
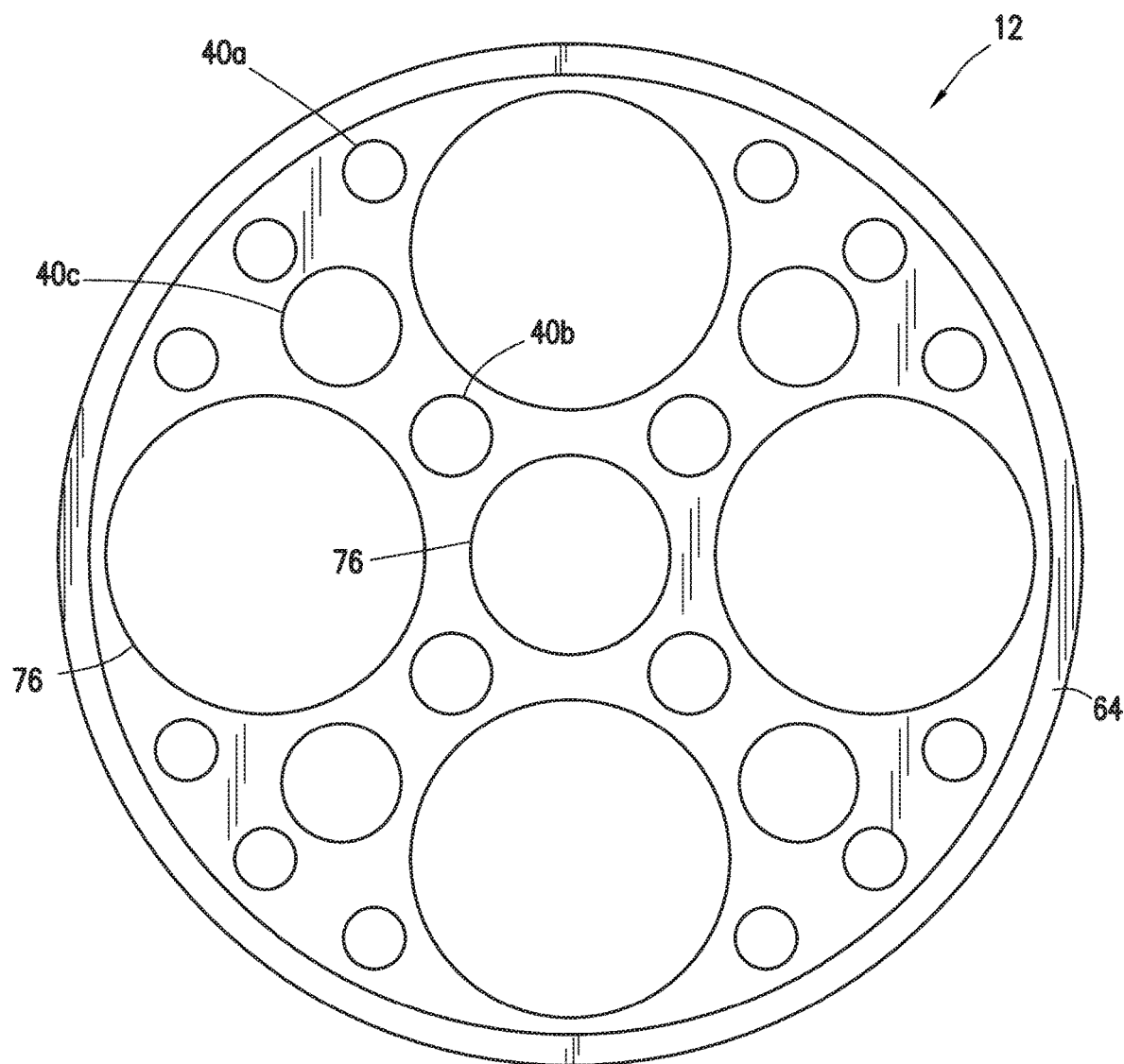
FIG. 103 is the bottom view thereof.
Figure 104:
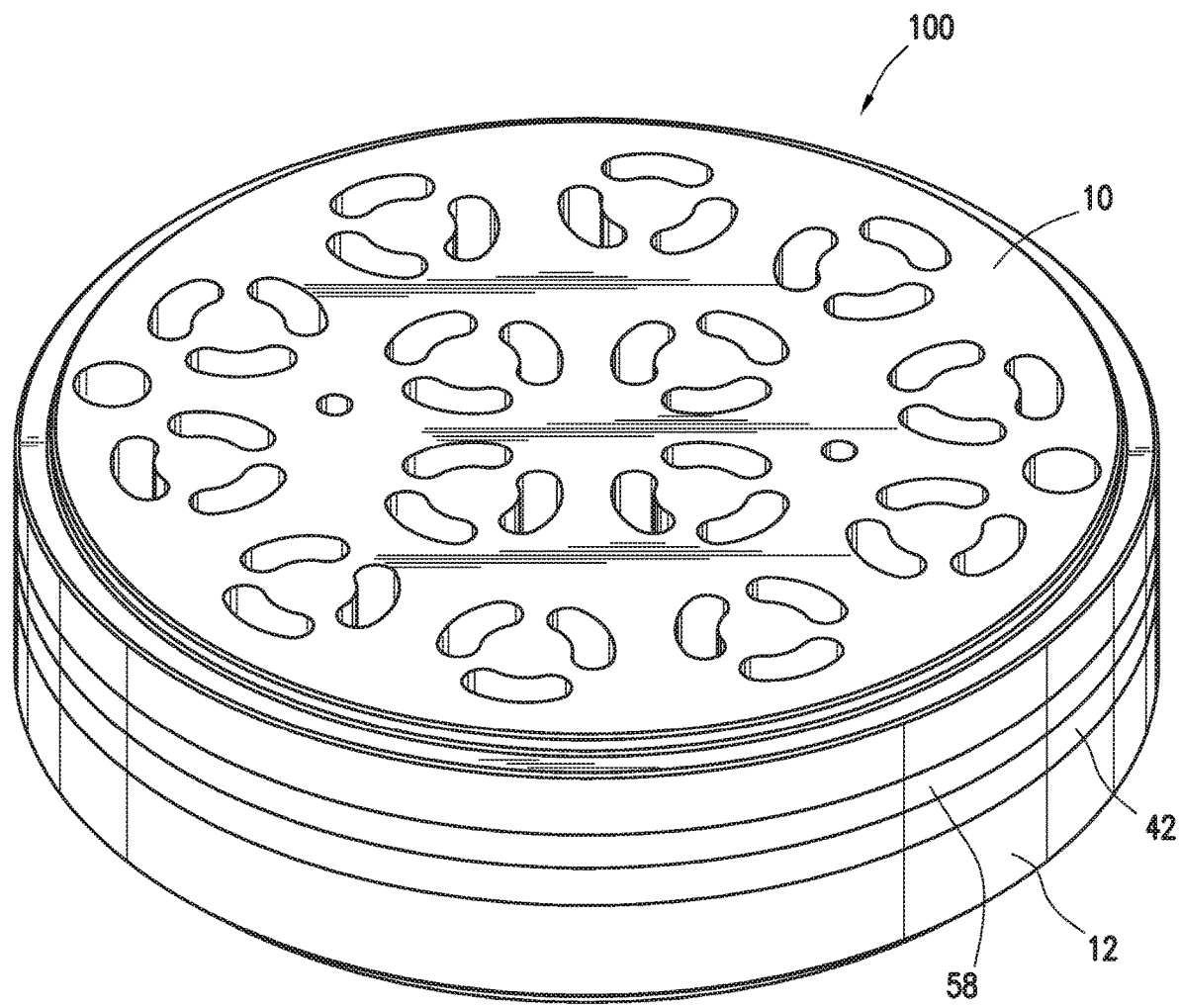
FIG. 104 is an overall perspective view of an embodiment of the reciprocating gas compressor valve.
Figure 105:
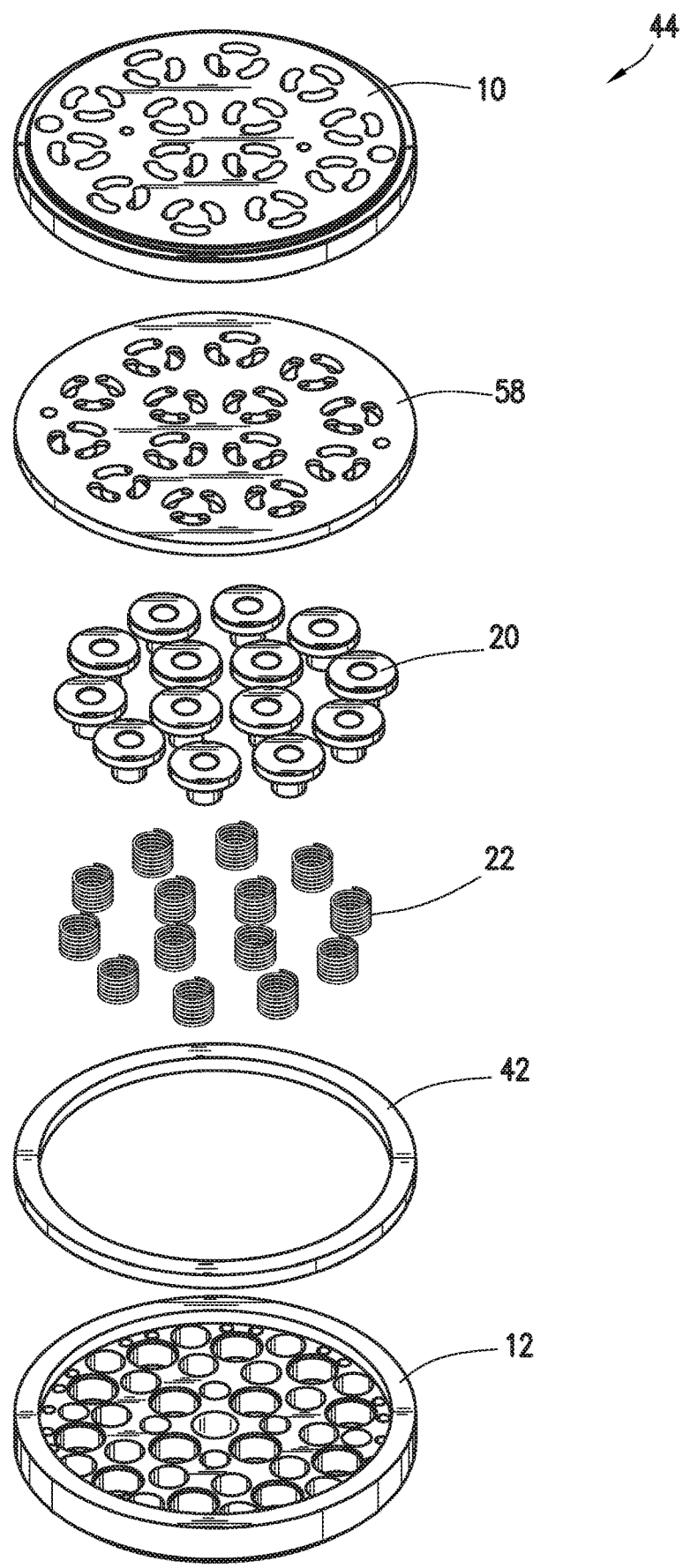
FIG. 105 is an overall exploded perspective view thereof.
Figure 106:
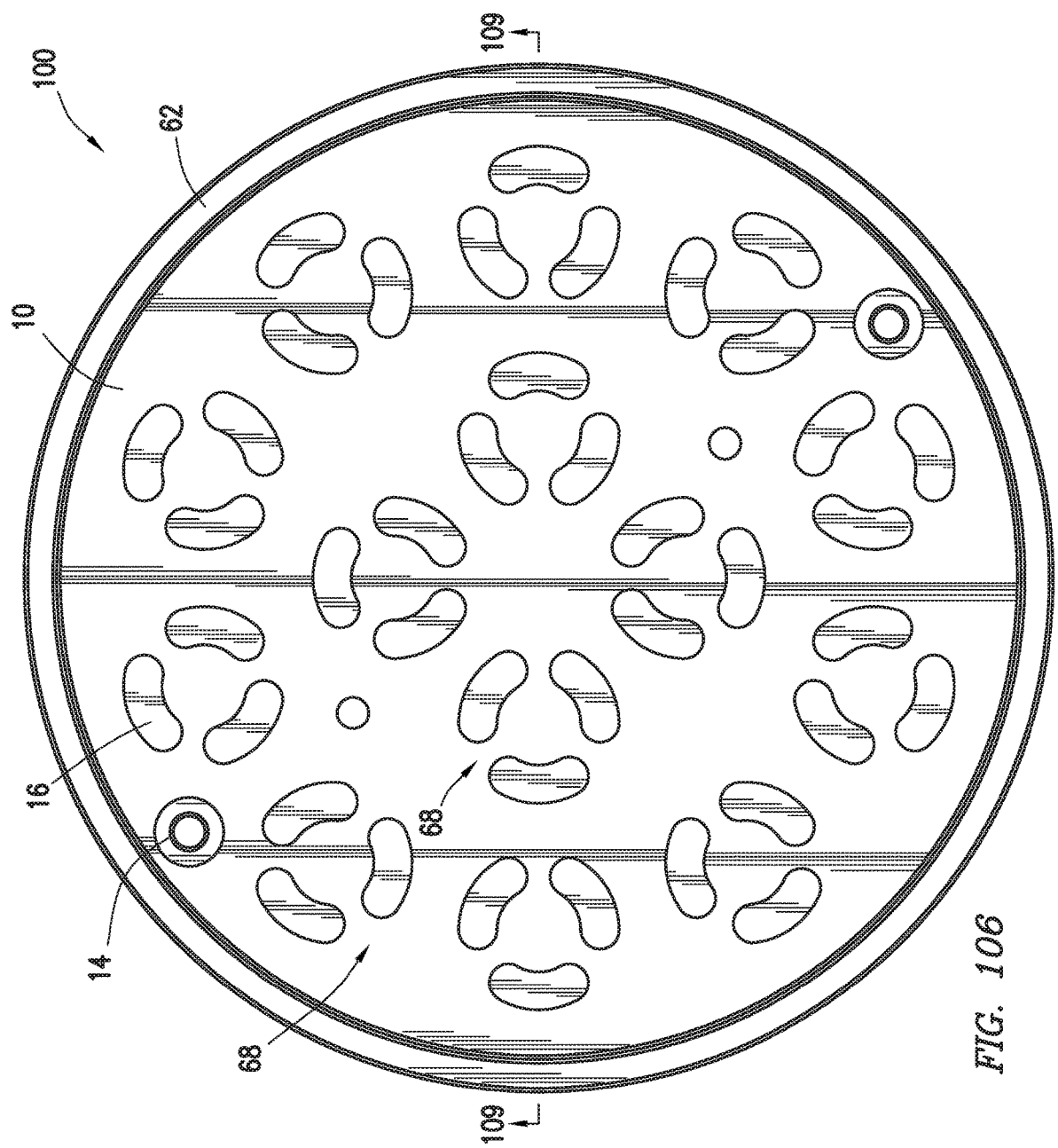
FIG. 106 is an overall top view thereof.
Figure 107:
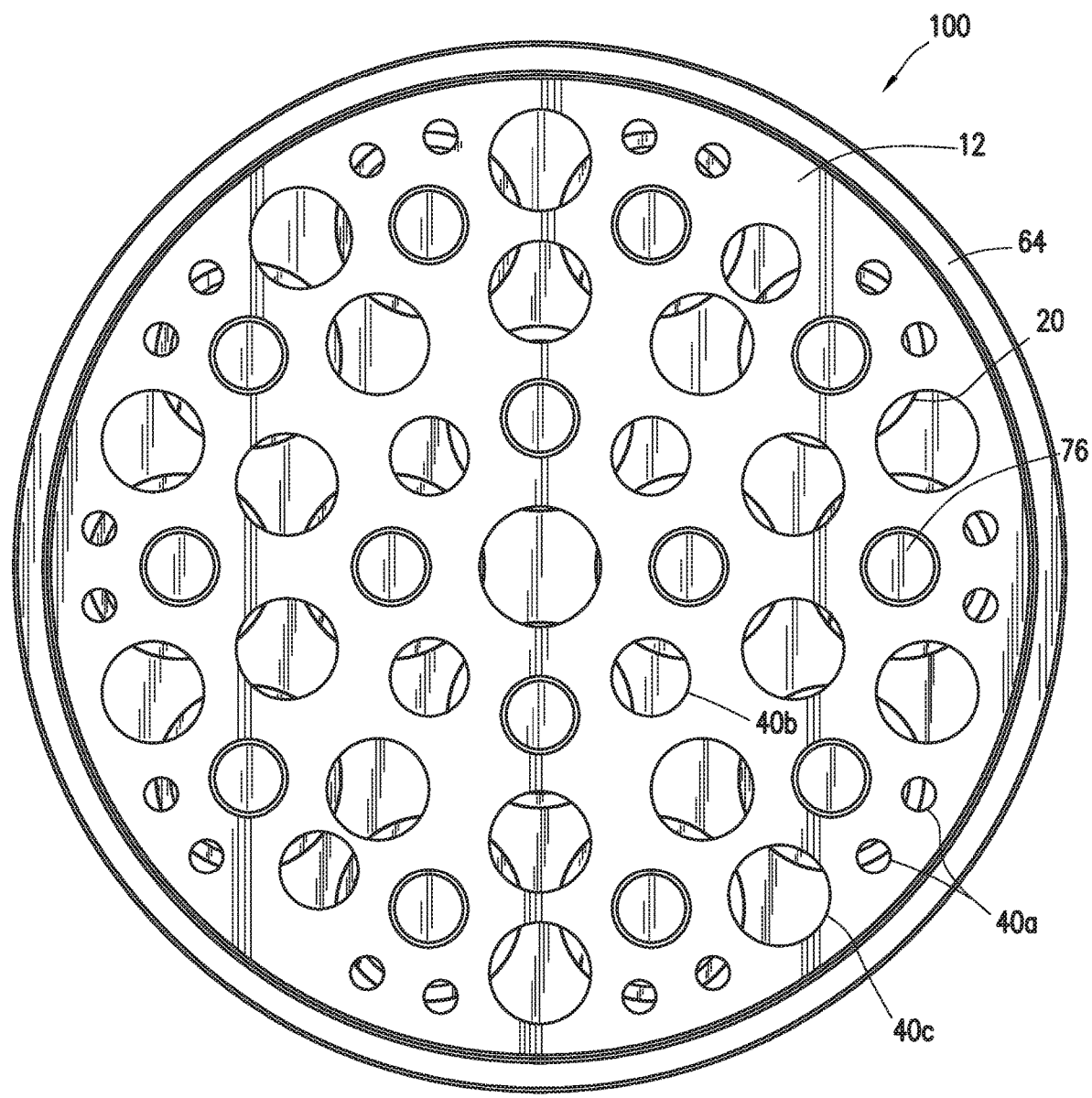
FIG. 107 is an overall bottom view thereof.
Figure 108:
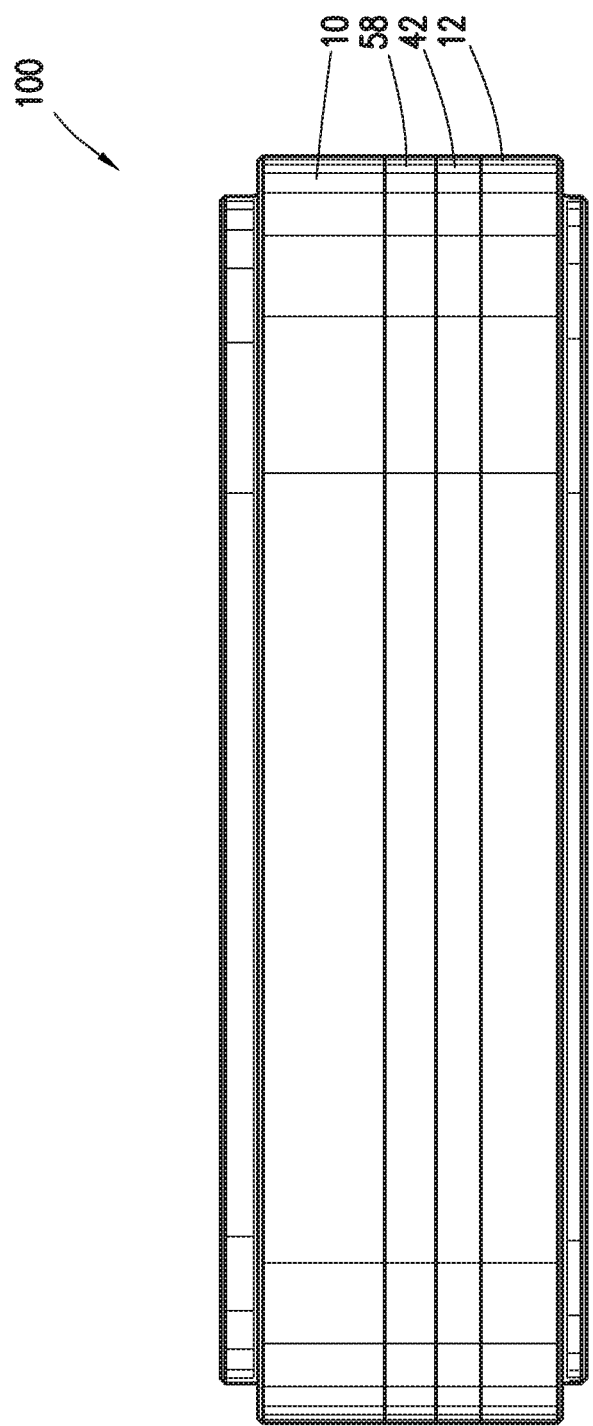
FIG. 108 is an overall side view thereof.
Figure 109:
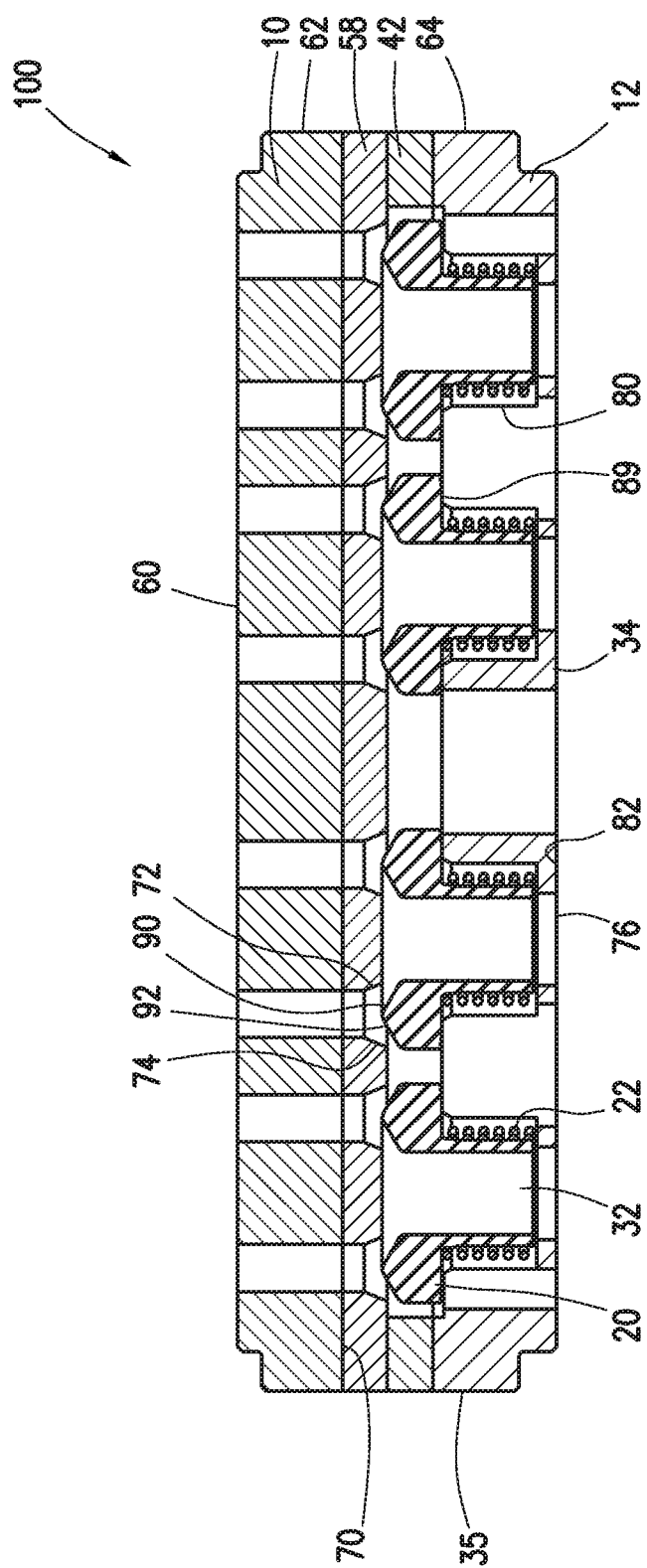
FIG. 109 is a cross-sectional view of FIG. 3.
Figure 110:
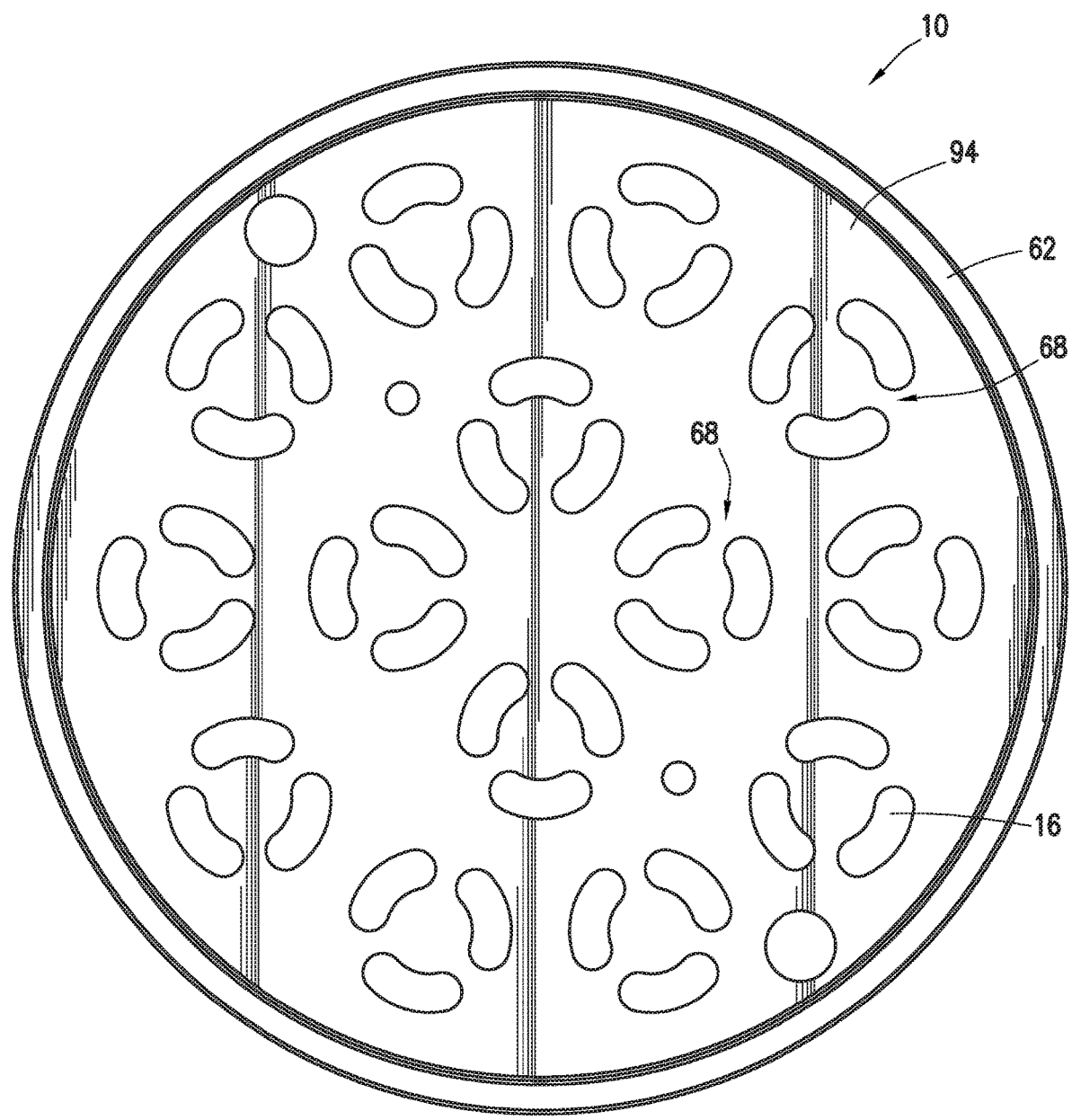
FIG. 110 is a top view of the seat of the reciprocating gas compressor valve of FIG. 104.
Figure 111:
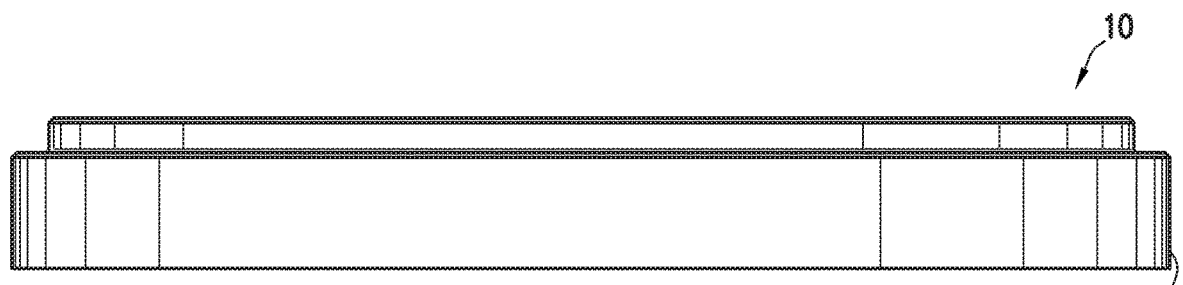
FIG. 111 is a side elevational view thereof.
Figure 112:
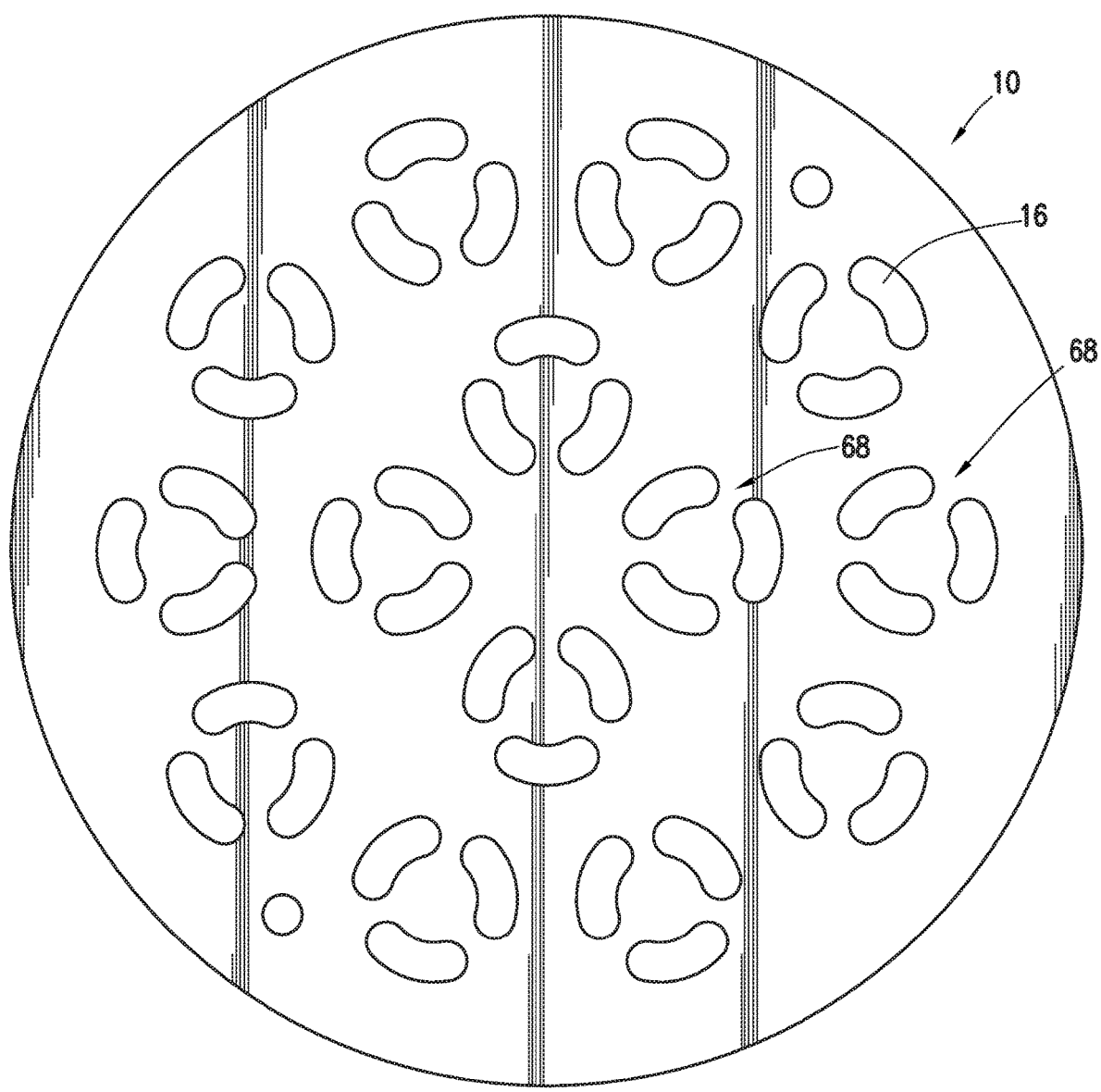
FIG. 112 is a bottom view of thereof.
Figure 113:
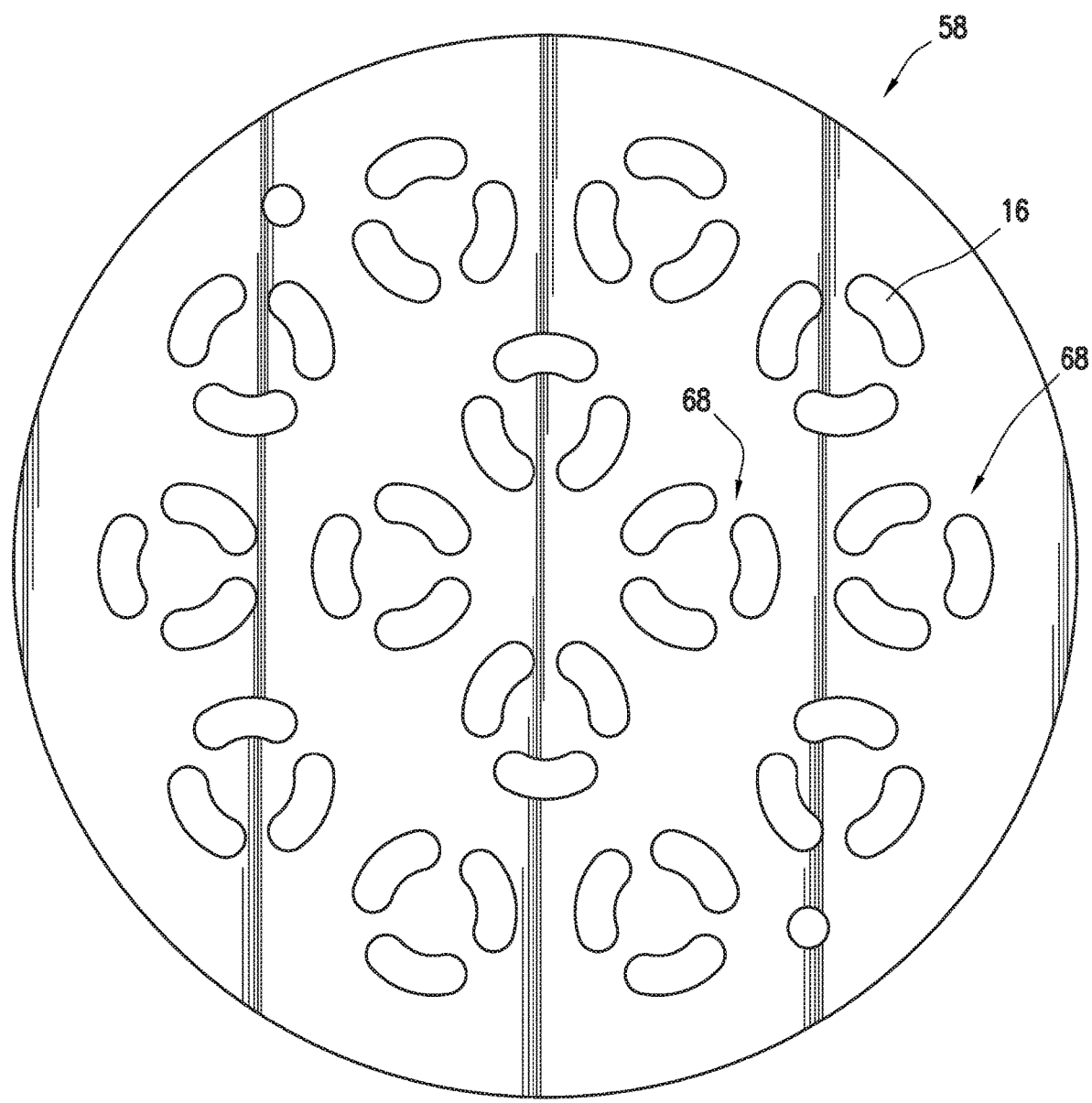
FIG. 113 is a top view of the cartridge plate of the reciprocating gas compressor valve of FIG. 104.
Figure 114:
FIG. 114 is a side elevational view thereof.
Figure 115:
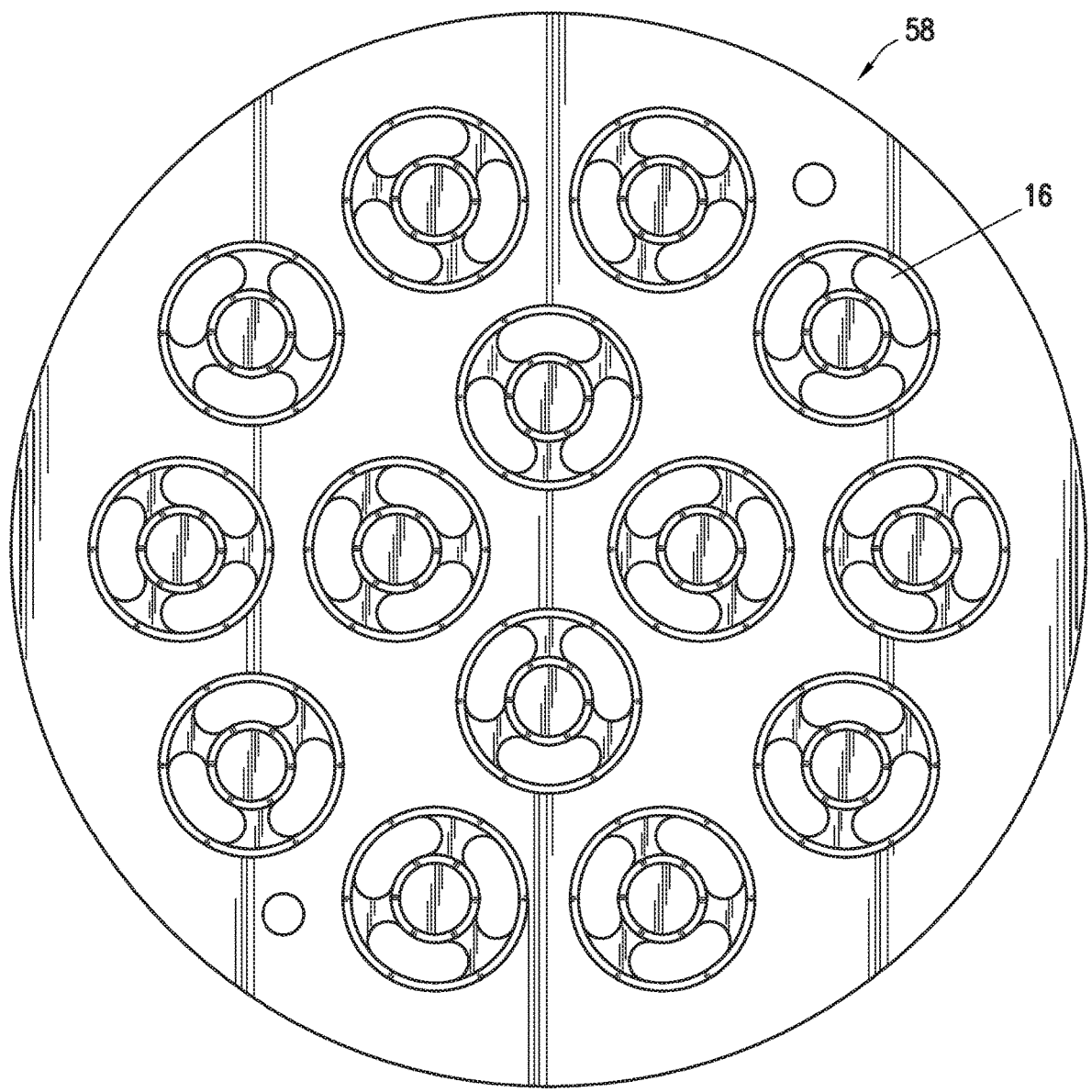
Figure 116:
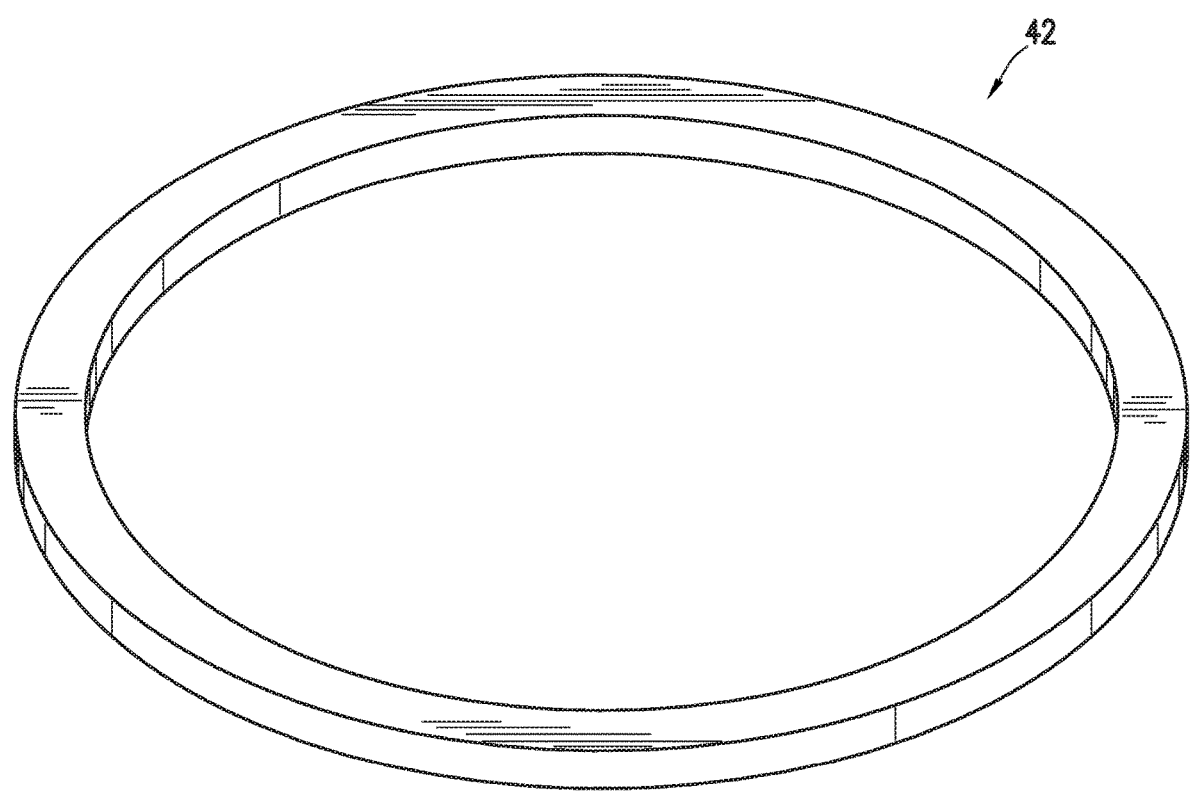
Figure 117:
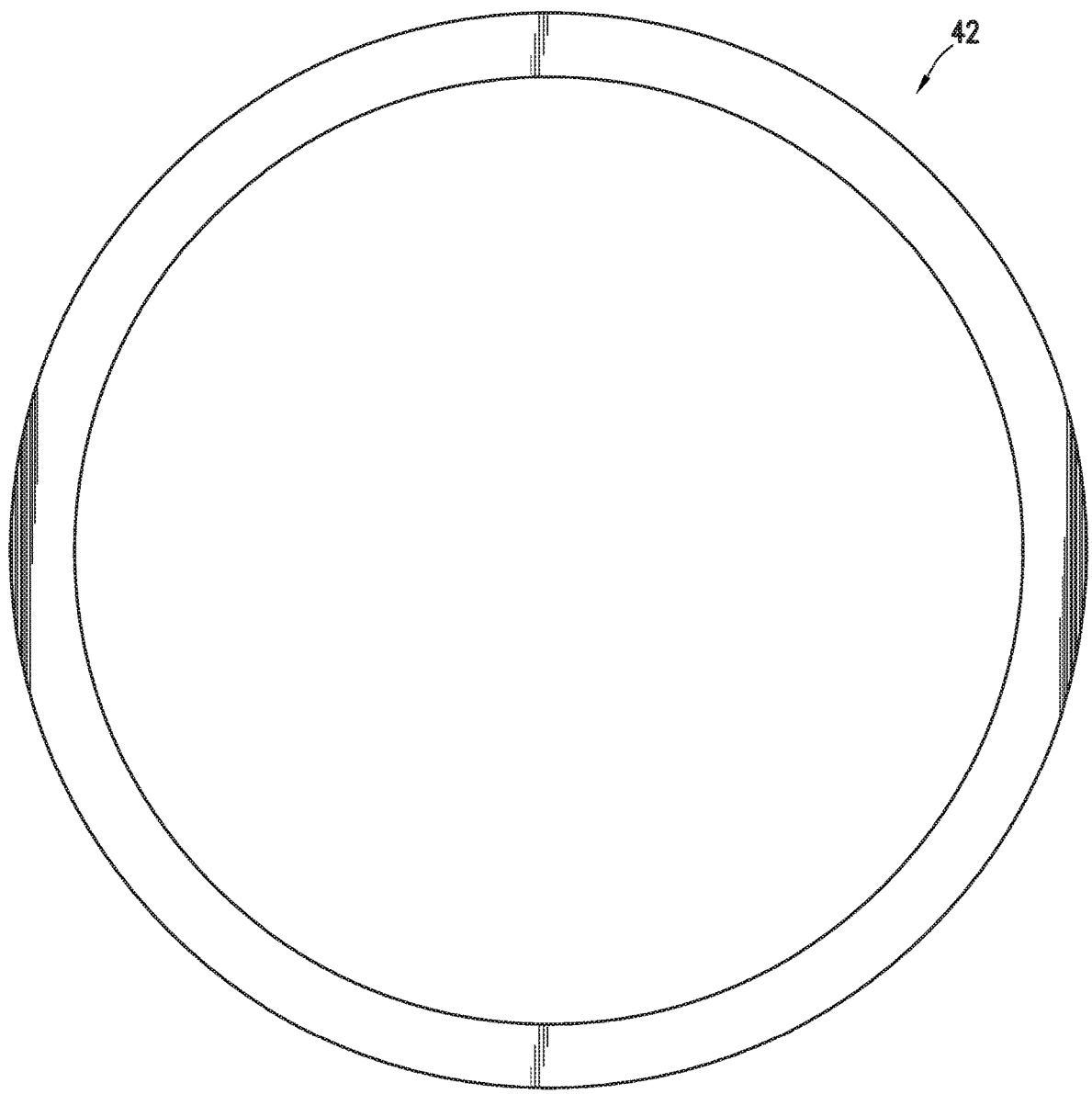
Figure 118:
Figure 119:
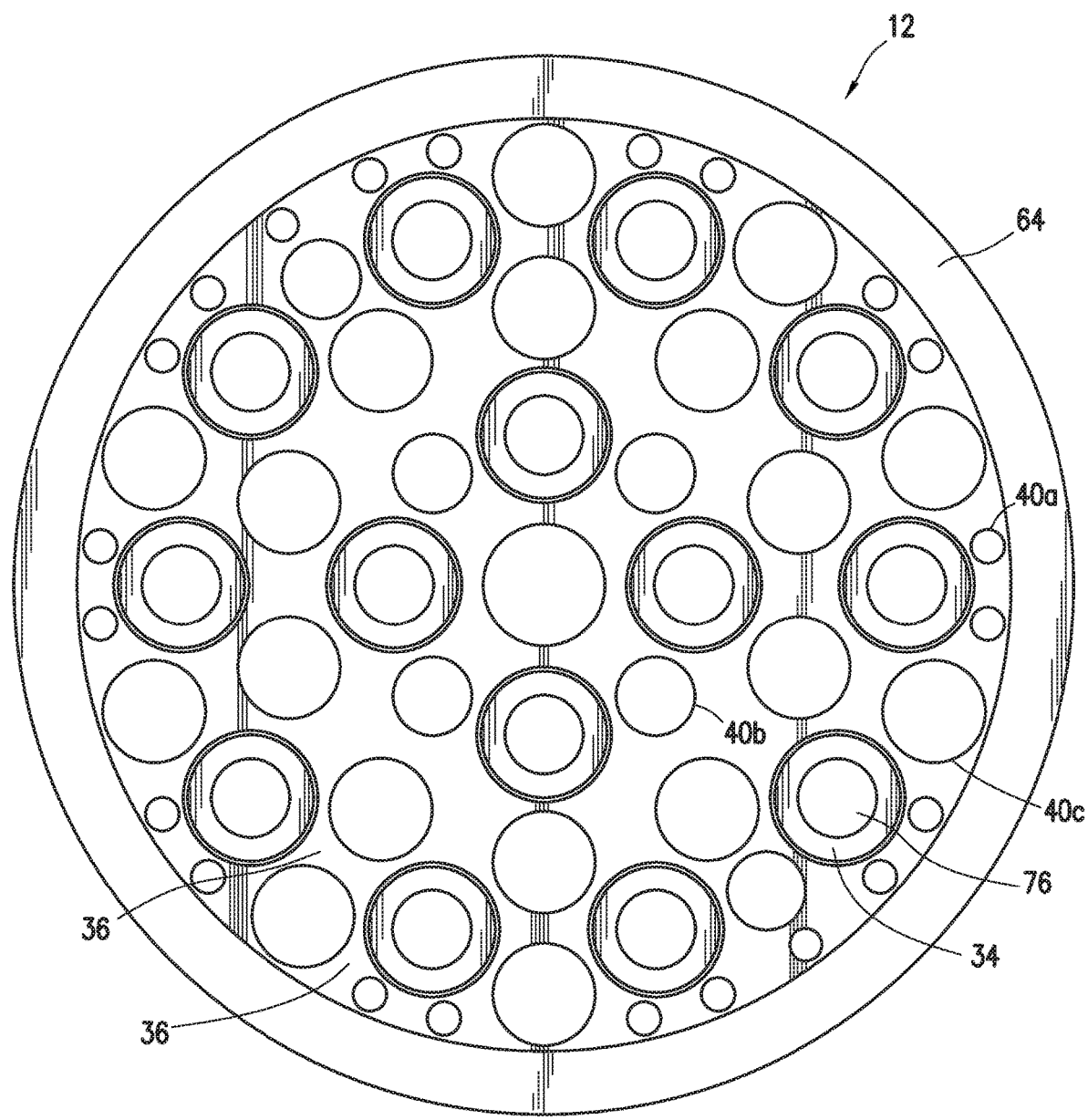
Figure 120:
Figure 121:
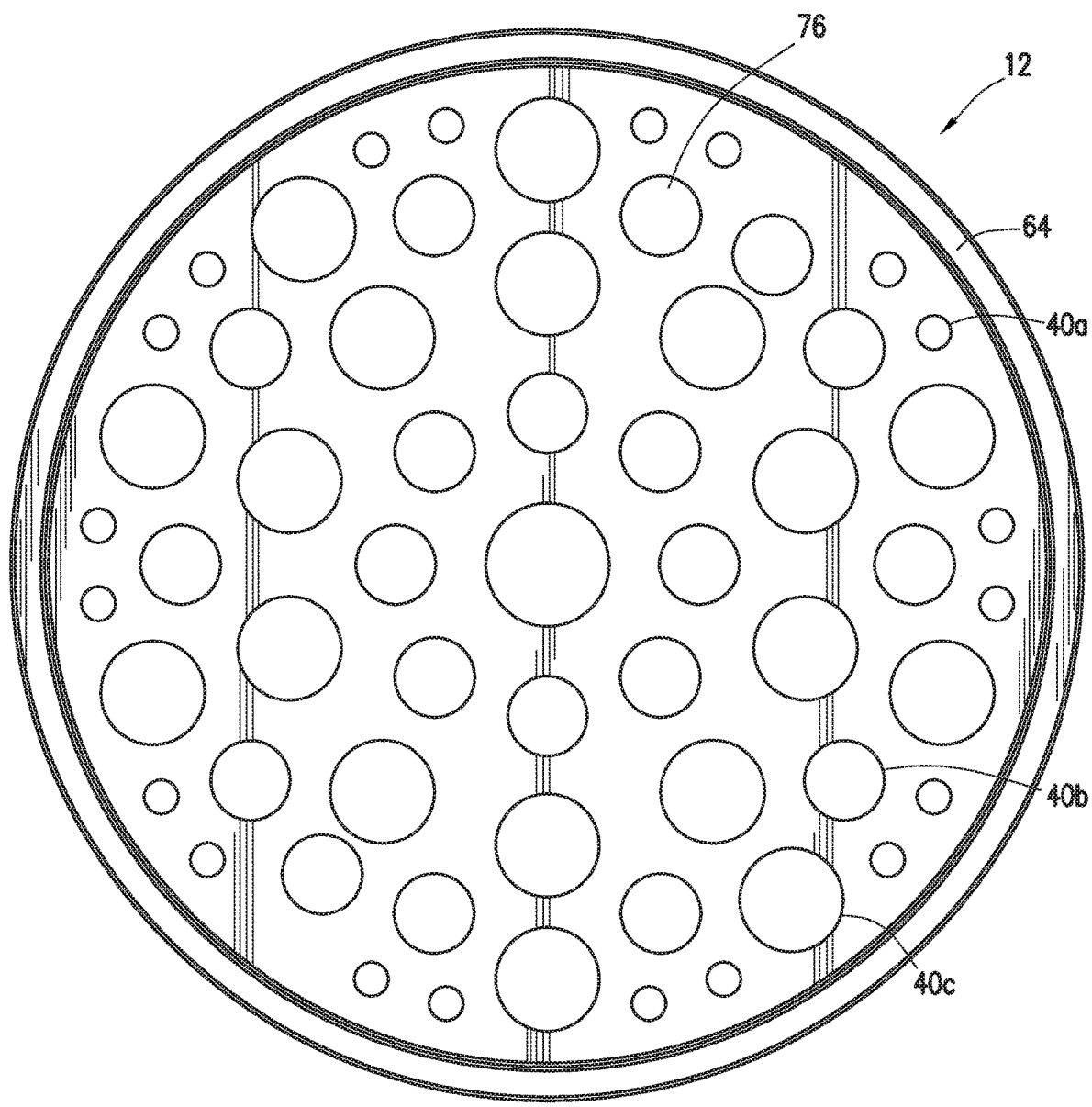

In addition, a bottom profile 26 of the sealing element 20 at the bottom 28 of the sealing element 20 can be provided. The bottom profile 26 of the sealing element 20 abuts the stop surface 89 of the guard 12. When a guard 12 is not used, the bottom profile 26 is in contact with a cup assembly 44 shown in FIG. 80. The bottom profile 26 of the sealing element 20 is raised at the bottom 28 to reduce the area in contact with the guard 12, producing less friction in high oil applications and increasing reliability of the valve in operation.

Other than force from the spring 22, the sealing element 20 generally does not require positive mechanical guidance to move or travel between the open position and the closed position described above. Generally, the sealing element 20 aligns with the seating surfaces 72 and 74 for several reasons. First, as shown in FIGS. 2 and 6, there is a substantial amount of guidance from spring 22 and counter bores 23 in the guard 12. The spring 22 is guided by the inner diameter of the enclosing portion of the guides 34. Counter bore 23 retain the sealing element 20 and each side of the counter bore 23 center the sealing element 20 providing guided vertical movement of the sealing element 20. Second, once the sealing element 20 begins to move into alignment with its seating surfaces 72 and 74, the tapers of the seating surfaces 72 and 74 and the sealing surfaces 72, 74 of the sealing element 20 can position the sealing element 20 into proper alignment with its seating surfaces 72, 74. Third, when the guard 12 is included in the valve assembly 44, incoming gas can flow along both the inner and outer diameters 54, 56 of the sealing element 20 and the guides 34 center the sealing element 20.

The sealing element 20 has certain sealing properties that include line contact, and ring and surface contact. For example, line contact in the sealing region involves designing elements with tight tolerances and excellent manufacturing capabilities. Any divergence from this results in valve leakage negatively affecting performance of that unit, resulting in higher operating costs. However, having adequate surface contact in the sealing region reduces leakage due to excellent sealing properties. This has the capability of absorbing some manufacturing anomalies and does not require tight tolerances. Turbulence can be reduced also. The tube in the sealing element helps streamline gas flow through center of the ring. Since, springs are covers and the fluid is not in contact with springs, turbulence decreases resulting in increased efficiency.

The sealing element 20 moves freely in an axial direction in the seat 10. During operation of the reciprocating gas compressor valve 100, in an open position, high pressure gas forces move the sealing element 20. At the end of a cycle, in a closed position, the sealing element 20 is pushed in a reverse direction due to force of the spring 22 thereby obstructing the reverse flow and creating a one direction flow path and resulting in gases sealed within the cylinder (not shown).

More specifically, as shown in the figures and described above, the sealing element 20 moves by reciprocating between the stop surface 89 and the respective seating surfaces 72 and 74. As shown in FIGS. 13 to 52, one side of a top portion 19 of the sealing element 20 faces and, when the valve is closed, abuts seating surfaces 72, 74, and has sealing surfaces 90, 92 adjacent to an inner and an outer diameter of the sealing element, respectively, and inclined toward each other, to generally correspond to the taper of seating surfaces 72, 74. For example, if surfaces 72 and 74 define spherical loci, surfaces 90 and 92 define mating spherical loci; if surfaces 72 and 74 define conical loci, surfaces 90 and 92 can define mating conical loci; etc. However, other arrangements are possible. For example, surfaces 72 and 74 could define conical loci, with surfaces 90 and 92 defining spherical loci tangent to the respective conical loci.

Figure 54:
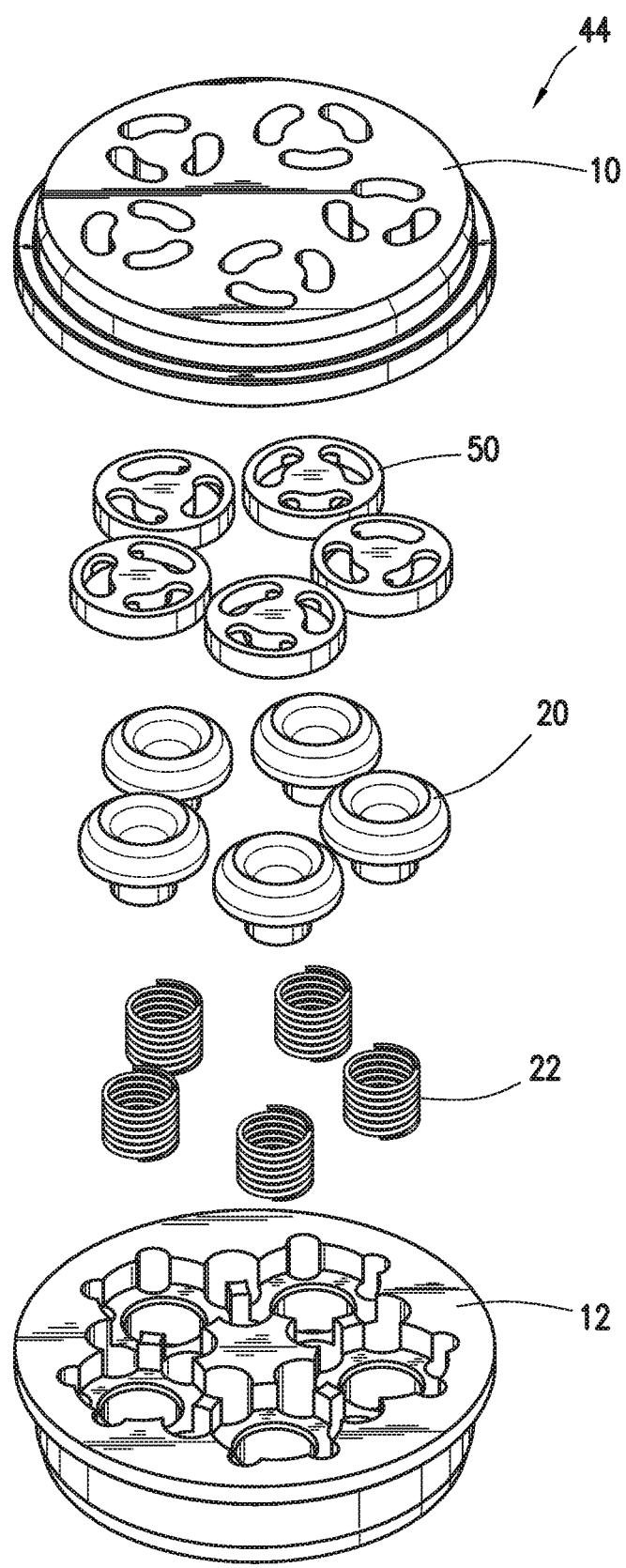
FIG. 54 is an overall exploded perspective view thereof.
Figure 55:
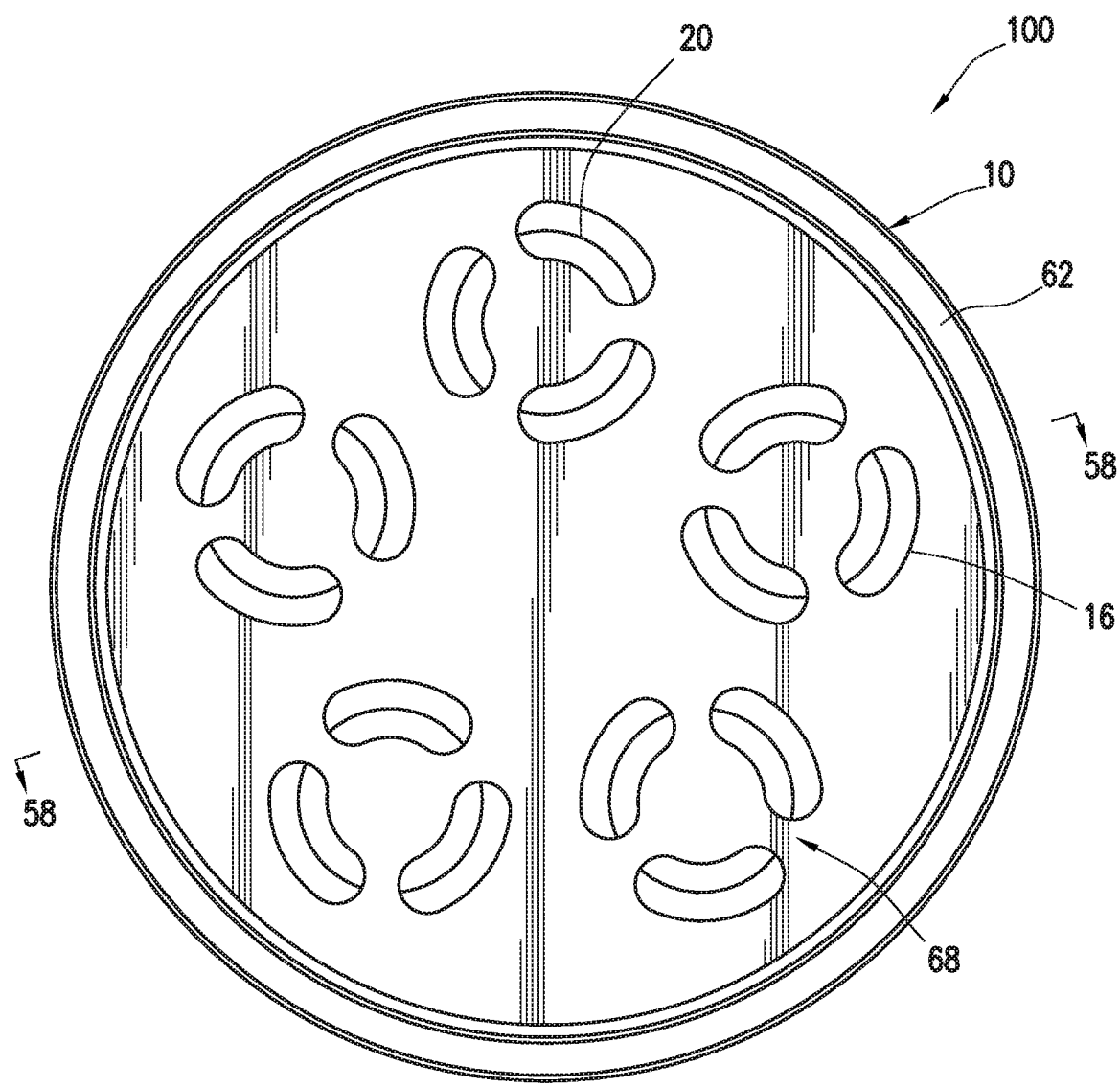
FIG. 55 is an overall top view thereof.
Figure 56:
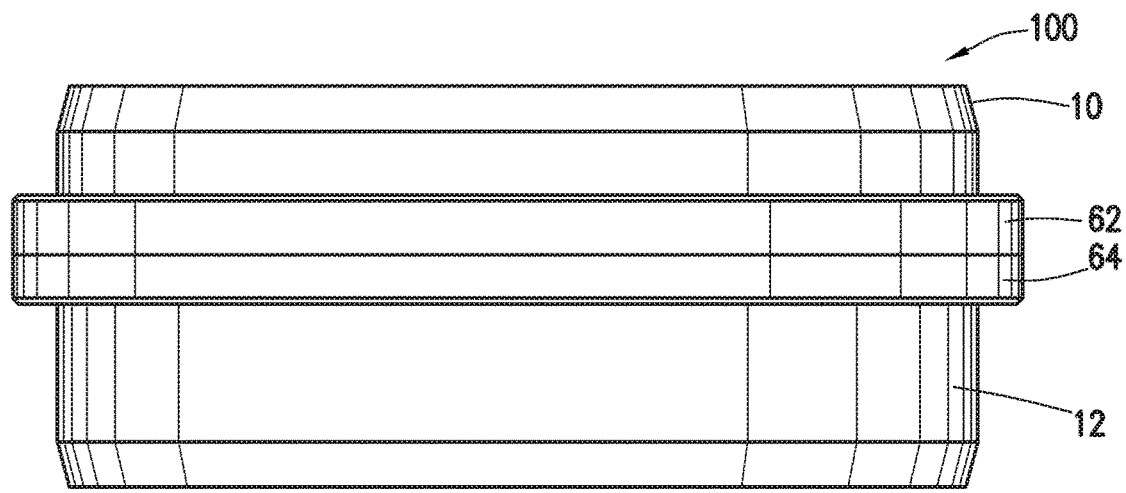
FIG. 56 is an overall side elevational view thereof.
Figure 57:
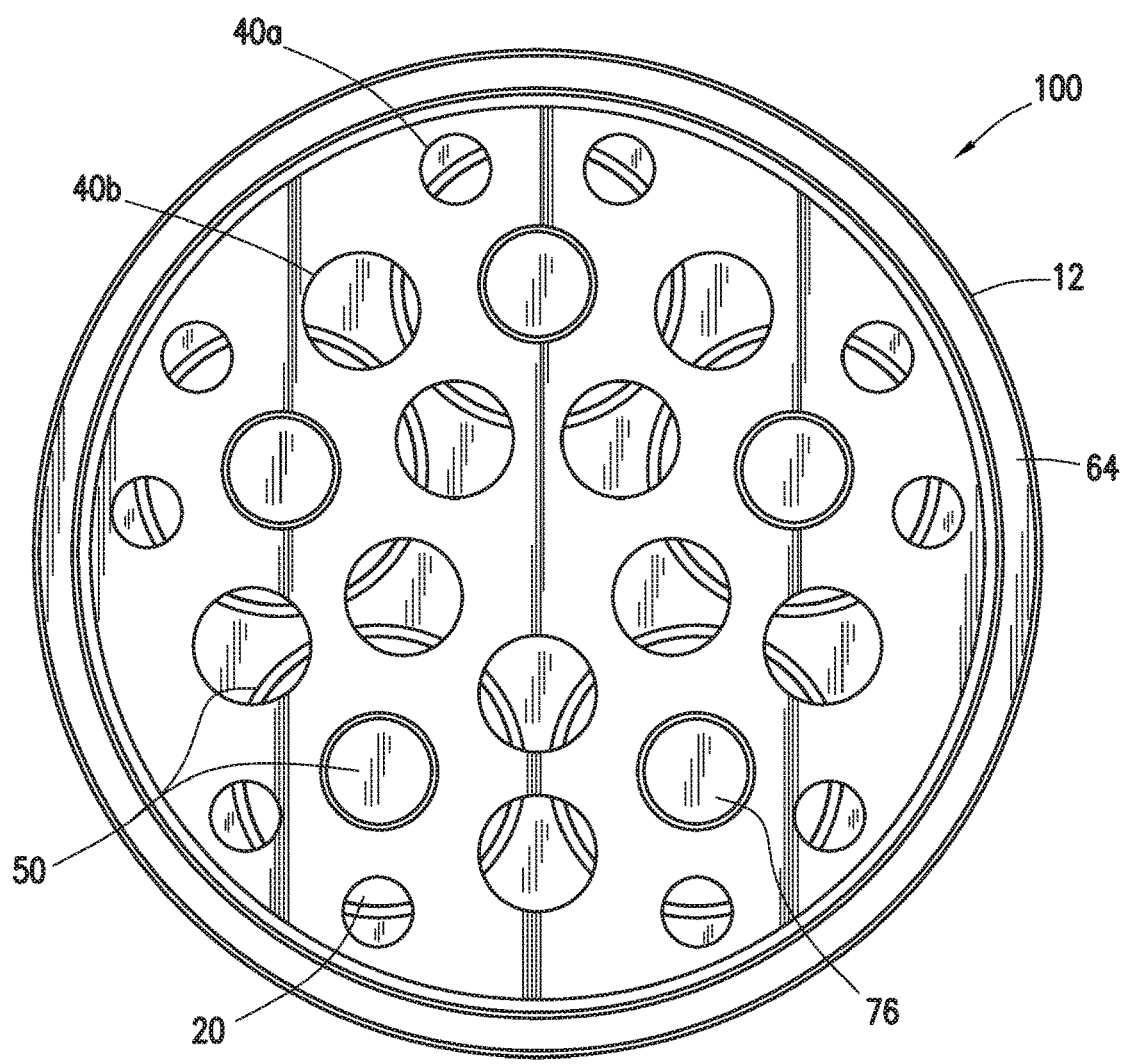
FIG. 57 is an overall bottom view thereof.
Figure 58:
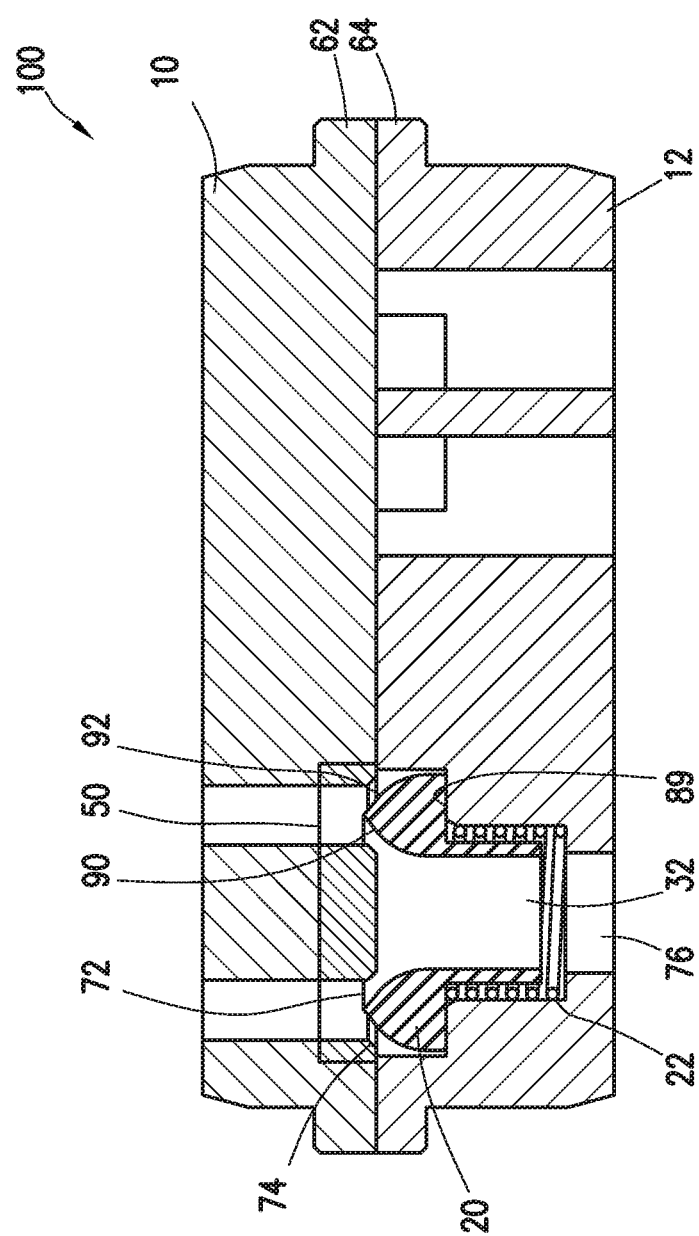
FIG. 58 is a cross-sectional view of the reciprocating gas compressor valve of FIG. 18.
Figure 59:
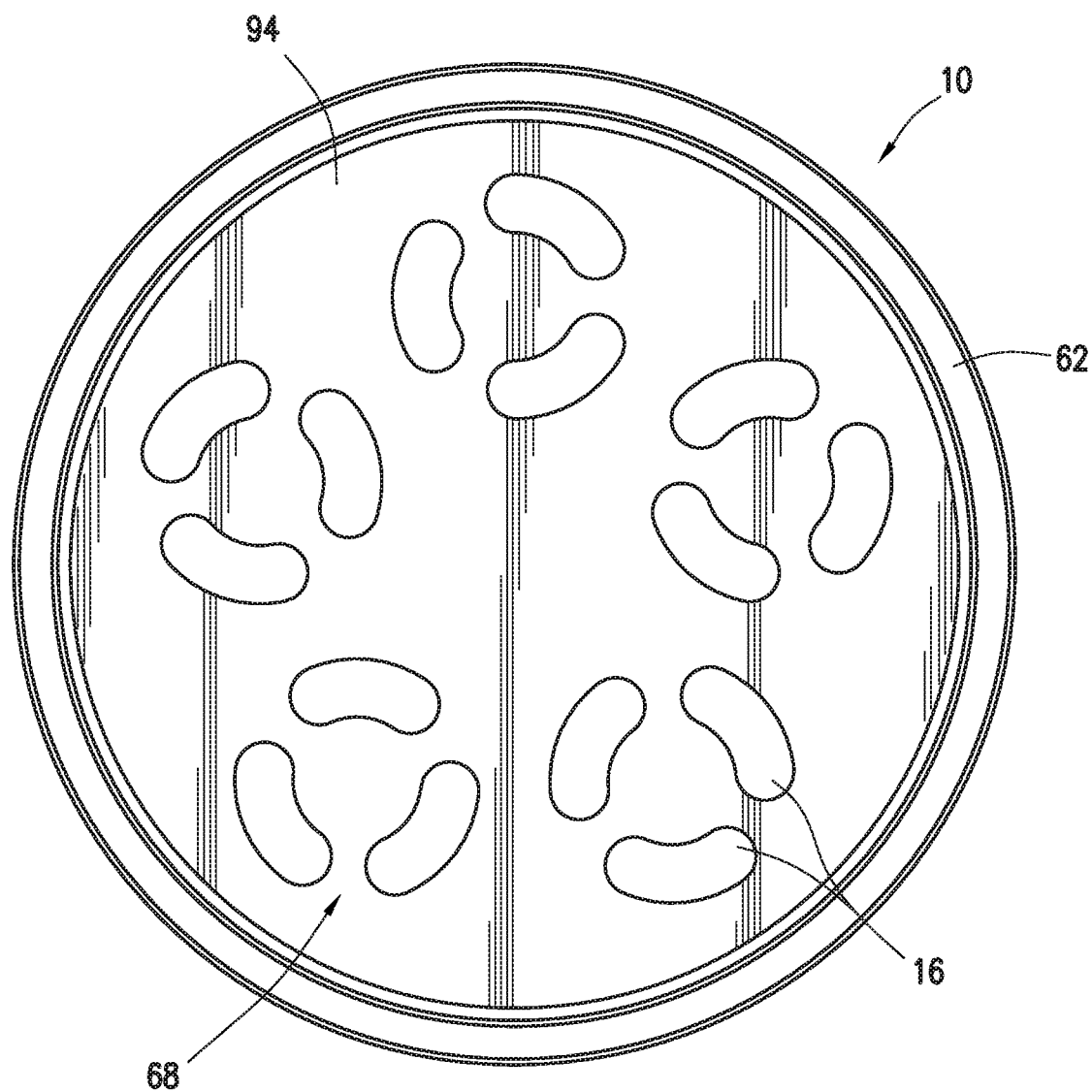
FIG. 59 is an top view of the seat of the reciprocating gas compressor valve of FIG. 16.
Figure 60:
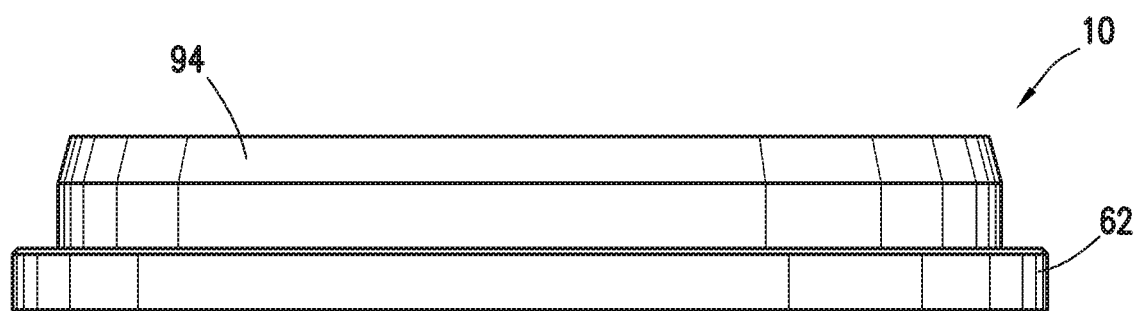
FIG. 60 is a side elevational view of the seat thereof.
Figure 61:
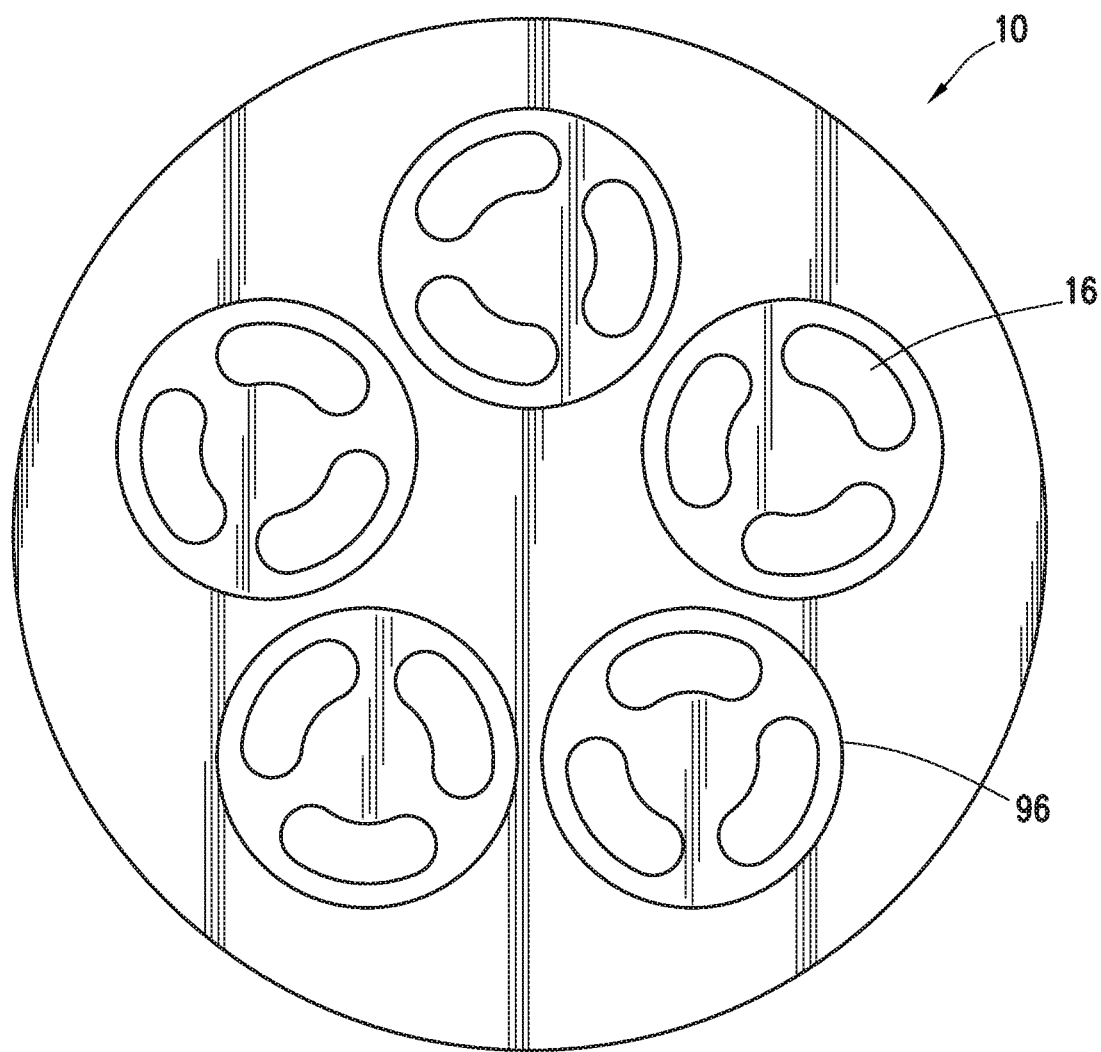
FIG. 61 is a bottom view of the seat thereof.
Figure 62:
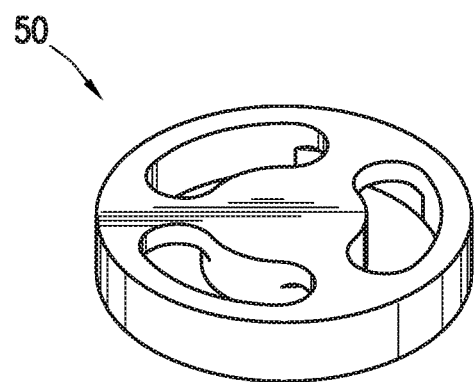
FIG. 62 is a perspective view of the cartridge of the reciprocating gas compressor valve of FIG. 53.
Figure 63:
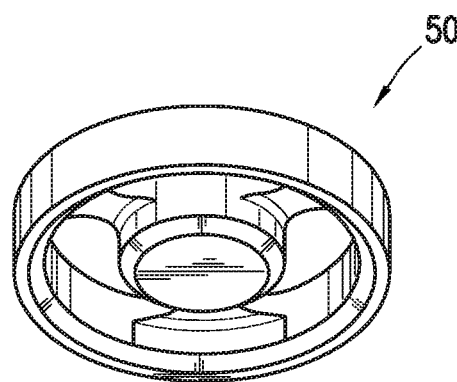
FIG. 63 is a bottom perspective view of the cartridge thereof.
Figure 64:
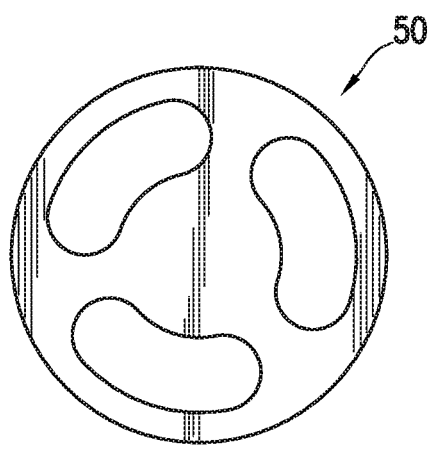
FIG. 64 is a top view of the cartridge thereof.
Figure 65:
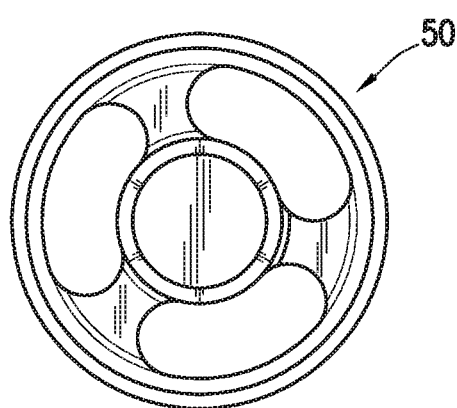
FIG. 65 is a bottom view of the cartridge thereof.
Figure 66:
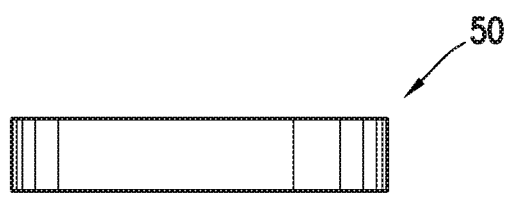
FIG. 66 is a side view of the cartridge thereof.
Figure 67:
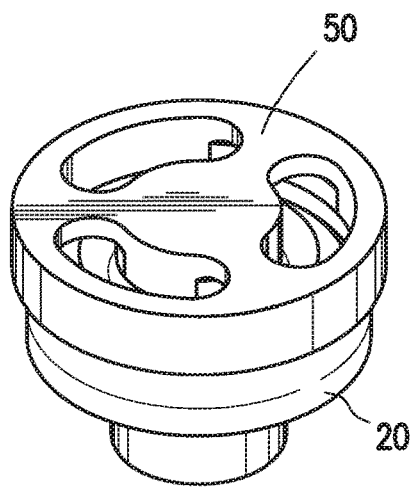
FIG. 67 is a perspective view of the cartridge of the reciprocating gas compressor valve of FIG. 53 showing an embodiment of a sealing element.
Figure 68:
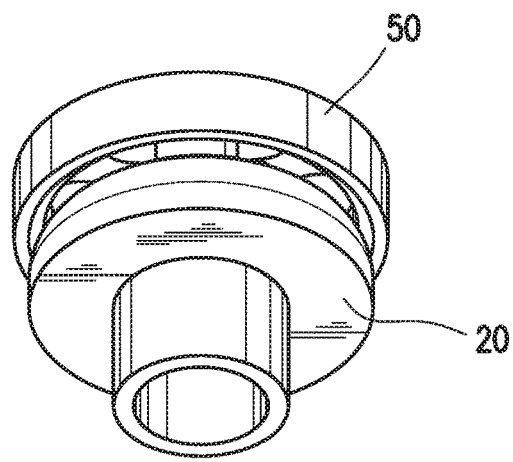
FIG. 68 is a bottom perspective view thereof.
Figure 69:
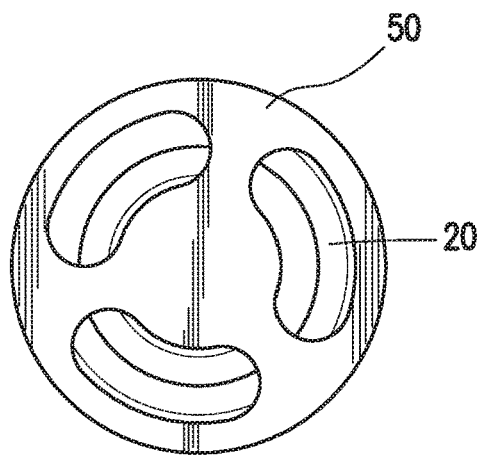
FIG. 69 is a top view thereof.
Figure 70:
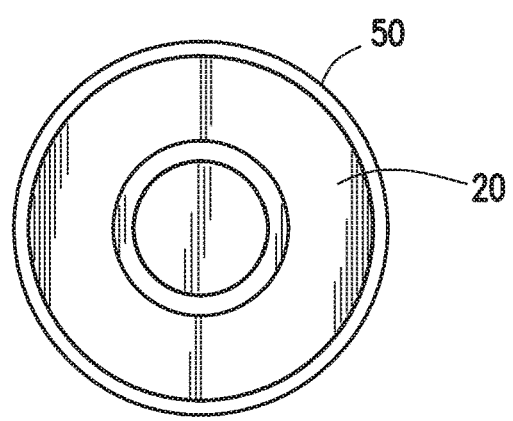
FIG. 70 is a bottom view thereof.
Figure 71:
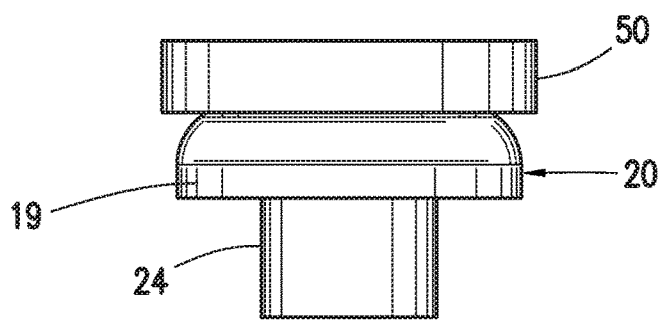
FIG. 71 is a side view thereof.
Figure 72:
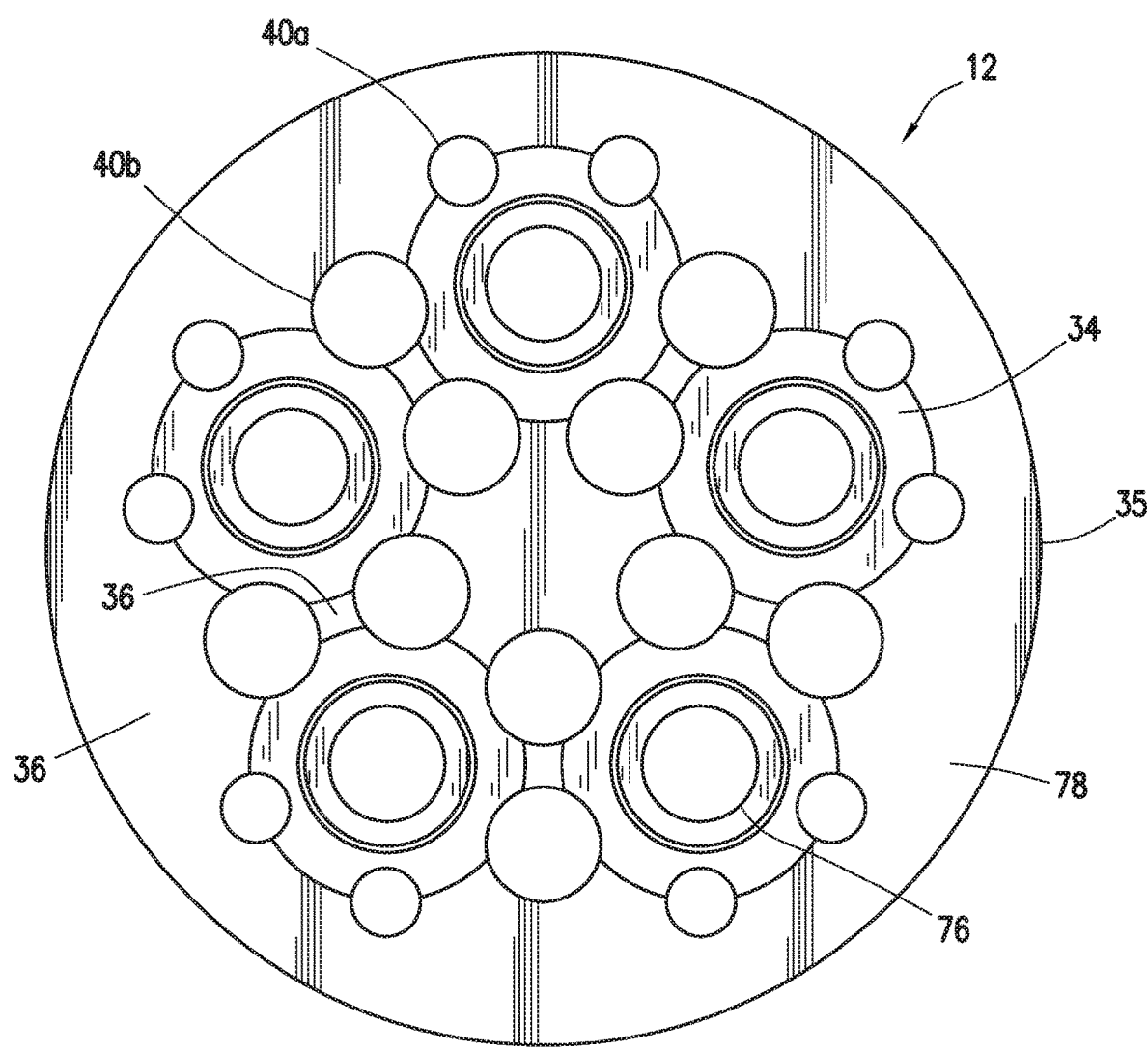
FIG. 72 is an overall top view of the guard of the reciprocating gas compressor valve of FIG. 53.
Figure 75:
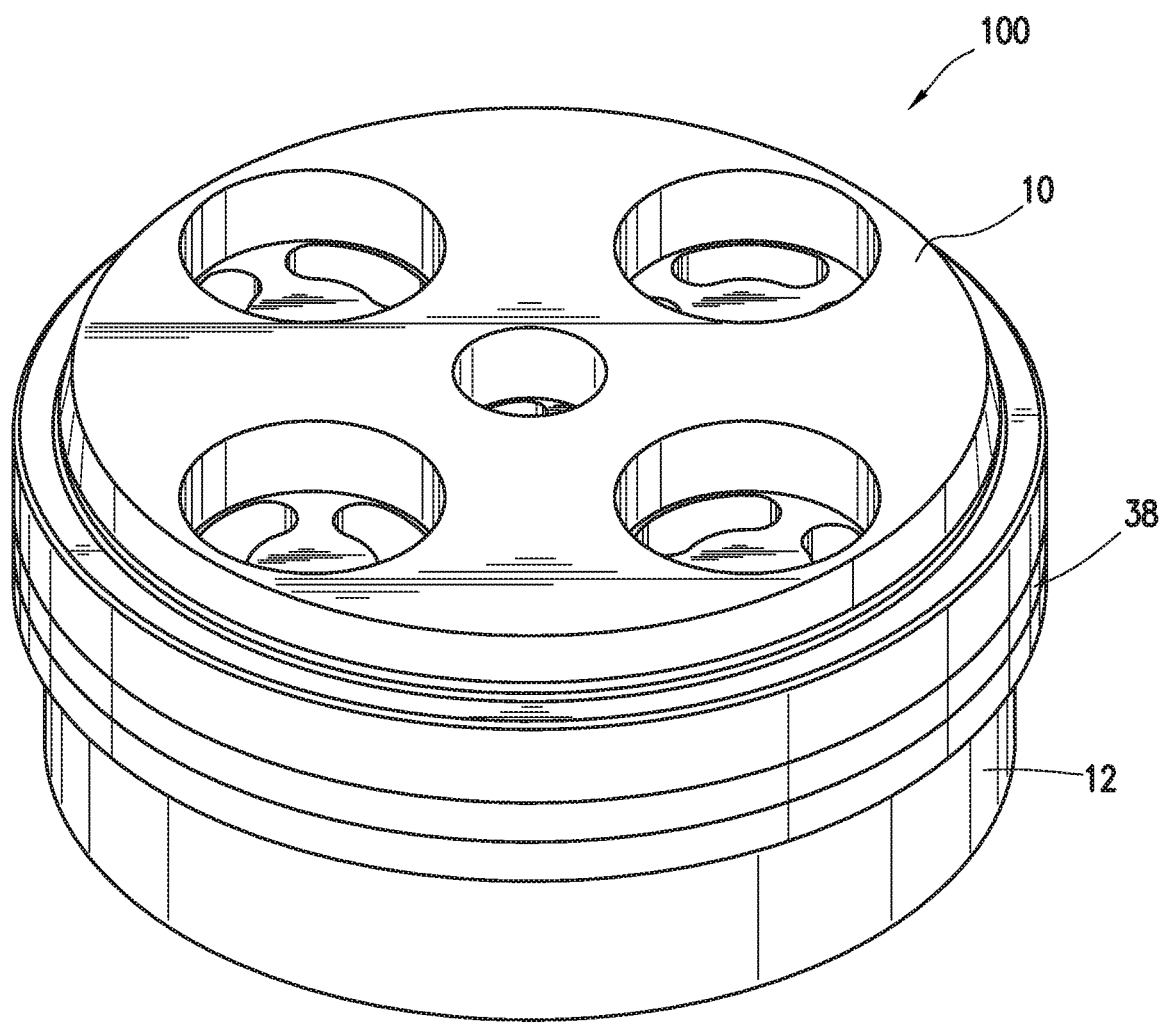
FIG. 75 is an overall perspective view of an embodiment of the reciprocating gas compressor valve having a guard.
Figure 73:
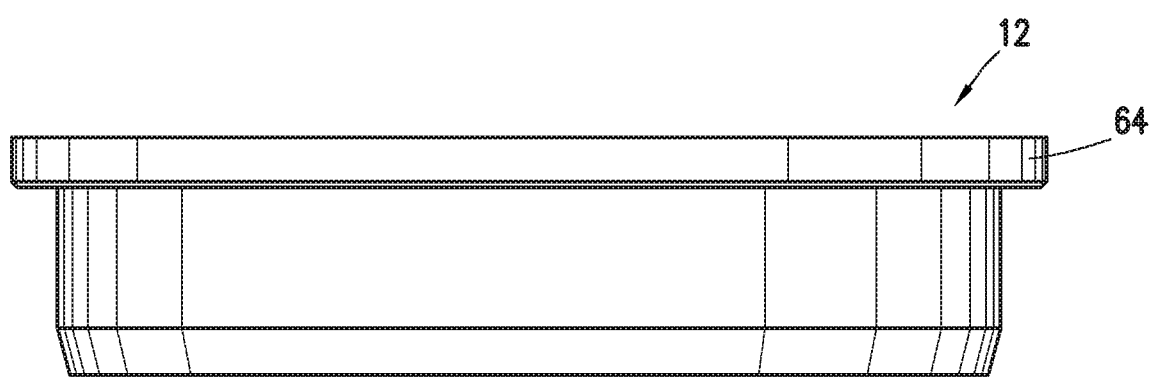
FIG. 73 is a side elevational view of the guard thereof.
Figure 74:
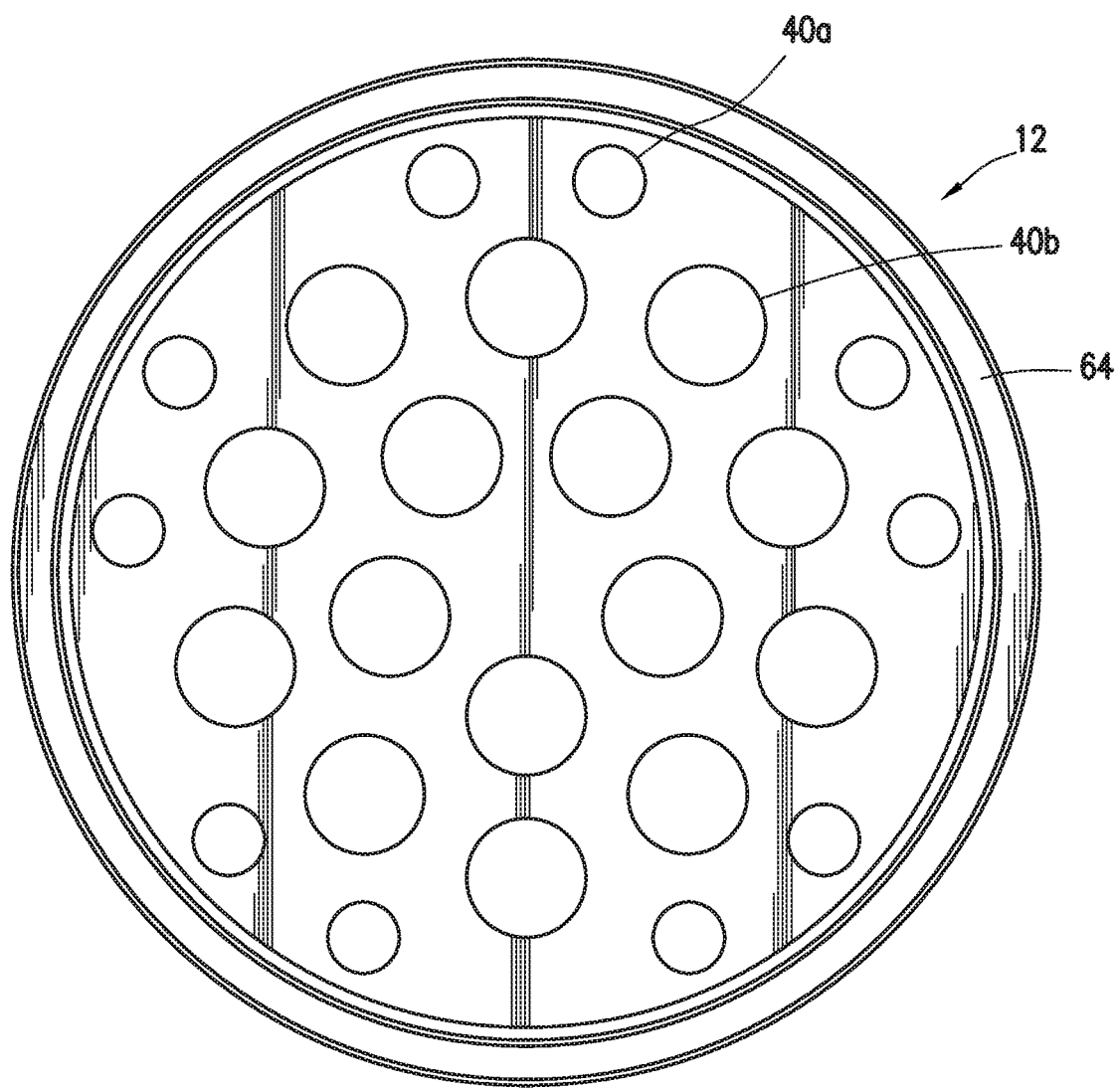
FIG. 74 is a bottom view of the guard thereof.
Figure 75A:
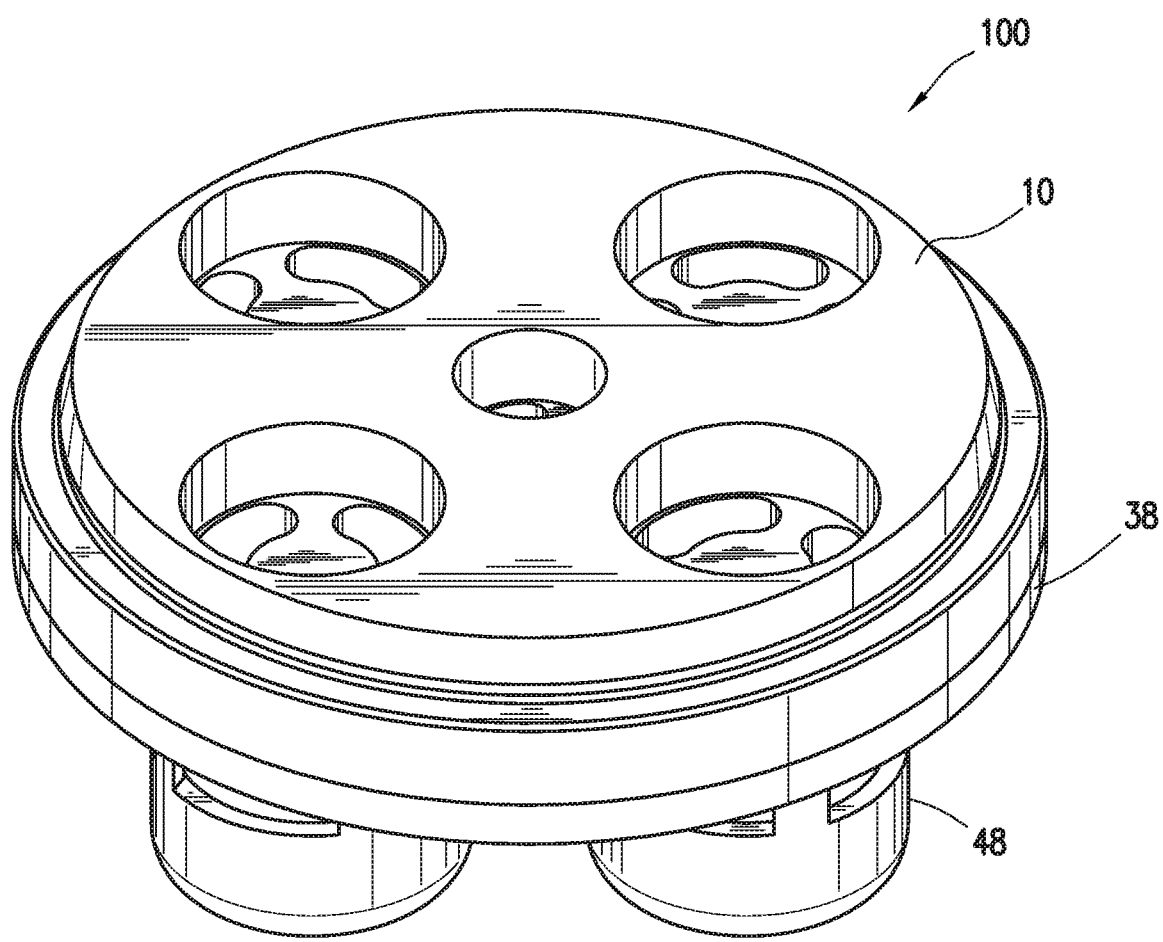
FIG. 75A is an overall perspective view of the reciprocating gas compressor valve without a guard.

Optionally, as shown in FIG. 53 through FIG. 74, the reciprocating gas compressor valve 100 can comprise a cartridge 50. The cartridge 50 can be press fitted into the seat 10, as shown in FIG. 54. Over time, sealing surfaces 90 and 92 of the sealing element 20 can deteriorate and cause leakage of gas and an overall inefficient operation. If left untreated, severe damage and a costly overhaul can result to the gas compressor valve 100 and possibly the gas compressor. However, the cartridge 50 can be replaced in the field using an Arbor press provided the leakage is discovered prior to any extensive damage to the reciprocating gas compressor valve 100 and/or compressor. In this embodiment, the main body 94 can have a plurality of recesses 96 in an inner side 70 of the main body 94, each recess generally aligned with a cluster of holes 16. U.S. Pat. No. 5,511,583, Col. 3 1. 50 to Col. 4, 1. 21 incorporated herein by reference. Therefore, the cartridge 50 can then be positioned within the recess 96 to define an annular aperture 18 having the seating surfaces 72 and 74.

The reciprocating gas compressor valve 100 can be used for gas intake and gas exhaust of the reciprocating gas compressor (not shown). As it relates to the reciprocating gas compressor valve 100, operative portions of the reciprocating gas compressor include at least one piston (not shown) and a cylinder (not shown). The reciprocating gas compressor valve 100 is located in the cylinder of the reciprocating gar compressor. Each cylinder has two ends: a head end and a crank end. The reciprocating gas compressor valve 100 can be used on both the ends or either end provided the valve 100 is single acting. The spring and differential pressure across the valve 100 causes the sealing element 20 to move back and forth within the valve 100 and thereby provide one way gas flow through the cylinder.

In addition, the gas compressor valve 100 provided herein has a reduced clearance pattern between the guard 12 and the seat 10 with respect to the prior compressor valves. Clearance pattern provides for example that in certain reciprocating gas compressor valves, large holes are drilled to make room for the cartridges 50. The number of these holes is directly proportional to the valve diameter. These holes create dead volumes in the valve and these volumes are not used in the compression cycle. The fluid gravitates to these dead volumes and this constitutes a loss of flow or throughput. The summation of all these dead volumes is called valve clearance. Since this valve clearance does not contribute in the compression cycle, they should be eliminated or reduced. Having a reduced clearance pattern, the reciprocating gas compressor valve 100 has a higher rate of flow (throughput) and an improved efficiency.

The greater the number of sealing elements 20 provided in the gas compressor valve 100, the more efficient it is in a cylinder pocket area (not shown) and more gas flow capacity. Reciprocating gas compressor valves with relatively larger diameters require a greater number of holes available for gas flow. More sealing elements can be positioned within the valve and this in turn increases the flow (throughput) through a valve pocket. The number of sealing elements will further increase the clearance volume in the valve due to higher number of holes. This clearance volume is in addition to the compressor clearance volume. See, Compressor Handbook Hanlon; section 20.7.1, incorporated herein by reference. Dead space in the valve is minimized. The seat 10, the guard 12 and valve lift remain in balance. Higher number of non-metallic individual sealing elements also increases valve life. The useful life of a reciprocating gas compressor valve can be affected by various abnormalities in the system. One of those is liquids condensed or present in the system. Valves having individual sealing elements tolerate liquids better than valves having only one sealing element. See, Compressor Handbook Hanlon, Section 20.6: Valve Life, incorporated herein by reference.

As shown in FIGS. 53 through 74, in an embodiment, the cartridge 50 and the sealing element 20 are fixed, matched and interchangeable. The plurality of clusters of holes 16 each have holes with reduced diameters compared to other prior art reciprocating gas compressor valves and the holes 16 can be produced in two standardized sizes, i.e., a large and a small size. Moreover, the cartridge 50 is thinner than in the previous reciprocating gas compressor valve. For example, the cartridge 50 can have a width of ⅛ as opposed to ⅞ inch.

As further shown in FIGS. 75 through 103, in an embodiment of the gas compressor valve 100, a non-metallic or metallic cup assembly 48 and a plate 38 are provided. In the gas compressor valve 100, the sealing element 20 and a spring 22 fit into the cup assembly 48, as shown in FIG. 80 and FIGS. 94 through 98, which removes the need for guard 12. The reciprocating gas compressor valve can be assembled with a guard or without a guard.

Figure 76:
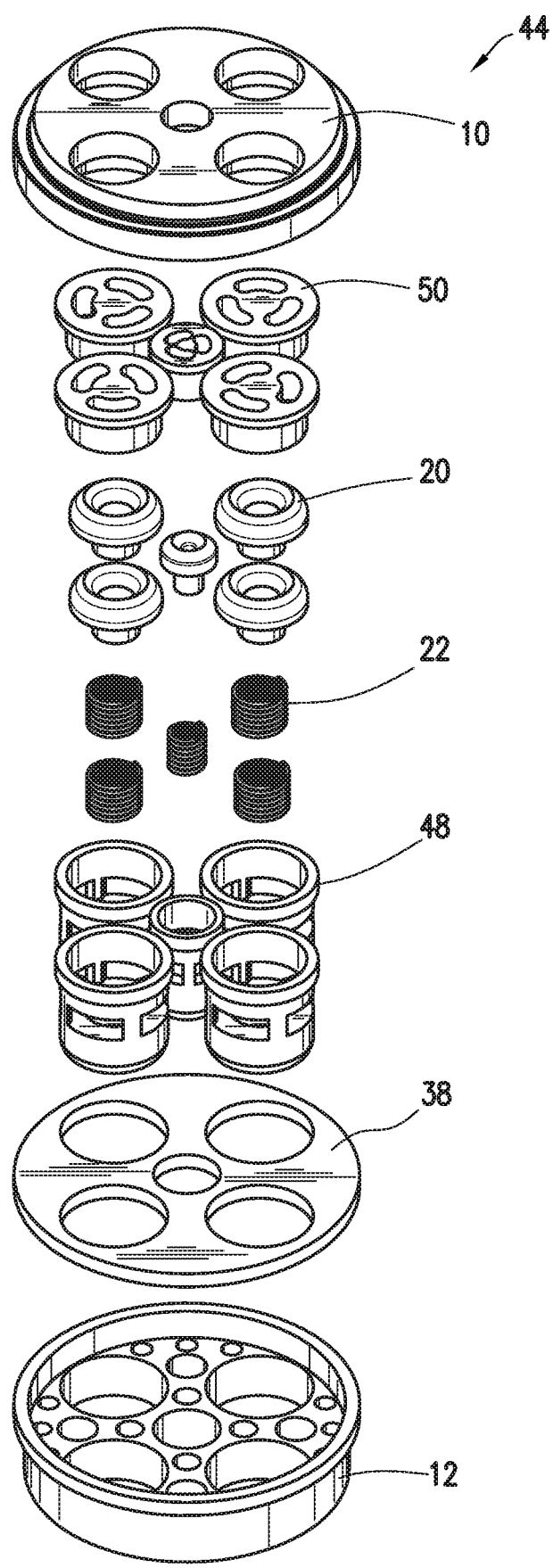
FIG. 76 is an overall exploded perspective view of the reciprocating gas compressor valve of FIG. 75 thereof.
Figure 76A:
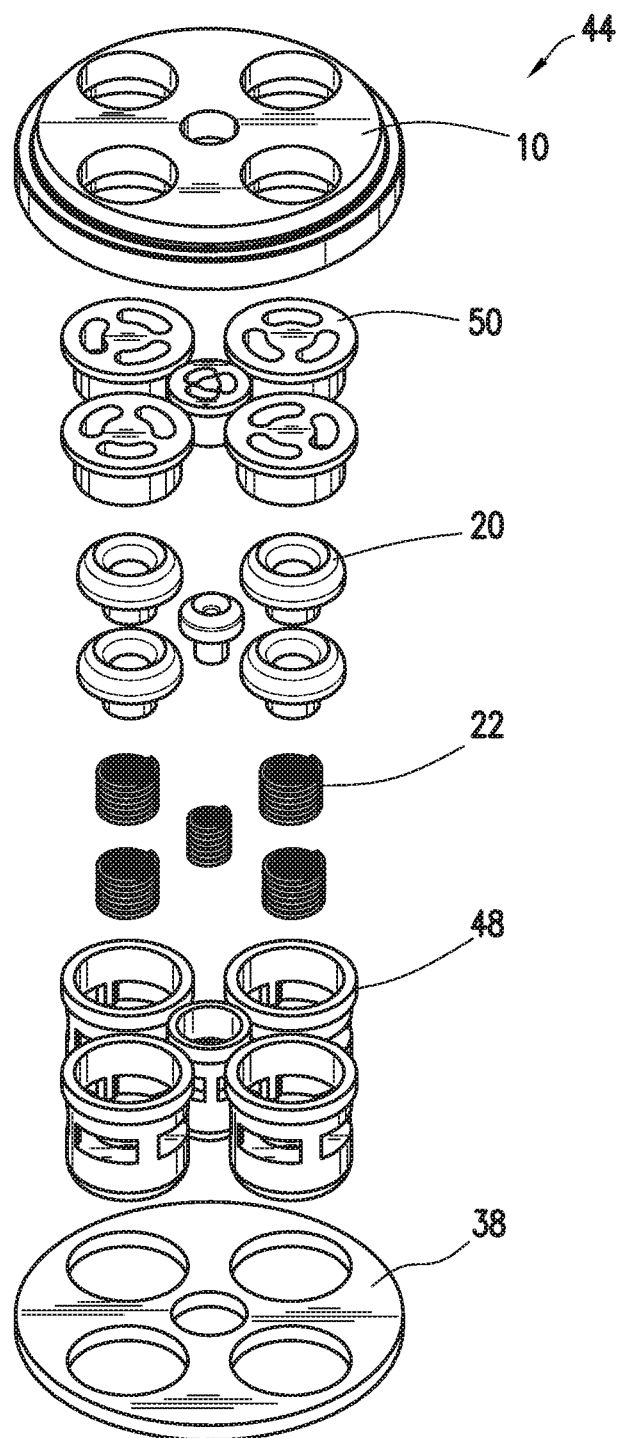
FIG. 76A is an overall exploded perspective view of the reciprocating gas compressor valve of FIG. 75A thereof.
Figure 77:
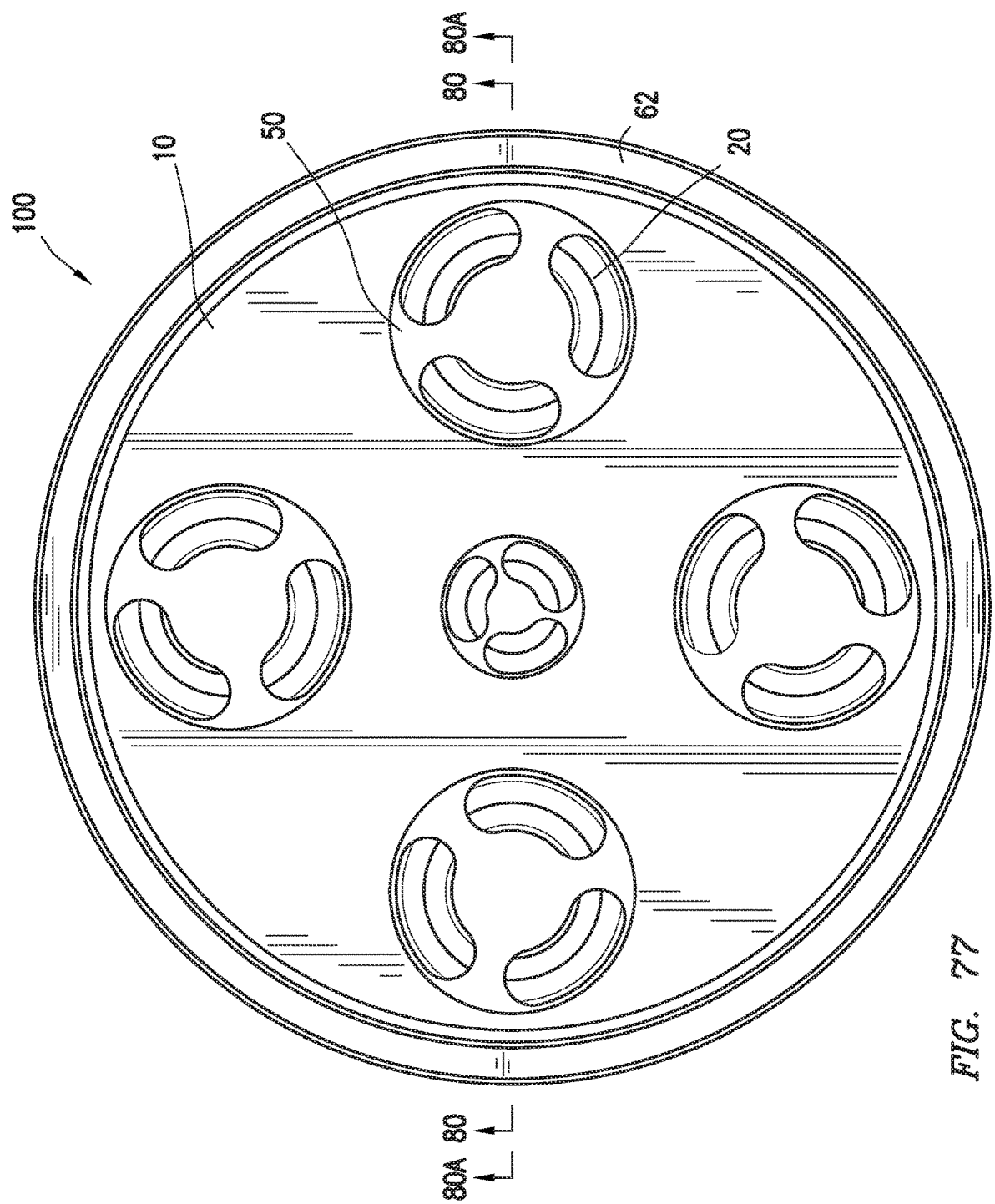
FIG. 77 is an overall top view of the valves of FIGS. 75 and 75A.
Figure 78:
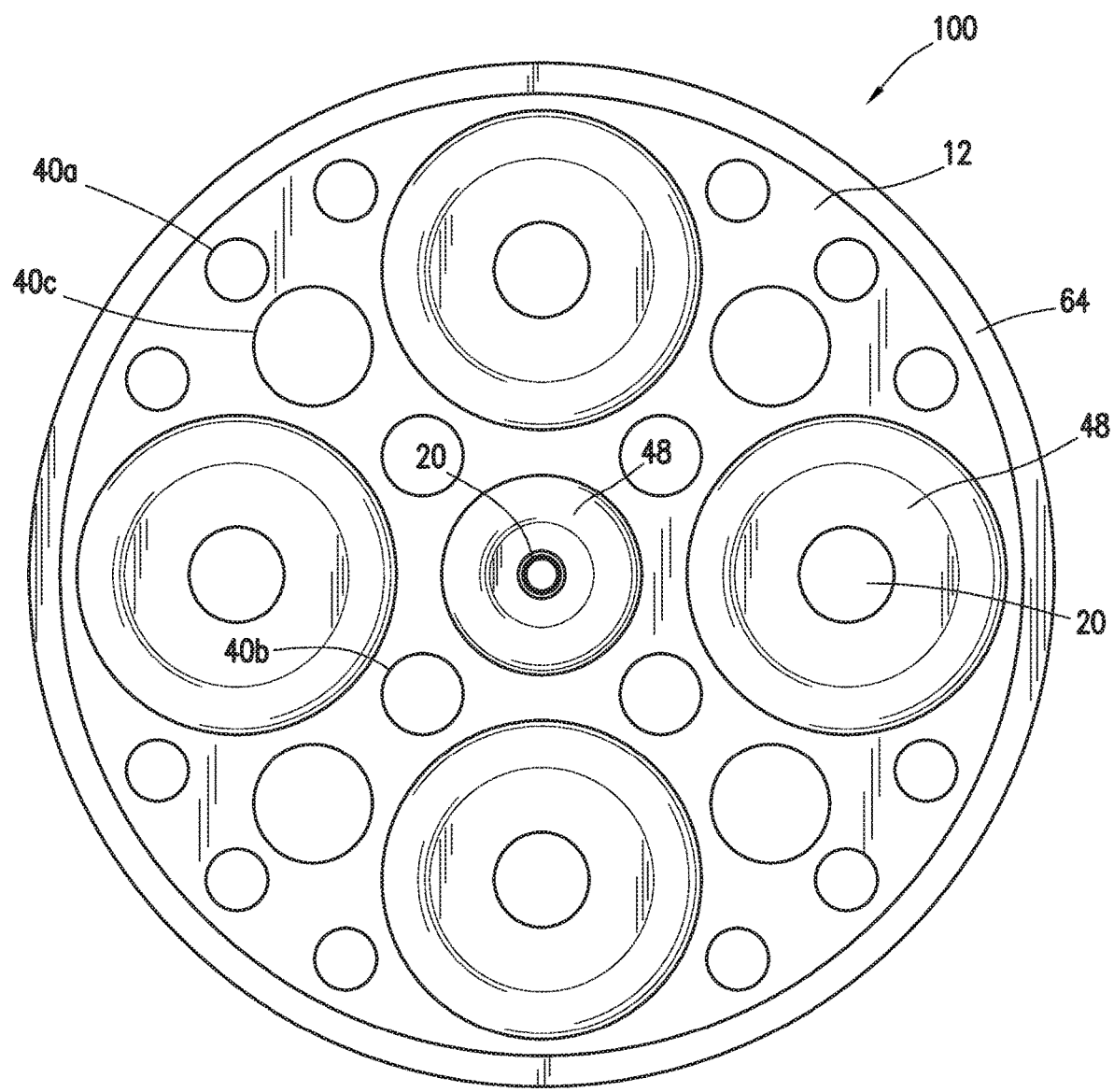
FIG. 78 is an overall bottom view of the reciprocating gas compressor valve of FIG. 75.
Figure 78A:
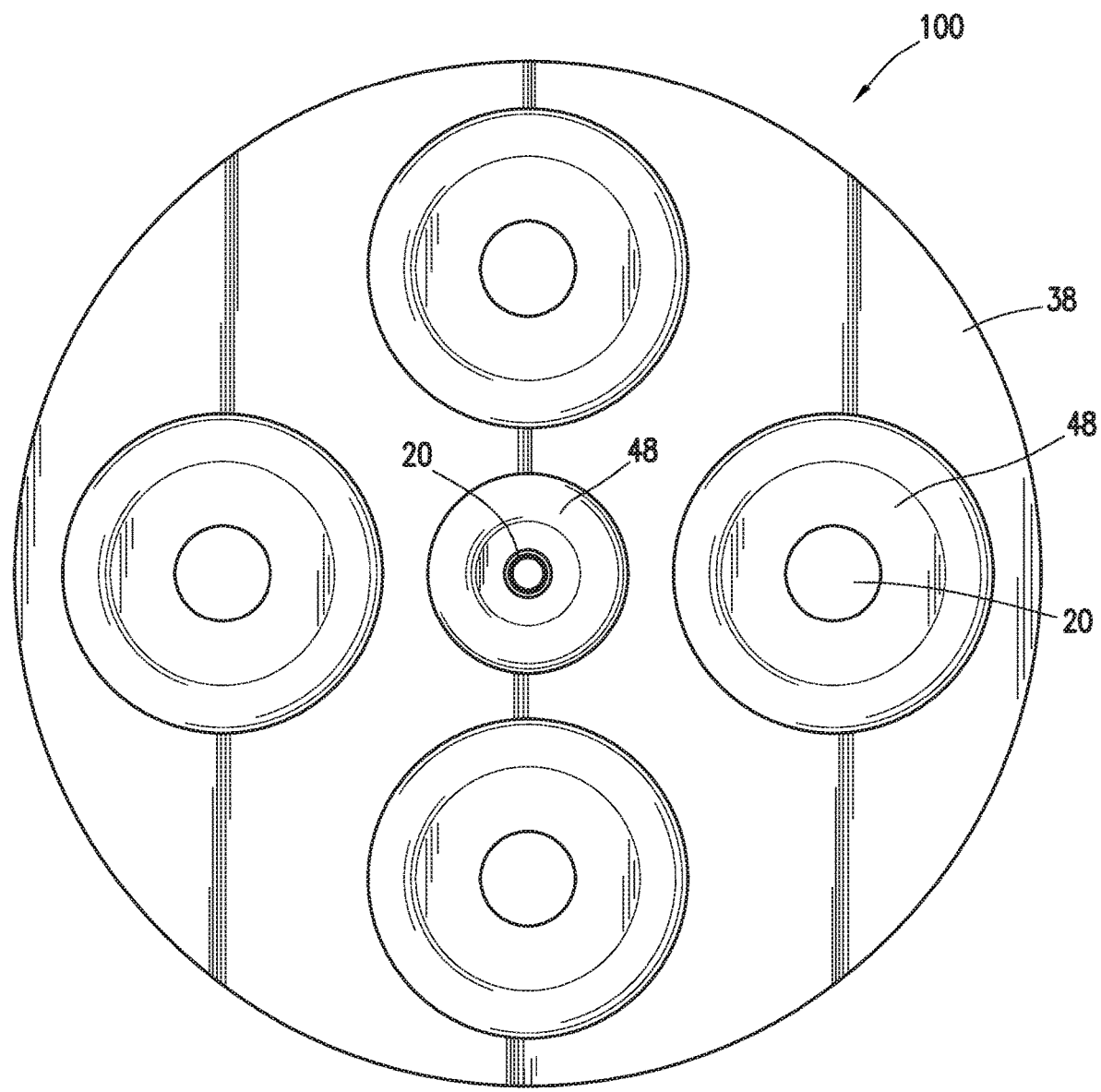
FIG. 78A is an overall bottom view of the reciprocating gas compressor valve of FIG. 75A.
Figure 79:
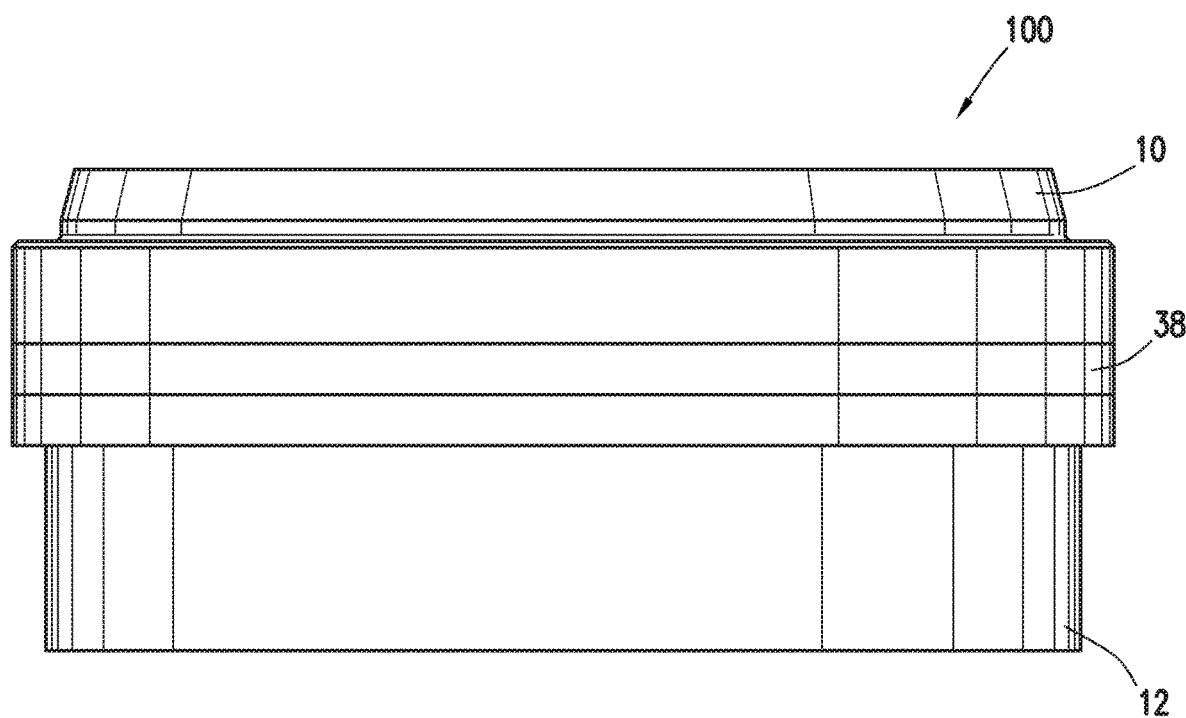
FIG. 79 is an overall side view of the reciprocating gas compressor valve of FIG. 75.
Figure 79A:
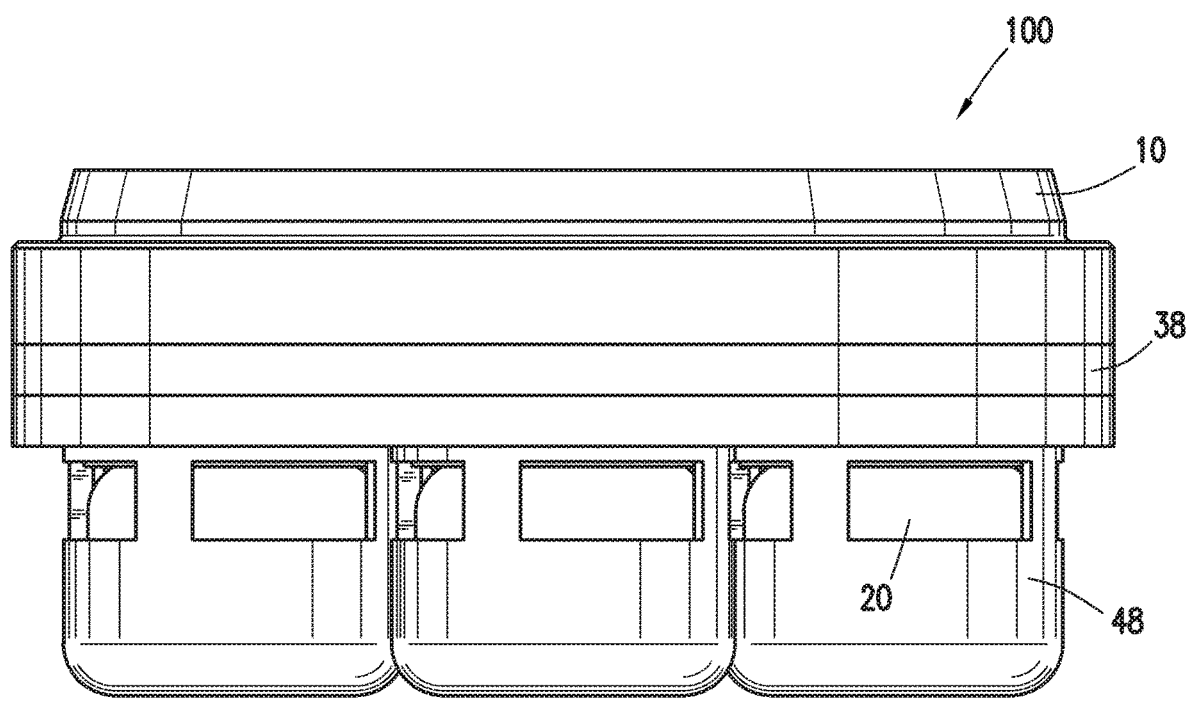
FIG. 79A is an overall side view of the reciprocating gas compressor valve of FIG. 75A.

The cup assembly 48 is intended to ease manufacturing because high tolerances are not necessary. In an embodiment of the gas compressor valve 100, the seat 10 supports the cup assembly 48. The width of the seat 10 is, therefore, reduced. In this embodiment of the reciprocating gas compressor valve 100, the seat 10 provides large holes 46 that fit the cartridges 50. As shown in FIG. 76, in the valve assembly 44, each plate hole 39 corresponds a seat hole 46. The number of plate holes 39 and seat holes 46 depend on the size of the reciprocating gas compressor valve 100. The cup assembly 48 provides straightforward tolerance measurement which serve to keep production costs down. The gas compressor valve 100 having the cup assembly 48 can include a spring 22.

As shown in FIGS. 104 through 121, in an embodiment of the reciprocating gas compressor valve 100, the valve 100 includes a cartridge 50 and a spacer ring 42. The cartridge plate 58 is used in lieu of the cartridge 50 to lower the thickness of the seat 10 and provide reduced clearance. The cartridge plate 58 has arcuate holes which align with the clusters of holes to result in seamless gas flow intake. The spacer ring 42 provides the required area for sealing element movement.

Reciprocating compressors are used extensively in the oil and gas industry. Multiple cylinders can be mounted on the reciprocating gas compressor frame for increased throughput. To permit a one direction flow, the gas compressor valve is used in the cylinder at the suction and discharge location. The gas compressor valve can be used at either location by reversing its direction. Typical industrial applications for the gas compressor valves include gas gathering, refining, storage, and pipeline transport. Each application requires a different set of operating conditions.

Reciprocating gas compressors are typically used for gases with low molecular weight to heavy gases such as methane that require different pressure ratios and may include some impurities. The gas compressor valve is used in very demanding and often corrosive applications. Therefore, there is a high demand for gas compressor valves with components that endure. Typically, most reciprocating gas compressor valves must be replaced or refurbished at fixed time interval to eliminate catastrophic failure.

EXAMPLE I

Increased Flow Area

Certain prior art valves utilize press fitted cartridges into the seat and one end of the cartridge serves as the sealing surface for the sealing element. The number of cartridges contained in the valve 100 is directly proportional to the diameter of the seat 10. In these prior art valves, the seat has a series of holes that are drilled into the seat to maximize the amount of flow area and serve as the inlet to the reciprocating gas compressor valve. Equivalent flow area is used to compare valves of similar dimensions.

To calculate this area, the reciprocating gas compressor valve 100 is considered as a fabrication of three orifices in series. A discharge coefficient can be calculated by testing this valve in a flow tunnel. The discharge coefficient in this example is considered as one. The three orifice areas are described as seat area, lift area and guard area. The seat area is defined as the summation of all open spaces in a seat in the axial direction. This is the area of all the tapered holes in the seat. The lift area equals total of inner and outer circumferential length of the sealing element multiplied by the valve lift. The guard area is defined as summation of all the holes present in the axial direction. Hence, equivalent flow area can be shown mathematically as:

$$\phi = Q * \sqrt{\frac{\rho}{2 * \Delta P}}$$

To increase the flow area in this cartridge (seat area), the area of the holes must be increased. However this reduces the size of the "three bridges" that hold the cartridge together. Reduced size of these bridges results in increased stresses weakening the cartridge load carrying capacity. Because the cartridge is press fitted, a reduction in size may distort the cartridge and cause failure due to stress induced by press fit.

As shown in FIGS. 127 and 128, the reciprocating gas compressor valve shown in FIGS. 1 to 6 was assembled with the sealing element shown in FIGS. 18 through 22 for an analysis. The reciprocating gas compressor valve had eight sealing elements and was in completely pen condition. Further the same valve was made with a larger diameter to accommodate eleven (11) sealing elements. FIGS. 127 and 128 show the improvements in effective flow area in comparison with prior art reciprocating compressor valve and for the different sizes and at different lifts. At lower lifts, there is significant improvement in flow area with comparison to at higher lifts. The result is a cost saving in devices and methods where gases have lower molecular weight and lower lift. A higher effective flow area resulted in low power consumption leading to lower energy costs. Flow tunnel testing and computational fluid dynamics were used to calculate the effective flow area.

EXAMPLE II

Percent Reduction in Clearance

Clearance volume is the residual space in the compressor cylinder occurring at the end of the stroke. Clearance comprises spaces in the valve recess and the space between the piston and the cylinder end. High clearance results in more residual gas trapped at end of each stroke, resulting in lower volumetric efficiency. Lower clearance is desired because it increases the volumetric efficiency of the compressor and associated processes.

In addition to compromising the seat strength, when large holes are required in a reciprocating gas compressor valve, the height of the seat has to be increased. As large diameter holes assist to increase flow area, the height of the seat has to be increased to compensate for a reduction in structural strength. Increasing the height expands the open space in the valve and results in enlarged dead volumes. Gas can then migrate into these dead volumes during compression cycle resulting in reduced throughput. The dead volume is often referred to as a "valve fixed clearance" and should be minimized as it directly affects performance of the compressor.

Clearance in compressor is a combination of valve clearance and cylinder fixed clearance. It can be a major issue for compressors with smaller valves. Since small compressors have smaller cylinders resulting in smaller fixed clearance, any additional clearance in valves produces a penalty in performance. Large compressors have large cylinders and higher fixed clearance. Therefore, valve clearance is a very small percentage of total fixed clearance in the cylinder. But a large clearance in a small compressor has a significant effect on compressor performance. Hence, valve clearance is critical for smaller compressors with small diameter valves. Thus valve with a smaller diameter was considered for this calculation.

TABLE II

Percentage Clearance Reduction

| | Clearance (in^3) | | Total Clearance |
| --- | --- | --- | --- |
| | Suction | Discharge | Reduction |
| Existing Valve | 12.92 | 11.91 | |
| New Valve | 12.14 | 11.35 | |
| % Reduction | −6.07% | −4.66% | −10.73% |

Table II shows the clearance value comparison for the valves. The valve fixed clearance at the suction and discharge ends of prior art valves are 12.92 cubic inches and 11.91 cubic inches respectively. This clearance is calculated using by volumetric formulae for cylinder and CAD software calculated volume numbers as shown in the following equation:

Clearance=Valve Envelope Volume−Model Volume

In the new reciprocating gas compressor valves, large cartridge holes are not present in the seat. Hence, the seat strength is not compromised and the extra seat height is not required. This eliminates the open spaces for a similar sized valve and lowers the dead volume. However, the valve fixed clearance reduction will be different for different diameters of valves. The clearances at the suction and discharge ends are 12.14 cubic inches and 11.35 cubic inches respectively, representing a reduction of approximately 6% and 4.5% at suction and discharge ends, Hence the combined reduction in clearance is ~10.5% for the valves provided herein.

EXAMPLE III

Reciprocating Gas Compressor Test

The reciprocating gas compressor valves both existing and the reciprocating gas compressor valve shown in FIGS. 1 to 6 having a sealing with the design shown in FIGS. 18 to 22 were manufactured for compressor testing in a single cylinder, double acting, reciprocating compressor. The compressor is instrumented with pressure taps at critical locations. In our testing, temperature readings were taken by inline gas measurement device. A 500 hp electric motor was used to drive this compressor. A VFD drive was used to control the test speed. Nitrogen was used as the test fluid. This compressor had a complete loop with a cooling tower. Test was performed at 700 rpm with a pressure ratio of 2.0. Suction and discharge pressures were maintained at 100 psi and 215 psi respectively.

Data (flow, multiple pressures and temperatures) was collected by the electronic data analyzer using the various pressure taps and analyzed to check for any abnormalities. An inline flowmeter was installed on the suction side to monitor the fluid flow. Furthermore, a kW meter was monitoring the power used by the motor to verify IHP calculations taken by the electronic analyzer.

This testing performed under controlled environment. Flow was measured with a flow meter and Indicated Horsepower/MMSCFD was calculated using the data.

For a prior art valve, flow and IHP/MMSCHD was observed as 1180 SCFM and 48.54 IHP/MMSCFD respectively. For reciprocating gas compressor valves provided herein, the numbers improved to 1350 SCFM and 45.48 IHP/MMSCFD respectively, representing an improvement of ~14% in Flow and IHP/MMSCFD reduced by ~6%. The customer can calculate dollar savings using the equation below. Data will be different, however, for different fluids, applications, pressure ratios and diameter of valves.

$$\text{(Customer Savings)} \frac{\$}{MMSCFD} = \frac{IHP}{MMSCFD} * \frac{\$}{HP-hr}$$

The certain symbols provided above and used herein are defined herein as follows:

Q: Flow through the valve; φ: Equivalent Flow area; σ: Bending stresses; ρ: fluid density ΔP: Pressure differential across the valve; M: Moment about the neutral axis; I; Second Moment about the neutral axis; y: distance from neutral axis; w: width of the bridge; h: height of the bridge; IHP: Indicated horsepower; MMSCFD: Million Metric Standard Cubic Feet per Day; and HP-hr: Horsepower hour.

We claim:

1. A reciprocating gas compressor valve comprising:
a seat comprising a main body having an outer side and an inner side, and defining a plurality of pairs of arcuate holes positioned along a common circular or annular locus in the main body, wherein the arcuate holes in each pair of arcuate holes are arranged about a central axis extending through the outer side and the inner side of the main body, and each arcuate hole of each pair of arcuate holes is tapered from the outer side to the inner side of the main body toward the central axis about which the pair of arcuate holes is arranged; and
a sealing element comprising:
a tubular section; and
a head portion extending from the tubular section, the head portion having a top surface and a bottom surface,
wherein the sealing element defines an opening through the tubular section and the head portion, and
an outer diameter of the head portion exceeds an outer diameter of the tubular section;
wherein in an open position of the reciprocating gas compressor valve, a flow pathway is provided through the plurality of pairs of arcuate holes and the tubular section of the sealing element.

2. The reciprocating gas compressor valve of claim 1, wherein the sealing element comprises a non-metallic material.

3. The reciprocating gas compressor valve of claim 1, further comprising a cartridge operably engaged with the sealing element, wherein the cartridge defines a plurality of recesses, each of which aligns with one of the plurality of pairs of arcuate holes.

4. The reciprocating gas compressor valve of claim 1, further comprising one or more additional sealing elements.

5. The reciprocating gas compressor valve of claim 1, wherein the reciprocating gas compressor valve further comprises a guide for positioning the sealing element.

6. The reciprocating gas compressor valve of claim 1, wherein an outer circumference of the head portion comprises a chamfer.

7. The reciprocating gas compressor valve of claim 1, wherein an inner circumference of the head portion of the sealing element comprises a chamfer.

8. The reciprocating gas compressor valve of claim 1, wherein in the open position of the reciprocating gas compressor valve, the tubular section and the bottom surface of the head portion abut a surface of the reciprocating gas compressor valve.

9. The reciprocating gas compressor valve of claim 8, further comprising a guard, wherein the surface of the reciprocating gas compressor valve is a stop surface of the guard.

10. The reciprocating gas compressor valve of claim 9, wherein the guard comprises a plurality of guard openings, and each guard opening is adjacent to one of the pairs of arcuate holes.

11. The reciprocating gas compressor valve of claim 10, wherein the guard is configured to control a movement of the sealing element as it engages the inner side of the seat and the stop surface of the guard.

12. The reciprocating gas compressor valve of claim 8, wherein the surface of the reciprocating gas compressor valve is a surface of a cup assembly.

13. The reciprocating gas compressor valve of claim 1, wherein in a closed position of the reciprocating gas compressor valve, the top surface of the head portion abuts the inner side of the seat to seal a gas flow within the reciprocating gas compressor valve.

14. The reciprocating gas compressor valve of claim 13, further comprising a coil spring positioned between the sealing element and a surface of the reciprocating gas compressor valve, the coil spring configured to bias the sealing element towards the inner side of the seat when the reciprocating gas compressor valve is in the closed position.

15. The reciprocating gas compressor valve of claim 14, wherein the tubular section is configured to direct gas flow away from the coil spring, thereby reducing turbulence when the reciprocating gas compressor valve is in the open position.

* * * * *